US011016306B2

(12) United States Patent
Yoshida et al.

(10) Patent No.: US 11,016,306 B2
(45) Date of Patent: May 25, 2021

(54) OPTICAL DEVICE AND METHOD FOR PRODUCING THE SAME, AND DISPLAY DEVICE

(71) Applicant: SONY CORPORATION, Tokyo (JP)

(72) Inventors: Takuji Yoshida, Kanagawa (JP); Mieko Kuwahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 307 days.

(21) Appl. No.: 15/752,171

(22) PCT Filed: Aug. 2, 2016

(86) PCT No.: PCT/JP2016/072681
§ 371 (c)(1),
(2) Date: Feb. 12, 2018

(87) PCT Pub. No.: WO2017/038350
PCT Pub. Date: Mar. 9, 2017

(65) Prior Publication Data
US 2018/0239150 A1    Aug. 23, 2018

(30) Foreign Application Priority Data

Sep. 2, 2015  (JP) .............................. JP2015-172817

(51) Int. Cl.
*G02B 27/01* (2006.01)
*F21V 8/00* (2006.01)
(Continued)

(52) U.S. Cl.
CPC ......... *G02B 27/0176* (2013.01); *G02B 6/005* (2013.01); *G02B 6/0076* (2013.01);
(Continued)

(58) Field of Classification Search
CPC ............ G02B 27/0149; G02B 27/0176; G02B 2027/0194; G02B 27/01; G02B 27/0101;
(Continued)

(56) References Cited

U.S. PATENT DOCUMENTS 10,509,241 B1 * 12/2019 Robbins ................... G02B 5/32
2007/0070859 A1    3/2007 Hirayama
(Continued)

FOREIGN PATENT DOCUMENTS

CN          103823267 A      5/2014
CN          104520753 A      4/2015
(Continued)

OTHER PUBLICATIONS

International Search Report and Written Opinion of PCT Application No. PCT/JP2016/072681, dated Nov. 1, 2016, 12 pages.
(Continued)

*Primary Examiner* — Jordan M Schwartz
(74) *Attorney, Agent, or Firm* — Chip Law Group

(57) ABSTRACT

A display device is provided with (A) a frame that is worn on a head of a viewer, and (B) an image display device 100 mounted to the frame. The image display device is provided with (B-1) an image forming device 111, and (B-2) an optical device 120 that forms a virtual image on the basis of light emitted from the image forming device 111. The light from the image forming device 111 enters a pupil 21 of the viewer 20 through the optical device 120. The optical device 120 is provided at least with a first glass plate 121, a second glass plate 122 that faces the first glass plate 121, and a shock absorbing layer 123 sandwiched between the first glass plate 121 and the second glass plate 122.

20 Claims, 34 Drawing Sheets

(51) Int. Cl.
*H04N 5/64* (2006.01)
*G09G 3/20* (2006.01)

(52) U.S. Cl.
CPC .. *G02B 27/0172* (2013.01); *G02B 2027/0174* (2013.01); *G02B 2027/0178* (2013.01); *G02B 2027/0194* (2013.01); *G09G 3/2003* (2013.01); *H04N 5/64* (2013.01)

(58) Field of Classification Search
CPC ............ G02B 27/0103; G02B 27/2027; G02B 27/0105; G02B 27/017; G02B 27/0172; G02B 2027/0174; G02B 2027/0178; G02B 6/005; G02B 6/0076
See application file for complete search history.

(56) References Cited

U.S. PATENT DOCUMENTS

| | | | |
|---|---|---|---|
| 2014/0140653 A1 | 5/2014 | Brown et al. | |
| 2015/0177517 A1 | 6/2015 | Blonde et al. | |
| 2015/0253487 A1* | 9/2015 | Nichol | G02B 6/0036 362/610 |
| 2015/0277125 A1* | 10/2015 | Hirano | G02B 6/0088 359/633 |
| 2015/0370075 A1 | 12/2015 | Ato et al. | |
| 2017/0100919 A1* | 4/2017 | Lu | B32B 17/00 |
| 2017/0336552 A1* | 11/2017 | Masuda | G02B 6/0016 |
| 2018/0039082 A1* | 2/2018 | Amitai | G02B 6/0016 |
| 2018/0329208 A1* | 11/2018 | Masuda | G02B 27/0101 |

FOREIGN PATENT DOCUMENTS

| | | |
|---|---|---|
| CN | 104730854 A | 6/2015 |
| CN | 104950442 A | 9/2015 |
| EP | 1748305 A1 | 1/2007 |
| EP | 2733517 A1 | 5/2014 |
| EP | 2887127 A1 | 6/2015 |
| EP | 2924490 A2 | 9/2015 |
| JP | 2006-003872 A | 1/2006 |
| JP | 2006-162767 A | 6/2006 |
| JP | 2007-011057 A | 1/2007 |
| JP | 2009-186794 A | 8/2009 |
| JP | 2010-271565 A | 12/2010 |
| JP | 2012-058404 A | 3/2012 |
| JP | 2014-132328 A | 7/2014 |
| JP | 2014-160169 A | 9/2014 |
| JP | 2015-132821 A | 7/2015 |
| JP | 2015-184561 A | 10/2015 |
| KR | 10-2015-0073853 A | 7/2015 |
| KR | 10-2015-0119837 A | 10/2015 |
| TW | 201433824 A | 9/2014 |
| WO | 2005/111669 A1 | 11/2005 |
| WO | 2014/129109 A | 8/2014 |
| WO | 2015/125794 A1 | 8/2015 |
| WO | 2016/076153 A1 | 5/2016 |

OTHER PUBLICATIONS

Office Action for CN Patent Application No. 201680048800.8, dated Dec. 16, 2019, 09 pages of Office Action and 07 pages of English Translation.

* cited by examiner

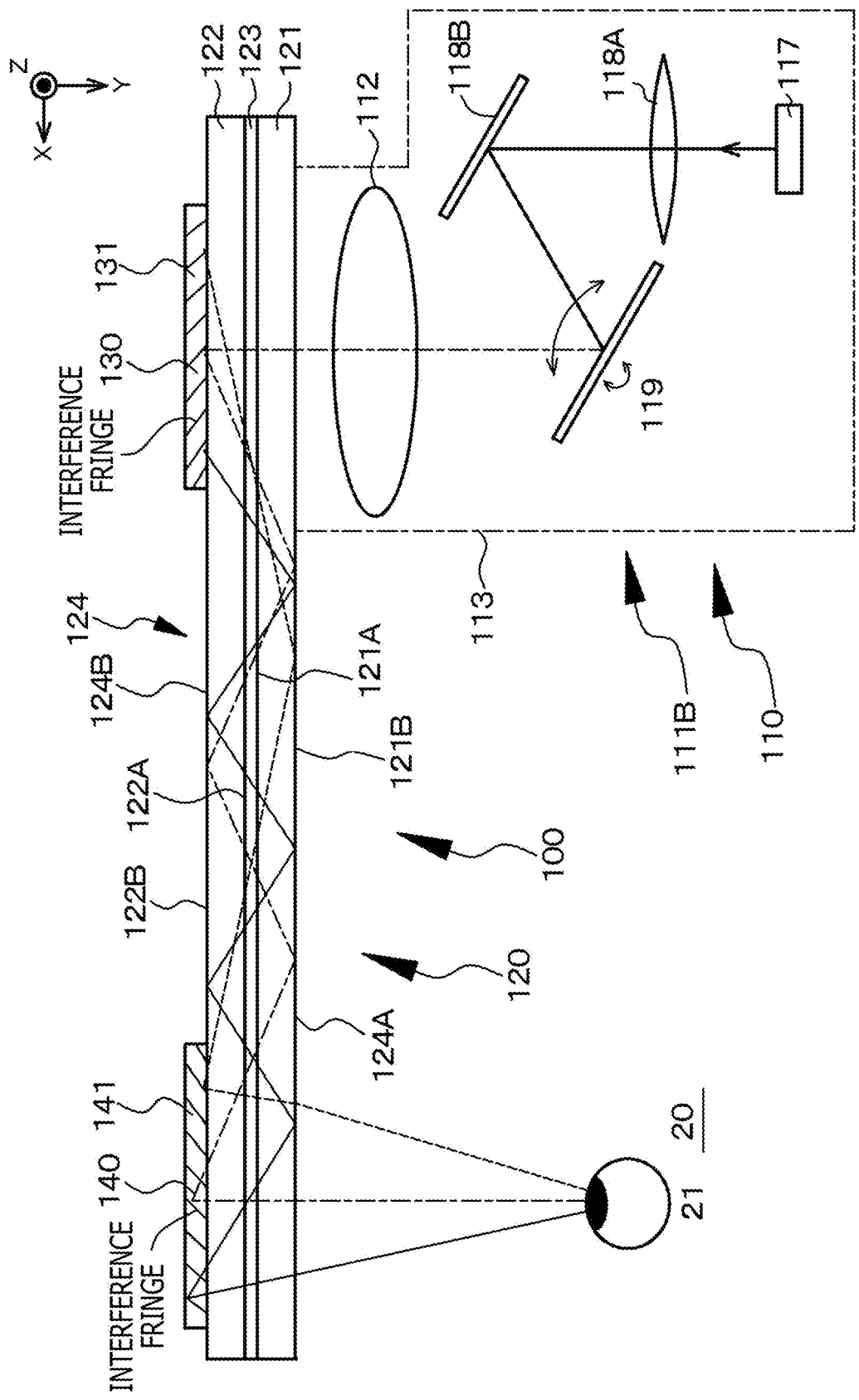

THICKNESS

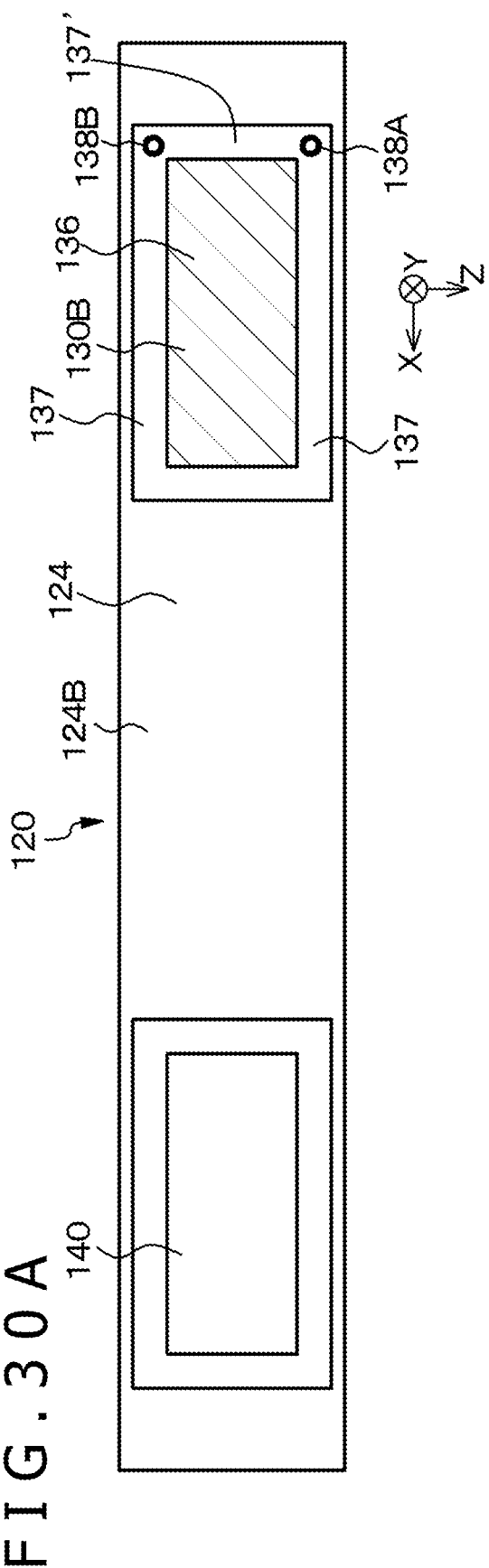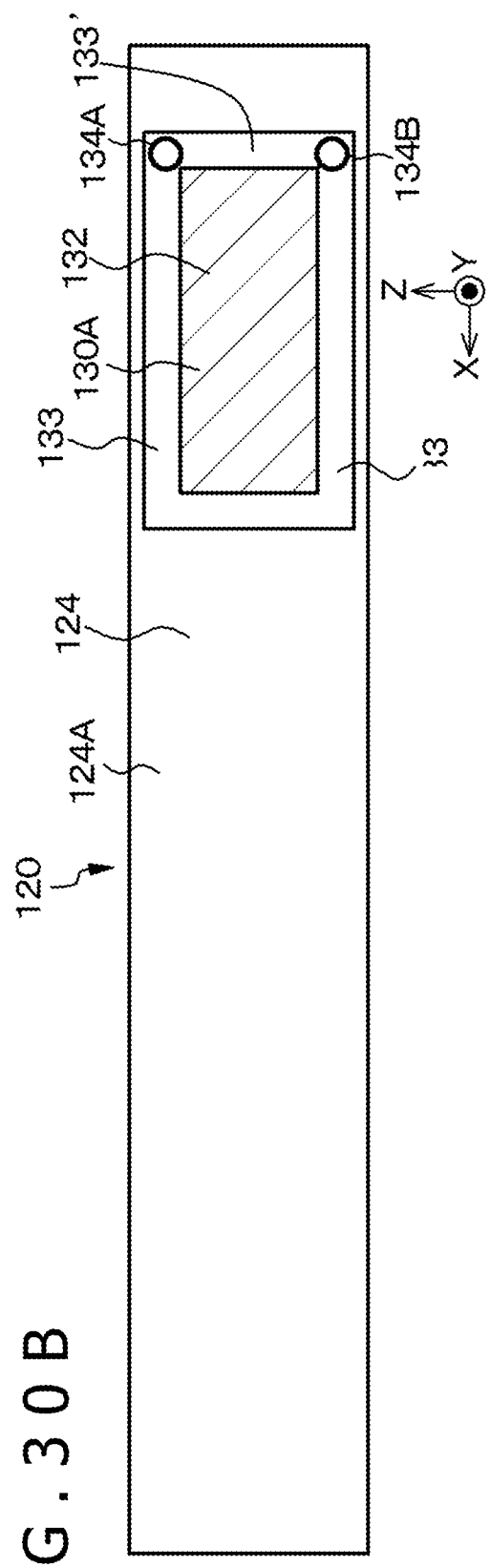

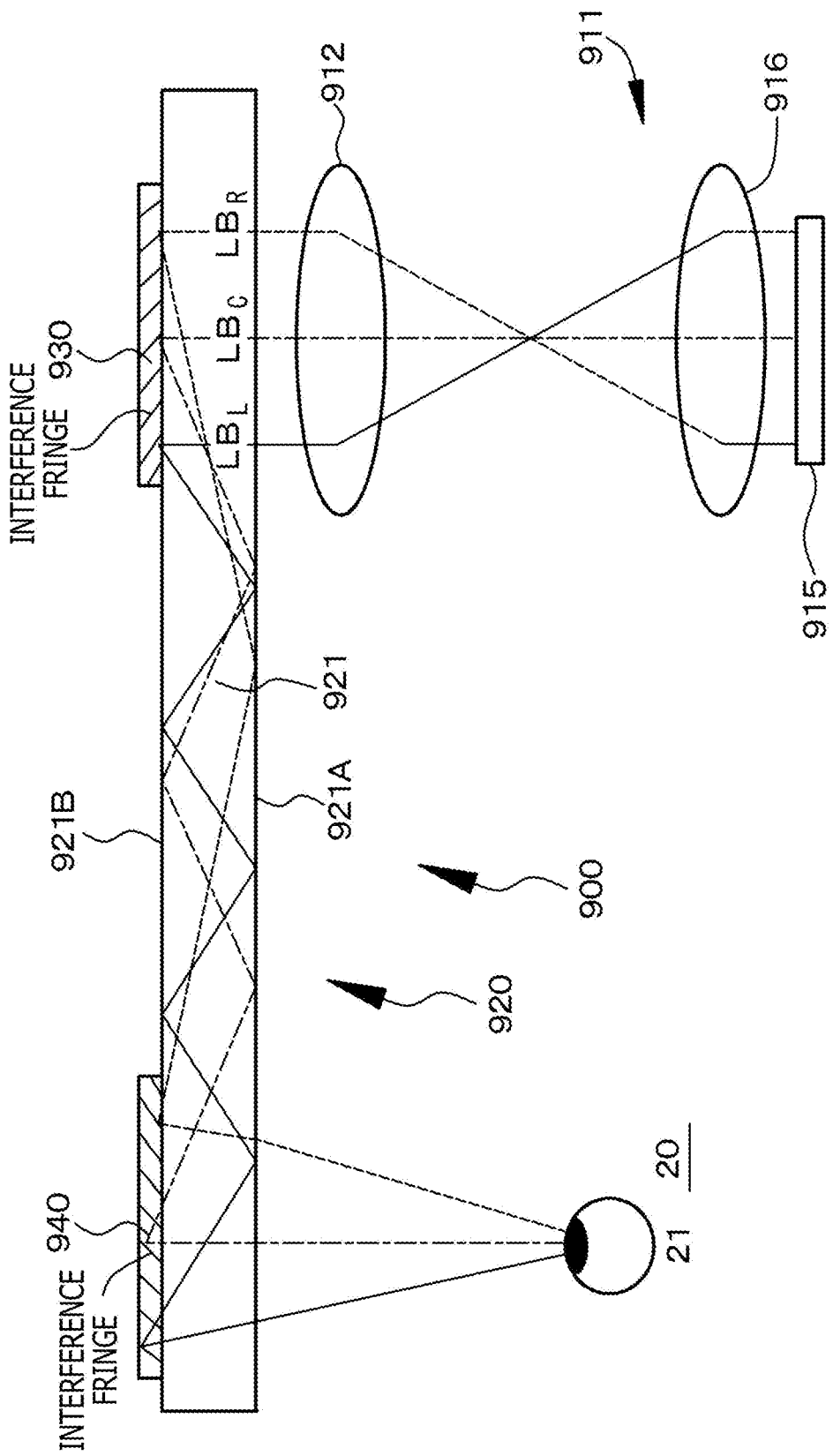

OPTICAL DEVICE AND METHOD FOR PRODUCING THE SAME, AND DISPLAY DEVICE

CROSS REFERENCE TO RELATED APPLICATIONS

This application is a U.S. National Phase of International Patent Application No. PCT/JP2016/072681 filed on Aug. 2, 2016, which claims priority benefit of Japanese Patent Application No. JP 2015-172817 filed in the Japan Patent Office on Sep. 2, 2015. Each of the above-referenced applications is hereby incorporated herein by reference in its entirety.

TECHNICAL FIELD

The present disclosure relates to an optical device and a method for producing the same, and a display device. Specifically, the present disclosure relates to a display device used, for example, as a head mounted display (HMD), an optical device used for the display device, and a method for producing such an optical device.

BACKGROUND ART

For permitting a viewer to view a two-dimensional image formed by an image forming device as an enlarged virtual image by a virtual image optical system, a virtual image display device (image display device) using a hologram diffraction grating has been known, as from, for example, JP 2007-011057A.

As for example depicted in FIG. 34, this image display device 900 includes an image forming device 911 that forms and displays an image, a collimating optical system 912, and a virtual image optical system (optical device 920) which light from the image forming device 911 enters and which guides the light to a pupil 21 of a viewer 20. Here, the optical device 920 includes a light guide plate 921, and a first diffraction grating member 930 and a second diffraction grating member 940 which are disposed on the light guide plate 921. Light emitted from each pixel 915 of the image forming device 911 enters the collimating optical system 912 through a convex lens 916, is converted into parallel light by the collimating optical system 912, and enters the light guide plate 921. The parallel light enters and is emitted from an optical surface (first surface) 921A on one side of the light guide plate 921. In addition, the first diffraction grating member 930 and the second diffraction grating member 940 are attached to an optical surface (second surface) 921B on the other side of the light guide plate 921 which surface is parallel to the first surface 921A of the light guide plate 921.

The light entering the light guide plate 921 from the first surface 921A of the light guide plate 921 enters the first diffraction grating member 930, and the respective parallel light is diffracted or reflected as parallel light. The parallel light thus diffracted or reflected travels while undergoing total reflection between the first surface 921A and the second surface 921B of the light guide plate 921, and enters the second diffraction grating member 940. The parallel light entering the second diffraction grating member 940 comes off the total reflection condition by being diffracted or reflected, and is emitted from the light guide plate 921, to be guided to the pupil 21 of the viewer 20.

In the case where optical characteristics and/or specifications required of the light guide plate 921 are severe, it is difficult to produce the light guide plate 921 from a plastic material. Therefore, the light guide plate 921 often includes a glass plate.

CITATION LIST

Patent Literature

[PTL 1]
JP 2007-011057A

SUMMARY

Technical Problem

Meanwhile, in the case where the light guide plate 921 is includes a glass plate, the light guide plate 921 may be damaged when, for example, the viewer (user) drops the head mounted display carelessly.

Accordingly, it is an object of the present disclosure to provide an optical device having a structure that is not liable to be damaged even upon dropping or the like and a method for producing the same, and a display device in which the optical device is incorporated.

Solution to Problem

A display device of the present disclosure for achieving the above object includes:
(A) a frame worn on a head of a viewer; and
(B) an image display device mounted to the frame,
in which the image display device includes
(B-1) an image forming device, and
(B-2) an optical device that forms a virtual image based on light emitted from the image forming device,
the light from the image forming device enters a pupil of the viewer through the optical device, and
the optical device includes at least
a first glass plate,
a second glass plate that faces the first glass plate, and
a shock absorbing layer sandwiched between the first glass plate and the second glass plate.

An optical device according to a first mode of the present disclosure for achieving the above object is an optical device that guides light from an image forming device to a pupil of a viewer, the optical device including:
a first glass plate;
a second glass plate;
first-A deflection means;
first-B deflection means; and
second deflection means;
in which the first-A deflection means is disposed in a region of the first glass plate where the light from the image forming device enters,
the first-B deflection means is disposed in a region of the second glass plate where the light from the image forming device enters,
the second deflection means is disposed in or on the first glass plate or the second glass plate,
the first-A deflection means and the first-B deflection means are aligned with each other, and
the first glass plate and the second glass plate are laminated on each other through a shock absorbing layer.

An optical device according to a second mode of the present disclosure for achieving the above object is an optical device that guides light from an image forming device to a pupil of a viewer, the optical device including:
a first glass plate;
a second glass plate;
first deflection means;
second-A deflection means; and
second-B deflection means,
in which the first deflection means is disposed in a region of the first glass plate or a region of the second glass plate where the light from the image forming device enters,
the second-A deflection means is disposed in or on the first glass plate,
the second-B deflection means is disposed in or on the second glass plate,
the second-A deflection means and the second-B deflection means are aligned with each other, and
the first glass plate and the second glass plate are laminated on each other through a shock absorbing layer.

An optical device according to a third mode of the present disclosure for achieving the above object is an optical device that guides light from an image forming device to a pupil of a viewer,
the optical device including:
a first glass plate;
a second glass plate;
first-A deflection means;
first-B deflection means;
second-A deflection means; and
second-B deflection means,
in which the first-A deflection means is disposed in a region of the first glass plate where the light from the image forming device enters,
the first-B deflection means is disposed in a region of the second glass plate where the light from the image forming device enters,
the second-A deflection means is disposed in or on the first glass plate,
the second-B deflection means is disposed in or on the second glass plate,
the first-A deflection means and the first-B deflection means are aligned with each other, and the second-A deflection means and the second-B deflection means are aligned with each other, and
the first glass plate and the second glass plate are laminated on each other through a shock absorbing layer.

A method of producing an optical device according to the first mode of the present disclosure for achieving the above object is a method of producing an optical device that guides light from an image forming device to a pupil of a viewer, the method including the steps of:
preparing a first glass plate and a second glass plate having a configuration in which first-A deflection means is disposed in a region of the first glass plate where the light from the image forming device enters, first-B deflection means is disposed in a region of the second glass plate where the light from the image forming device enters, and second deflection means is disposed in or on the first glass plate or the second glass plate; and
aligning the first-A deflection means and the first-B deflection means with each other, and laminating the first glass plate and the second glass plate on each other through a shock absorbing layer.

A method of producing an optical device according to the second mode of the present disclosure for achieving the above object is a method of producing an optical device that guides light from an image forming device to a pupil of a viewer, the method including the steps of:
preparing a first glass plate and a second glass plate having a configuration in which first deflection means is disposed in a region of the first glass plate where the light from the image forming device enters, second-A deflection means is disposed in or on the first glass plate, and second-B deflection means is disposed in or on the second glass plate; and
aligning the second-A deflection means and the second-B deflection means with each other, and laminating the first glass plate and the second glass plate on each other through a shock absorbing layer.

A method of producing an optical device according to the third mode of the present disclosure for achieving the above object is a method of producing an optical device that guides light from an image forming device to a pupil of a viewer, the method including the steps of:
preparing a first glass plate and a second glass plate having a configuration in which first-A deflection means is disposed in a region of the first glass plate where the light from the image forming device enters, first-B deflection means is disposed in a region of the second glass plate where the light from the image forming device enters, second-A deflection means is disposed in or on the first glass plate, and second-B deflection means is disposed in or on the second glass plate; and
aligning the first-A deflection means and the first-B deflection means with each other, aligning the second-A deflection means and the second-B deflection means with each other, and laminating the first glass plate and the second glass plate on each other through a shock absorbing layer.

Advantageous Effects of Invention

In the display device of the present disclosure, the optical devices according to the first to third modes of the present disclosure, and the optical devices obtained by the methods of producing the optical device according to the first to third modes of the present disclosure, the first glass plate and the second glass plate are laminated on each other through the shock absorbing layer, and, therefore, shock resistance of the optical device can be enhanced assuredly. Note that the effects described herein are merely exemplary and are non-restrictive, and additional effects may exist.

BRIEF DESCRIPTION OF DRAWINGS

FIG. 5 is a conceptual figure of an image display device in a display device of Example 2.

FIGS. 19A, 19B and 19C are figures depicting schematically variations in a virtual image projection region of a light controller, and the like.

FIGS. 30A and 30B are a schematic view, as viewed from a side opposite to a viewer, and a schematic view, as viewed from the same side as the viewer, of a laminated structure in the display device of Example 6.

FIG. 34 is a conceptual figure of a conventional image display device.

DESCRIPTION OF EMBODIMENTS

Figure 1:
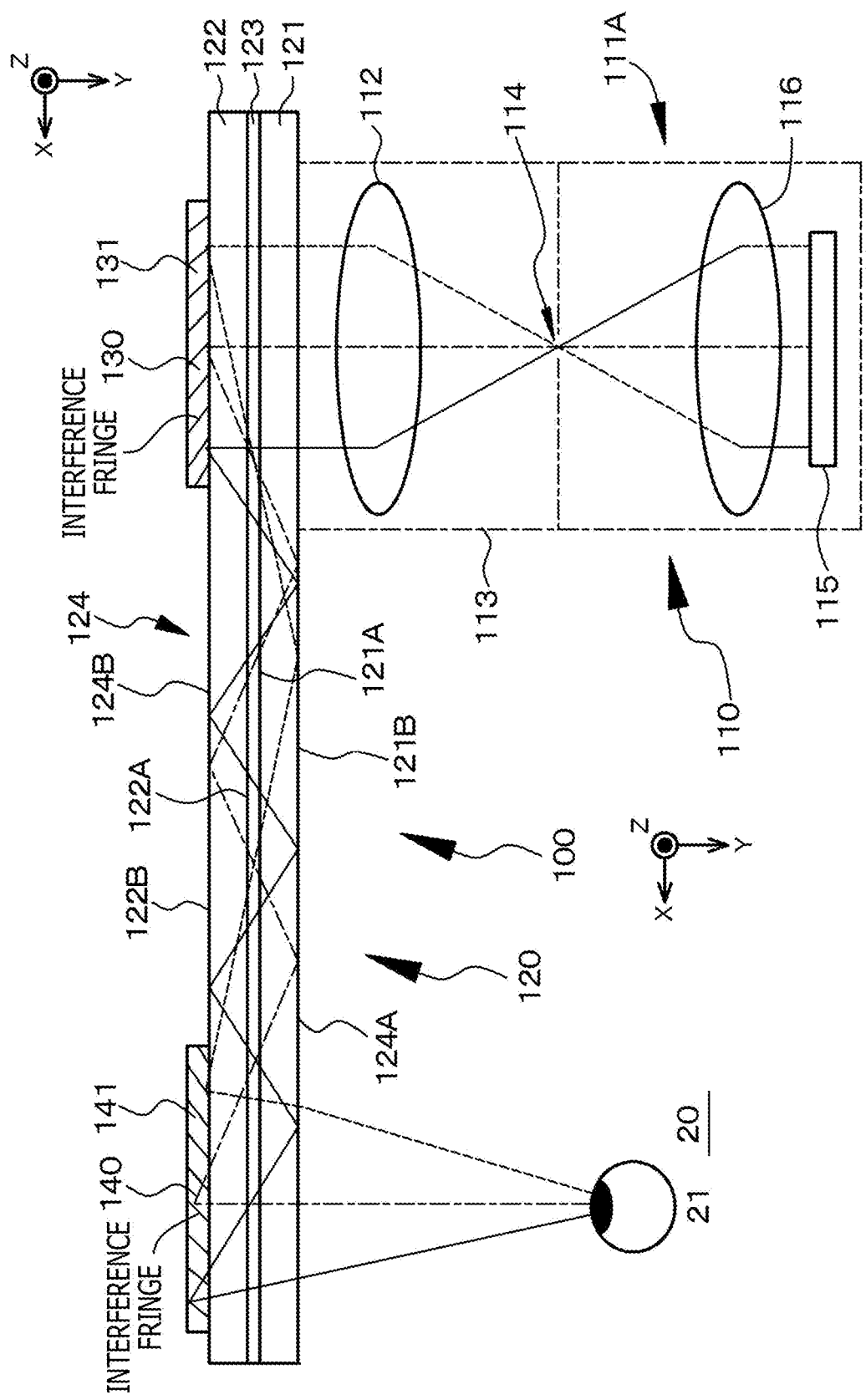
FIG. 1 is a conceptual figure of an image display device in a display device of Example 1.

The present disclosure will be described below based on Examples, referring to the drawings. However, the present disclosure is not to be restricted by the Examples, and various numerical values and materials in the Examples are merely exemplary. Note that the description will be made in the following order.

1. General description of a display device of the present disclosure, optical devices according to first to third modes of the present disclosure, and method of producing the optical devices according to the first to third modes of the present disclosure 2. Example 1 (a display device of the present disclosure, a display device of a first configuration of the present disclosure, and an image forming device of a first mode)

3. Example 2 (a modification of Example 1, an image forming device of a second mode)

4. Example 3 (a modification of Examples 1 and 2, a display device of a second configuration of the present disclosure)

5. Example 4 (a modification of Examples 1 and 2, a display device of a third-A configuration of the present disclosure, an optical device according to a first mode of the present disclosure and a method for producing the same)

6. Example 5 (a modification of Examples 1 and 2, a display device of a third-B configuration of the present disclosure, an optical device according to a second mode of the present disclosure and a method for producing the same)

7. Example 6 (a modification of Examples 1 and 2, a display device of a fourth configuration of the present disclosure, an optical device according to a third mode of the present disclosure and a method for producing the same)

8. Example 7 (a modification of Examples 1 and 2)

9. Example 8 (a modification of Examples 1 and 2)

10. Example 9 (a modification of Examples 1 and 2)

11. Example 10 (a modification of Examples 1 to 9)

12. Example 11 (a modification of Examples 1 to 10)

13. Example 12 (a modification of Example 11)

14. Example 13 (another modification of Example 11)

15. Example 14 (a modification of Examples 3 to 6)

16. Example 15 (a modification of Examples 3 to 6)

17. Others

<General Description of a Display Device of the Present Disclosure, Optical Devices According to First to Third Modes of the Present Disclosure, and Method of Producing the Optical Devices According to the First to Third Modes of the Present Disclosure>

In a display device of the present disclosure or optical devices according to first to third modes of the present disclosure or optical devices obtained by a method for producing the optical devices according to the first to third modes of the present disclosure, a shock absorbing layer may be in the form of being sandwiched between a first glass plate and a second glass plate on a whole surface basis. Alternatively, the shock absorbing layer may be in the form of being sandwiched between an effective region of the first glass plate (a region exclusive of a peripheral portion of the first glass plate, or a region where the first glass plate guides light) and an effective region of the second glass plate (a region exclusive of a peripheral portion of the second glass plate, or a region where the second glass plate guides light).

In the display device of the present disclosure or the optical devices according to the first to third modes of the present disclosure or the optical devices obtained by the method for producing the optical devices according to the first to third modes of the present disclosure that include the above-mentioned preferable modes, the shock absorbing layer may include an ultraviolet (UV)-curing resin or a thermosetting resin, or may include a resin that is cured by mixing an agent A and an agent B. The shock absorbing layer is required to have characteristics of being transparent, having an adhesion strength sufficient for laminating the two glass plates, being able to maintain a thin layer form, etc. Specific examples of the material constituting the shock absorbing layer include acrylic resins, acrylic acid ester resins, methacrylic resins, epoxy resins, urethane resins, polyvinyl ether resin, polycarbonate resin, polyamide resins, polyvinyl acetate resin, styrene resin, butadiene resin, natural rubber resins, and resins having an adhesive property including polyvinyl carbazole, polyethylene glycol and phenolic resin (an adhesive or a transparent adhesive). The thickness of the shock absorbing layer is preferably 1 to 50 μm, whereby a high parallelism of the first glass plate and the second glass plate can be obtained, scattering of light by the shock absorbing layer is reduced, and a lowering in image quality can be prevented from being caused. Beads for space formation (adjustment) may be mixedly present in a part of the shock absorbing layer located in a region where the first glass plate and the second glass plate do not guide light, whereby a further uniformization of the thickness of the shock absorbing layer can be contrived.

In order to obtain an optical device which is durable against dropping, it is desirable that the value of elastic modulus of the shock absorbing layer is lower than the value of elastic modulus of the glass plates. Specifically, a UV-curing resin having an elastic modulus of $1 \times 10^7$ to $1 \times 10^{10}$ Pa, as measured by the DMS measuring method at 1 Hz and 25 degrees as specified in JIS K7244-1:1998, K7244-2:1998, K7244-3:1999, and a photoelastic resin having an elastic modulus of $1 \times 10^5$ to $1 \times 10^6$ Pa. Alternatively, it is desirable that the Shore hardness of the shock absorbing layer is lower than the Shore hardness of the glass plates.

In the display device of the present disclosure or the optical devices according to the first to third modes of the present disclosure or the optical devices obtained by the method for producing the optical devices according to the first to third modes of the present disclosure that include the above-described various preferable modes, the refractive index of the material constituting the shock absorbing layer may be 1.45 to 1.65. Note that the difference between the refractive index of the material constituting the first glass plate and the second glass plate and the refractive index of the material constituting the shock absorbing layer is preferably not more than 0.1. If the refractive index difference from the glass plate is large, light propagated through the laminated structure including the first glass plate, the shock absorbing layer and the second glass plate may be reflected, generating a ghost.

Further, in the display device of the present disclosure that includes the above-described various preferable modes, a configuration may be adopted in which the optical device further includes deflection means, and the light from the image forming device is deflected at the deflection means, is propagated by total reflection through the inside of the laminated structure including the first glass plate, the shock absorbing layer and the second glass plate, is deflected at the deflection means, and enters the pupil of the viewer. Besides, in this case, the deflection means may include a plurality of hologram diffraction gratings. Note that the term "total reflection" means total internal reflection, or total reflection in the inside of the laminated structure.

In the above-mentioned preferable configuration of the display device of the present disclosure, the first glass plate and the second glass plate are disposed in this order from the viewer's side, the deflection means includes first deflection means and second deflection means, the first deflection means is disposed in either a region of the first glass plate or a region of the second glass plate where light from an image forming device enters, the second deflection means is disposed in or on either the first glass plate or the second glass plate, and the light from the image forming device is deflected at the first deflection means, is propagated through total reflection through the inside of the laminated structure including the first glass plate, the shock absorbing layer and the second glass plate, is deflected at the second deflection means, and enters the pupil of the viewer. Note that such a configuration is referred to, for convenience, as "the display device of the first configuration of the present disclosure."

Alternatively, in the above-mentioned preferable configuration of the display device of the present disclosure, a configuration may be adopted in which the first glass plate and the second glass plate are disposed in this order from the viewer's side, the deflection means includes first-A deflection means, first-B deflection means and second deflection means, the first-A deflection means and the first-B deflection means are disposed in either a region of the first glass plate or a region of the second glass plate where light from an image forming device enters, the second deflection means is disposed in or on either the first glass plate or the second glass plate, and the light from the image forming device is deflected at the first-A deflection means and the first-B deflection means, is propagate by total reflection through the inside of the laminated structure including the first glass plate, the shock absorbing layer and the second glass plate, is deflected at the second deflection means, and enters the pupil of the viewer. Note that such a configuration is referred to, for convenience, as "the display device of the second configuration of the present disclosure."

Alternatively, in the above-mentioned preferable configuration of the display device of the present disclosure, a configuration may be adopted in which the first glass plate and the second glass plate are disposed in this order from the viewer's side, the deflection means includes first-A deflection means, first-B deflection means and second deflection means, the first-A deflection means is disposed in a region of the first glass plate where light from an image forming device enters, the first-B deflection means is disposed in a region of the second glass plate where the light from the image forming device enters, the second deflection means is disposed in or on the first glass plate or the second glass plate, and the light from the image forming device is deflected at the first-A deflection means and the first-B deflection means, is propagated by total reflection in the inside of the laminated structure including the first glass plate, the shock absorbing layer and the second glass plate, is deflected at the second deflection means, and enters the pupil of the viewer. Note that such a configuration is referred to, for convenience, as "the display device of the third-A configuration of the present disclosure."

Alternatively, in the above-mentioned preferable configuration of the display device of the present disclosure, a configuration may be adopted in which the first glass plate and the second glass plate are disposed in this order from the viewer's side, the deflection means includes first deflection means, second-A deflection means and second-B deflection means, the first deflection means is disposed in a region of the first glass plate or a region of the second glass plate where light from an image forming device enters, the second-A deflection means is disposed in or on the first glass plate, the second-B deflection means is disposed in or on the second glass plate, and the light from the image forming device is deflected at the first deflection means, is propagated by total reflection through the inside of the laminated structure including the first glass plate, the shock absorbing layer and the second glass plate, is deflected at the second-A deflection means and the second-B deflection means, and enters the pupil of the viewer. Note that such a configuration is referred to, for convenience, as "the display device of the third-B configuration of the present disclosure."

Alternatively, in the above-mentioned preferable configuration of the display device of the present disclosure, a configuration may be adopted in which the first glass plate and the second glass plate are disposed in this order from the viewer's side, the deflection means includes first-A deflection means, first-B deflection means, second-A deflection means and second-B deflection means, the first-A deflection means is disposed in a region of the first glass plate where light from an image forming device enters, the first-B deflection means is disposed in a region of the second glass plate where the light from the image forming device enters, the second-A deflection means is disposed in or on the first glass plate, the second-B deflection means is disposed in or on the second glass plate, and the light from the image forming device is deflected at the first-A deflection means and the first-B deflection means, is propagated by total reflection through the inside of the laminated structure including the first glass plate, the shock absorbing layer and the second glass plate, is deflected at the second-A deflection means and the second-B deflection means, and enters the pupil of the viewer. Note that such a configuration is referred to, for convenience, as "the display device of the fourth configuration of the present disclosure."

In the display devices of the present disclosure that include the above-described various preferable modes or configurations (hereinafter, for convenience, these may be referred to as "the display device or the like of the present disclosure") or the optical devices according to the first to third modes of the present disclosure or the optical devices obtained by the method of producing the same that include the above-described various preferable modes or configurations (hereinafter, for convenience, these may be referred to as "the optical device or the like of the present disclosure"), the hologram diffraction grating may include a reflection type hologram diffraction grating, or may include a transmission type hologram diffraction grating, or, alternatively, a configuration may be adopted in which some hologram diffraction gratings include reflection type hologram diffraction gratings whereas the other hologram diffraction gratings include transmission type hologram diffraction gratings. In a hologram diffraction grating, the incident light is diffracted or reflected. Note that as the reflection type hologram diffraction grating, there can be mentioned a reflection type volume hologram diffraction grating. The reflection type volume hologram diffraction grating means a hologram diffraction grating that diffracts or reflects only +1st order diffracted light. In the following description, the first deflection means, the first-A deflection means and the first-B deflection means may be referred generically as "the first deflection means or the like" for convenience, whereas the second deflection means, the second-A deflection means and the second-B deflection means may be referred generically as "the second deflection means or the like" for convenience. A virtual image formation region includes the second deflection means or the like. In addition, in the following description, the first deflection means or the like including the reflection type volume hologram diffraction grating may be referred to, for convenience, as "the first diffraction grating member," and the second deflection means or the like including the reflection type volume hologram diffraction grating may referred to, for convenience, as "the second diffraction grating member."

By the image display device of the present disclosure, monochromatic (for example, green) image display can be performed. Besides, in this case, for example, an angle of view may be bisected (more specifically, for example, equally bisected), and the first diffraction grating member and the second diffraction grating member may include a laminate of two diffraction grating members corresponding respectively to bisected angles of view. Alternatively, in the case of performing color image display, the first diffraction grating member and the second diffraction grating member may include a laminate of P diffraction grating layers each including a reflection type volume hologram diffraction grating, for corresponding to diffraction and reflection of P kinds of lights having different P kinds of wavelength bands (or wavelengths) (for example, P=3, and the three kinds of lights, namely, red, green and blue lights). Each diffraction grating layer is formed with an interference fringe corresponding to one kind of wavelength band (or wavelength). Alternatively, the first diffraction grating member and the second diffraction grating member including one diffraction grating layer may be formed with P kinds of interference fringes, for corresponding to diffraction or reflection of P kinds of lights having different P kinds of wavelength bands (or wavelengths). Alternatively, a structure may be adopted in which, for example, a diffraction grating member including a diffraction grating layer including a reflection type volume hologram diffraction grating for diffraction or reflection of light having a red wavelength band (or wavelength) is disposed in a first laminated structure, a diffraction grating member including a diffraction grating layer including a reflection type volume hologram diffraction grating for diffraction or reflection of light having a green wavelength band (or wavelength) is disposed in a second laminated structure, a diffraction grating member including a diffraction grating layer including a reflection type volume hologram diffraction grating for diffraction or reflection of light having a blue wavelength band (or wavelength) is disposed in a third laminated structure, and the first laminated structure, the second laminated structure and the third laminated structure are laminated on one another with gaps therebetween. Alternatively, a structure may be adopted in which a diffraction grating member including a diffraction grating layer including a reflection type volume hologram diffraction grating for diffraction or reflection of light having a wavelength band (or wavelength) of a color is disposed in the first laminated structure, whereas a diffraction grating member including a diffraction grating layer including a reflection type volume hologram diffraction grating for diffraction or reflection of light having a wavelength band (or wavelength) of another color is disposed in a second laminated structure, and the first laminated structure and the second laminated structure are laminated on each other with a gap therebetween. Alternatively, a configuration may be adopted in which the angle of view is, for example, equally trisected, and a first diffraction grating member and a second diffraction grating member are formed by laminating diffraction grating layers corresponding respectively to the angels of view. By adopting these configurations, it is possible to increase diffraction efficiency, to increase a diffraction reception angle, and to contrive optimization of diffraction angle at the time when lights having respective wavelength bands (or wavelengths) are diffracted or reflected at the first diffraction grating member and the second diffraction grating member.

Examples of a method for producing a diffraction grating member include a method of forming a dry film formed photopolymer layer, and a method in which photopolymer layers are sequentially formed in a desired order on a support including a glass or plastic or the like on the basis of a coating method. Examples of the method for coating with the photopolymer include known coating methods such as die coating method, gravure coating method, roll coating method, blade coating method, curtain coating method, dip coating method, spin coating method, and printing method. Note that not only a monolayer coating method but also a method for simultaneous coating of a plurality of layers, such as a multilayer slide coating method, may be adopted. A protective layer (spacer layer) may be disposed between the photopolymer layers, as required, by known coating means or a known lamination method.

In producing a diffraction grating member, a photopolymer layer is irradiated with a reference laser beam and an object laser beam, thereby to record an interference fringe in the hologram material (photopolymer) on the basis of refractive index modulation. Specifically, an interference fringe having a desired surface pitch $\Lambda$ and a slant angle $\varphi$ is formed. More specifically, for example, the photopolymer may be irradiated with an object laser beam from a first predetermined direction on one side, and simultaneously, the photopolymer layer may be irradiated with a reference laser beam from a second predetermined direction on the other side, thereby recording an interference fringe formed by the object laser beam and the reference laser beam in the inside of the photopolymer layer. By appropriate selection of the first predetermined direction, the second predetermined direction, and wavelengths of the object laser beam and the reference laser beam, it is possible to obtain a desired surface pitch $\Lambda$ of the interference fringe in the photopolymer layer and a desired slant angle (inclination angle) $\varphi$ of the interference fringe. Here, the slant angle of the interference fringe means an angle that is formed between the surface of the diffraction grating member and the interference fringe. In the case where a plurality of photopolymer layers are formed, the photopolymer layers disposed on two sheets of glass plates may be allocated. For example, in the case where four photopolymer layers should be formed as a first diffraction grating member, two photopolymer layers may be disposed on one sheet of glass plate, whereby production stability of optical characteristics of the diffraction grating member can be secured. Then, the shock absorbing layer thus produced are sandwiched between the two sheets of glass plates, whereby an optical device can be obtained.

As the photopolymer material, any photopolymer material can be used so long as it includes at least a photopolymerizable compound, a binder resin and a photopolymerization initiator. As the photopolymerizable compound, there can be used known photopolymerizable compounds such as acrylic monomers, methacrylic monomers, styrene-based monomers, butadiene-based monomers, vinyl-based monomers, and epoxy-based monomers. These may be copolymers, and may be monofunctional compounds or polyfunctional compounds. Besides, these monomers may be used either singly or in plurality. As the binder resin, any known one can be used. Specific examples of the usable binder resin include cellulose acetate resins, acrylic resins, acrylic ester resins, methacrylic acid resins, epoxy resins, urethane resins, polypropylene resin, polyvinyl ether resin, polycarbonate resin, polyamide resins, polyvinyl acetate, vinyl chloride resins, urea resins, styrene resins, butadiene resins, natural rubber resins, polyvinyl carbazole, polyethylene glycol, phenolic resins, or their copolymers, and gelatin. As the photopolymerization initiator, any known one can be used. The photopolymerization initiators may be used either singly or in plurality, or may be used in combination with a plurality of or single photosensitizing coloring matter. Plasticizers, chain transfer agents and other additives may be added to the photopolymer layer, as required. As the material constituting the protective layer, any transparent material can be used, and the protective layer may be formed by coating or may be formed by laminating a preliminarily film-formed material on the photopolymer layer. Examples of the material constituting the protective layer include polyvinyl alcohol (PVA) resin, acrylic resin, polyurethane resin, polyethylene terephthalate (PET) resin, triacetyl cellulose (TAC) resin, polymethyl methacrylate (PMMA) resin, polypropylene resin, polycarbonate resin, and polyvinyl chloride resin.

Figure 25A:
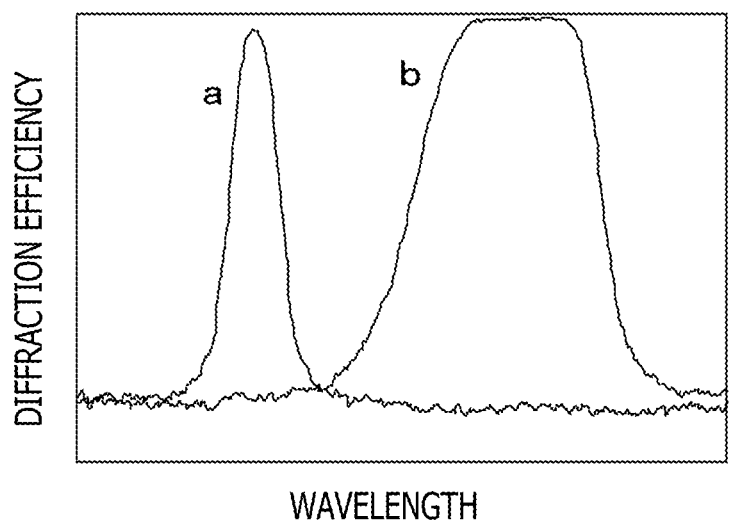
FIG. 25A is a graph depicting a state in which reproduction center wavelength (diffraction center wavelength) is shifted from a state of "A" to a state of "B" when a photosensitive material layer is irradiated with energy beams and then heated.
Figure 26:
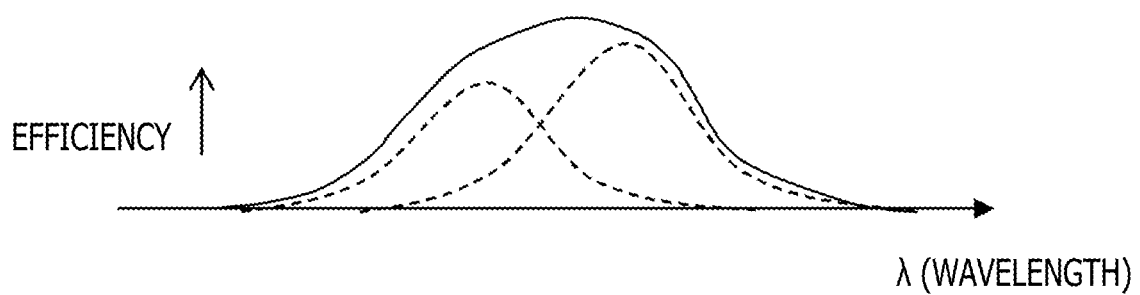
FIG. 26 is a diagram depicting schematically the relation between wavelength and efficiency, of a diffraction grating member obtained by laminating two photopolymer layers.

Alternatively, in a method of producing a diffraction grating member, a photopolymer layer is irradiated with a reference laser beam and an object laser beam, whereby an interference fringe is recorded in the hologram material (photopolymer) on the basis of refractive index modulation. Next, the photopolymer layer is irradiated with energy beam from one surface side of the photopolymer layer, whereby monomers in the photopolymer material that are left unpolymerized upon irradiation with laser are polymerized and fixed. Thereafter, heating is conducted, whereby the degree of refractive index modulation is amplified. In the heating, a change in the slant angle (inclination angle) of the interference fringe due to thermal stress occurs consequently to and simultaneously with the increase in the degree of refractive index modulation. In this change, the surface pitch value $\wedge$ at the surface of the photopolymer layer is preserved, and only the slant angle $\varphi$ is changed, so that reproduction center wavelength (diffraction center wavelength) is shifted from a state of "a" to a state of "b," as depicted in FIG. 25A. Thus, by irradiating the photopolymer layer with energy beam from one surface side of the photopolymer layer and then heating it, it is possible to cause the slant angles of the laminated photopolymer layers to be different, while maintaining the surface pitch value A at the surface of the photopolymer layer, an increase in the number of steps can be prevented from being caused, a high productivity is ensured, and a problem of formation of an undesired interference fringe in the diffraction grating member is prevented from occurring. Further, a problem of mixing-in of air bubbles or the like during the production process of the diffraction grating member is not liable to occur. In addition, since the photopolymer layers in a multilayer form can be easily produced, diffraction wavelength band of the diffraction grating member can be further broadened, and an increase in the brightness of the images on the image display device can be easily achieved. Note that where an interference fringe allowing for a shift amount of the reproduction center wavelength of the photopolymer layer is preliminarily recorded, a desired reproduction center wavelength (diffraction center wavelength) and a bandwidth thereof can be arbitrarily designed, as depicted in FIG. 26. Further, in producing an optical device by such a method, variability of characteristics is liable to be generated attendant on the increase in the number of laminated layers in the first deflection means and the second deflection means. In view of this, the deflection means is formed dividedly in two sheets of glass plates, whereby the number of laminated layers is reduced to ½ times the original, and a reduction in the variability of characteristics can be contrived. The deflection means thus completed are laminated on each other using a transparent resin constituting the shock absorbing layer to produce an optical device, whereby an optical device with stable characteristics can be obtained, and the yield in the production is enhanced. In addition, in producing deflection means differing in wavelength band, for example, blue-color and red-color deflection means, optical devices for respective wavelength bands may be produced, and thereafter they may be laminated on each other using a transparent resin constituting the shock absorbing layer, whereby the range of design is broadened.

Figure 25B:
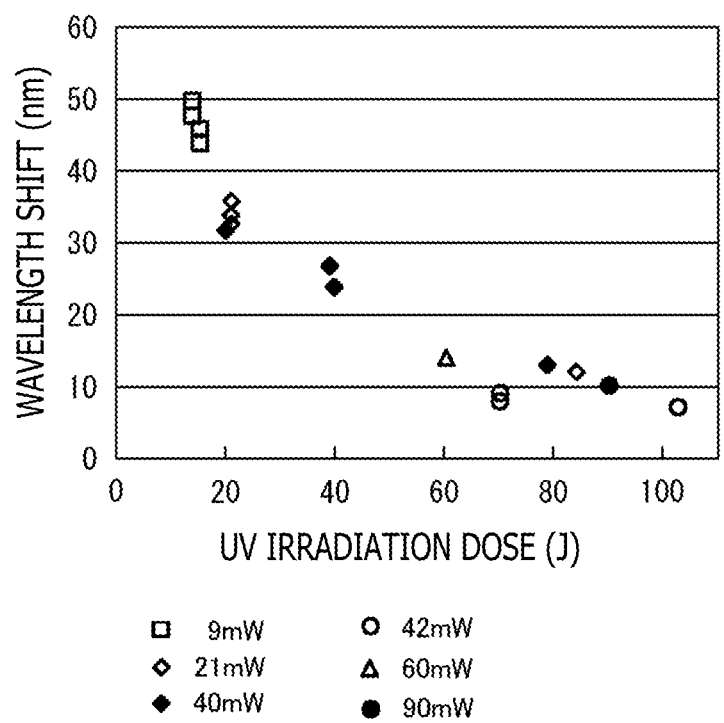
FIG. 25B is a graph depicting the relation between energy beam irradiation dose and variation in slant angle after heating.

Irradiation with energy beam may be conducted base on an appropriate method, according to an energy beam irradiation device (for example, a UV lamp) to be used. As for a heating method, also, an appropriate method may be employed such as the use of a heating lamp, the use of a hot plate, or the use of a heating oven. The heating temperature and heating time, also, may be determined appropriately, according to the material constituting the photosensitive material layer. Note that, in general, as the quantity of energy applied to the photosensitive material layer by irradiation with energy beam is larger, the change in the slant angle upon heating is smaller, as depicted in FIG. 25B. The wavelength of the UV rays to be used, irradiation energy, irradiation time and the like may be appropriately determined, depending on the characteristics of the photosensitive material.

Alternatively, the first deflection means may be configured to reflect the light incident on the laminated structure, whereas the second deflection means may be configured to transmit or reflect multiple times the light propagated through the inside of the laminated structure by total reflection. In this case, a configuration may be adopted in which the first deflection means functions as a reflective mirror, whereas the second deflection means functions as a semi-transmitting mirror. Specifically, the first deflection means may include, for example, a metal inclusive of alloy, may include a light reflective film (a kind of mirror) that reflects the light incident on the optical device, and may include a multilayer film in which a multiplicity of dielectric stacked films are laminated, a half-mirror, or a polarization beam splitter. In addition, the second deflection means may include a multilayer film in which a multiplicity of dielectric stacked films are laminated, a half-mirror, a polarization beam splitter, or a hologram diffraction grating film. While the first deflection means and the second deflection means are disposed in the inside of the first glass plate and the second glass plate (incorporated in the inside of the glass plates), the light incident on the laminated structure is reflected or diffracted at the first deflection means, such that the light incident on the laminated structure undergoes total reflection in the inside of the laminated structure. On the other hand, the light propagated through the inside of the laminated structure by total reflection is reflected or diffracted multiple times at the second deflection means, and is emitted from the laminated structure.

Alternatively, the optical device may be in the form of including a semi-transmitting mirror on which the light emitted from the image forming device is incident and from which the light is emitted toward the pupil of the viewer, or may be in the form of including a polarization beam splitter (PBS). In the former configuration, the light directly forms an image on the retina of the viewer. The semi-transmitting mirror or the polarization beam splitter constitutes a virtual image formation region of the optical device. A structure may be adopted in which the light emitted from the image forming device is propagated through air and is indent on the semi-transmitting mirror or the polarization beam splitter, or a structure may be adopted in which, for example, the light is transmitted through the inside of the glass plate and is incident on the semi-transmitting mirror or the polarization beam splitter. The semi-transmitting mirror or the polarization beam splitter may be attached to the image forming device through a transparent member, or the semi-transmitting mirror or the polarization beam splitter may be attached to the image forming device through a member different from a transparent member. Alternatively, the optical device may be in the form of including a prism on which the light emitted from the image forming device is incident and from which the light is emitted toward the pupil of the viewer.

A transparent protective member may be disposed for protection of the diffraction grating member. Specifically, an outer edge portion of the laminated structure and an outer edge portion of the transparent protective member may be sealed or adhered by a sealing member. As the sealing member called sealant, there can be used various resins of thermosetting type, photocuring type, moisture-curing type, anaerobic curing type or the like, such as epoxy resins, urethane resins, acrylic resins, vinyl acetate resins, ene-thiol resins, silicone resins, and modified polymer resins.

The first glass plate and the second glass plate each have two parallel surfaces (a first surface and a second surface) extending in parallel to an axis (which is a longitudinal direction and a horizontal direction, and corresponds to an X-axis direction) of the glass plate. Note that a width direction (a height direction, a vertical direction) of these glass plates corresponds to a Z-axis direction. An interference fringe of a hologram diffraction grating extends generally in parallel to the Z-axis direction. Examples of the glass constituting the first glass plate and the second glass plate include various including optical glass such as quartz glass, BK7, SK5, etc., soda lime glass (blue sheet glass), white sheet glass, borosilicate glass, various reinforced glasses and chemically treated glasses (for example, Gorilla (registered trademark) and EAGLE XG (registered trademark) made by Corning Incorporated). By a surface treatment, it is possible to increase the density of specific ions on the glass surface, and to reinforce the glass plate. The first glass plate and the second glass plate are not limited to a flat plate shape, but may have a curved surface shape.

In the display device or the like of the present disclosure that includes the above-described various preferable modes and configurations, the image forming device may be in the form of having a plurality of pixels arranged in a two-dimensional matrix pattern. Note that such a configuration of the image forming device is referred to, for convenience, as "the image forming device of the first mode."

Examples of the image forming device of the first mode include: an image forming device including a reflection type spatial light modulator and a light source; an image forming device including a transmission type spatial light modulator and a light source; an image forming device including organic EL (electroluminescence); an image forming device including inorganic EL; and an image forming device including semiconductor laser elements. Among these, preferred is the image forming device including organic EL, or the image forming device including the reflection type spatial light modulator and a light source. Examples of the spatial light modulator include light valves, for example, transmission type or reflection type liquid crystal display devices such as LCOS (Liquid Crystal On Silicon), and digital micromirror device (DMD). Examples of the light source include a light emitting element. Further, the reflection type spatial light modulator may include a liquid crystal display device and a polarization beam splitter which reflects part of the light from a light source to guide it to the liquid crystal display device and transmits part of the light reflected by the liquid crystal display device to guide it to an optical system (to be described later). Examples of the light emitting element constituting the light source include a red light emitting element, a green light emitting element, a blue light emitting element, and a white light emitting element. Alternatively, red light, green light and blue light emitted from the red light emitting element, the green light emitting element and the blue light emitting element may be mixed and uniformized in luminance by use of a light valve, thereby obtaining white light. Examples of the light emitting element include a semiconductor laser element, a solid-state laser, and an LED. The number of pixels may be determined based on the specifications required of the image forming device, and examples of the specific value of the number of pixels include 320×240, 432×240, 640×480, 854×480, 1024×768, and 1920×1080.

Alternatively, in the display device or the like of the present disclosure that includes the above-described preferable modes or configurations, the image forming device may be in the form of being provided with a light source, and scanning means for scanning the light emitted from the light source to form an image. Note that such a configuration of the image forming device is referred to, for convenience, as "the image forming device of the second mode."

Examples of a light source in the image forming device of the second mode include a light emitting element, specifically, a red light emitting element, a green light emitting element, a blue light emitting element, and a white light emitting element. Alternatively, red light, green light and blue light emitted from a red light emitting element, a green light emitting element and a blue light emitting element may be mixed and uniformized in luminance by use of a light valve to obtain white light. Examples of the light emitting element include a semiconductor laser element, a solid-state laser, and an LED. The number of pixels (virtual pixels) in the image forming device of the second mode may be determined based on the specifications required of the image display device, and examples of the specific value of the number of pixels (virtual pixels) include 320×240, 432×240, 640×480, 854×480, 1024×768, and 1920×1080. In addition, in the case where color image display is performed and where a light source includes a red light emitting element, a green light emitting element and a blue light emitting element, it is preferable to perform color synthesis by use of a cross prism, for example. Examples of the scanning means include a MEMS (Micro Electro Mechanical Systems) mirror or a Galvano mirror having, for example, a two-dimensionally rotatable micromirror by which the light emitted from the light source is scanned horizontally and vertically.

In the image forming device of the first mode or the image forming device of the second mode, light converted into parallel light by an optical system (an optical system for converting emitted light into parallel light, that may be called "parallel light emitting optical system," and is specifically, for example, a collimating optical system or a relay optical system) is incident on the laminated structure. In this case, such necessity of being parallel light is based on the necessity that information regarding optical wavefront upon incidence of light on the laminated structure should be preserved even after emission from the laminated structure through the first deflection means and the second deflection means. Note that for producing parallel light, specifically, for example, a light emitting portion of the image forming device may be located, for example, at the place (position) of a front-side focus in the parallel light emitting optical system. The parallel light emitting optical system has a function of converting position information regarding pixels into angle information in the optical system of the optical device. Examples of the parallel light emitting optical system include an optical system having a positive optical power as a whole that includes one of or a combination of convex lens, concave lens, free curved surface prism, and hologram lens. Between the parallel light emitting optical system and the laminated structure, a light shielding section having an opening may be disposed to prevent undesired light from being emitted from the parallel light emitting optical system to be incident on the laminated structure.

That surface of the laminated structure which faces the image forming device is referred to as a first surface (specifically, the second surface of the first glass plate corresponds thereto), and that surface of the laminated structure which is opposite to the first surface of the laminated structure is referred to as a second surface (specifically, the second surface of the second glass plate corresponds thereto). The image forming device and the viewer are located on the first surface side of the laminated structure. A configuration may be adopted in which the image forming device is located on the second surface side of the laminated structure and the viewer is located on the first surface side of the laminated structure.

In the display device or the like of the present disclosure or the optical device or the like of the present disclosure, a configuration may be adopted in which a light shielding member is disposed on the outside of the second surface of the laminated structure in such a manner as to cover the first deflection means or the like. In this case, a configuration may be adopted in which an orthogonal projection image of the first deflection means onto the laminated structure is included in an orthogonal projection image of the light shielding member onto the laminated structure.

Alternatively, in the display device or the like of the present disclosure or the optical device or the like of the present disclosure, a configuration may be adopted in which a light shielding member for blocking incidence of external light on the optical device is disposed in a region of the optical device where the light emitted from the image forming device is incident. Where the light shielding member for blocking incidence of external light on the optical device is disposed in the region of the optical device where the light emitted from the image forming device is incident, the external light is prevented from entering the region of the optical device where the light emitted from the image forming device is incident. Therefore, a situation in which undesired stray light or the like is generated and image display quality of the display device is thereby lowered is prevented from occurring. Note that it is preferable to adopt a mode in which the region of the optical device where the light emitted from the image forming device is incident is included in the orthogonal projection image of the light shielding member onto the optical device.

Specifically, the light shielding member may be disposed on the second surface side of the laminated structure, spaced from the optical device. In the display device with such a configuration, the light shielding member may be produced from a transparent plastic material, for example. In addition, such a light shielding member may extend integrally from a housing of the image display device or be attached to the housing of the image display device, or may extend integrally from a frame or be attached to the frame. Alternatively, the light shielding member may be attached to the optical device or may be attached to or disposed on a portion of the optical device on the side opposite to the side on which the image forming device is disposed; or, the light shielding member may be disposed on a light controller which will be described below. In this case, it is preferable that an orthogonal projection image of an end portion of the light controller onto the optical device is included in an orthogonal projection image of the light shielding member onto the optical device. The light shielding member including an opaque material may be formed on a surface of the optical device by, for example, a physical vapor deposition method (PVD method) or a chemical vapor deposition method (CVD method), or may be formed by a printing method or the like. Alternatively, a film, sheet or foil including an opaque material (plastic material, metallic material, alloy material or the like) may be adhered. It is preferable that the orthogonal projection image of an end portion of the light controller onto the optical device is included in the orthogonal projection image of the light shielding member onto the optical device.

The light controller may be disposed on the second surface side of the laminated structure. The light controller may include, for example, a first substrate, a second substrate that faces the first substrate, a first transparent electrode provided on that surface of the first substrate which faces the second substrate, a second transparent electrode provided on that surface of the second substrate which faces the first substrate, and a light controlling layer sandwiched between the first transparent electrode and the second transparent electrode. Beside, in this case, for example, a mode may be adopted in which:

the first transparent electrode includes a plurality of belt-shaped first transparent electrode segments extending in a first direction;

the second transparent electrode includes a plurality of belt-shaped second transparent electrode segments extending in a second direction different from the first direction; and control of light shielding ratio of that portion of the light controller which corresponds to a region where the first transparent electrode segment and the second transparent electrode segment overlap with each other (a minimum unit region where the light shielding ratio of the light controller varies) is conducted based on control of a voltage or voltages impressed on the first transparent electrode segment and the second transparent electrode segment. In other words, control of the light shielding ratio can be performed based on a simple matrix system. A mode in which the first direction and the second direction are orthogonal to each other may be mentioned as an example.

Alternatively, for control of the light shielding ratio of the minimum unit region where the light shielding ratio of the light controller varies, thin film transistors (TFTs) may be provided respectively in the minimum unit regions. In other words, the control of the light shielding ratio may be carried out based on an active matrix system. Alternatively, at least one of the first transparent electrode and the second transparent electrode may be a so-called solid electrode (a non-patterned electrode).

The laminated structure may serve also as the first substrate. With such a configuration, a reduction in the weight of the display device as a whole can be contrived, and a situation where the user of the display device feels uncomfortable is prevented from occurring. The second substrate may be thinner than the first substrate. In the display device provided with the light controller, the size and position of a region where light control of the light controller is actually effective are determined based on a signal for displaying an image in the image forming device. The size of the light controller may be the same as, greater than or smaller than the size of the laminated structure. It is essential that the second deflection means (or the virtual image formation region) is located within the orthogonal projection image of the light controller.

A configuration may be adopted in which the maximum light transmittance of the light controller is not less than 50%, and the minimum light transmittance of the light controller is not more than 30%. Note that 99% may be mentioned as an upper limit for the maximum light transmittance of the light controller, and 1% may be mentioned as a lower limit for the minimum light transmittance of the light controller. Here, a relation of:

(Light transmittance)=1−(Light-shielding ratio)

exists.

In some cases, a configuration may be adopted in which light passing through the light controller is colored in a desired color by the light controller. In this case, the color in which the light is colored by the light controller may be variable, or the light in which the light is colored by the light controller may be fixed. Note that in the former case, a light controller for coloring in red, a light controller for coloring in green and a light controller for coloring in blue may be laminated. In the latter case, the color in which the light is colored by the light controller is not restricted, and may be, for example, brown.

Further, in some cases, the light controller may be disposed to be attachable and detachable. In order to dispose the light controller in an attachable and detachable manner, for example, the light controller may be attached, for example, to a frame by use of a small screw or screws made from transparent plastic, or a frame may be formed with a groove and the light controller may be engaged with the groove, or a magnet is attached to a frame and the light controller may be attached to the frame, or a frame may be provided with a slide portion and the light controller may be fitted to the slide portion. In addition, a connector may be attached to the light controller, and the light controller may be electrically connected to a control circuit (for example, included in the control device for controlling the image forming device and a moving device) for controlling the light shielding ratio (light transmittance) of the light controller through the connector and wiring. The light controller may be bent.

In the display device or the like of the present disclosure that is provide with the light controller, a mode may be adopted in which the display device or the like is provided further with an environmental illuminance measuring sensor for measuring the environmental illuminance in the environment where the display device is disposed, and the light shielding ratio of the light controller is controlled based on the result of measurement by the environmental illuminance measuring sensor. Alternatively, a mode may be adopted in which the display device or the like is provided further with an environmental illuminance measuring sensor for measuring the environmental illuminance in the environment where the display device is disposed, and the luminance of an image formed by the image forming device is controlled based on the result of measurement by the environmental illuminance measuring sensor. These modes may be combined with each other.

Alternatively, in the display device or the like of the present disclosure that is provided with the light controller, a mode may be adopted in which the display device or the like is provided further with a transmitted light illuminance measuring sensor for measuring the illuminance based on the light transmitted through the light controller from an external environment, and the light shielding ratio of the light controller is controlled based on the result of measurement by the transmitted light illuminance measuring sensor. Alternatively, a mode may be adopted in which the display device or the like is provided further with a transmitted light illuminance measuring sensor for measuring the illuminance based on the light transmitted through the light controller from an external environment, and the luminance of an image formed by the image forming device is controlled based on the result of measurement by the transmitted light illuminance measuring sensor. Note that it is desirable for the transmitted light illuminance measuring sensor to be disposed on the viewer's side as compared to the optical device. At least two transmitted light illuminance measuring sensors may be disposed to measure the illuminance based on the light transmitted through a portion of a high light shielding ratio and to measure the illuminance based on the light transmitted through a portion of a low light shielding ratio. Furthermore, these modes may be combined with the mode in which the control is conducted based on the result of measurement by the above-mentioned environmental illuminance measuring sensor.

The environmental illuminance measuring sensor and the transmitted light illuminance measuring sensor may include a known illuminance sensor, and control of the environmental illuminance measuring sensor and the transmitted light illuminance measuring sensor may be conducted based on a known control circuit.

As aforementioned, the optical device is of a semi-transmitting type (see-through type). Specifically, at least that portion of the optical device which faces the eyeball (pupil) of the viewer is made to be semi-transmitting (see-through), and an exterior can be viewed through this portion of the optical device (and, further, through the light controller, in the case where the light controller is arranged). The display device or the like of the present disclosure may be provided with one image display device (monocular type) or may be provided with two image display devices (binocular type). In the case where the light controller is arranged, in the binocular type, the light transmittance in a partial region of the light controllers in both image display devices may be varied, or the light transmittance in a partial region of the light controller in one of the image display devices may be varied, based on a signal for displaying an image. Note that while the term "semi-transmitting" may be used herein, this term does not mean that one half (50%) of the incident light is transmitted or reflected, but means that part of the incident light is transmitted and the remainder is reflected.

The frame is provided with a front section disposed in front of the viewer, and two temple sections rotatably attached to both ends of the front section through hinges. Note that a modern section is attached to a tip portion of each temple section. The front section may have a rim. The image display device is mounted to the frame, and, specifically, the image forming device may be mounted to the temple section. In addition, a configuration may be adopted in which the front section and the two temple sections are integral. In other words, when the display device or the like of the present disclosure is viewed as a whole, the frame generally has substantially the same structure as that of ordinary spectacles. The materials constituting the frame inclusive of a pad section may be the same as the materials constituting ordinary spectacles, such as metals, alloys, plastics, and combinations thereof. Further, a configuration may be adopted in which a nose pad is attached to the front section. In other words, when the display device or the like of the present disclosure is viewed as a whole, an assembly of the frame (which may include a rim) and a nose pad has substantially the same structure as that of ordinary spectacles. The nose pad may have a known configuration or structure.

In the case where a light controller is provided, the light controller may be disposed at the front section. In addition, the optical device may be mounted to the light controller. Note that the optical device may be mounted to the light controller in a close contact state, or may be mounted to the light controller with a gap therebetween. Besides, the light controller may be fitted into the rim. Alternatively, at least one of the first substrate and the second substrate may be attached to the frame, for example. It is to be noted that these are not restrictive. The optical device and the light controller may be disposed in this order from the viewer's side, or the light controller and the optical device may be disposed in this order from the viewer's side.

From the viewpoint of design of the display device or ease of wearing thereof, a mode is desirably adopted in which wirings (signal line, power line, etc.) from one or two image forming devices extend from tip portions of the modern sections to the exterior through the temple sections and the modern sections, and are connected to a control device (control circuit or control means). Further, a mode is desirably adopted in which each image forming device is provided with a headphone section, and a headphone section wiring from each image forming device extends from a tip portion of the modern section to the headphone section through the inside of the temple section and the modern section. Examples of the headphone section include an inner ear type headphone section, and a canal type headphone section. A mode is preferably adopted in which more specifically, the headphone section wiring extends from a tip portion of the modern section to the headphone section while going around the rear side of the auricle (earconch). In addition, a configuration may be adopted in which an imaging device is mounted to a central portion of the front section. Specifically, the imaging device includes a solid-state imaging element including a CCD or CMOS sensor, and a lens. A wiring from the imaging device may be connected to the image display device (or the image forming device) on one side through the front section, for example, and may further be incorporated in the wiring extending from the image display device (or the image forming device). The imaging device may be mounted to a central portion or an end portion of the frame, or may be mounted to the temple section.

Alternatively, in the case where the display device or the like of the present disclosure is of binocular type, a configuration may be adopted in which:

the laminated structure as a whole is disposed on the side of the center of the viewer's face as compared to the image forming device;

a coupling member for coupling the two image display devices is further provided;

the coupling member is attached to the side facing the viewer, of a central portion of the frame that is located between the two pupils of the viewer; and a projection image of the coupling member is included in a projection image of the frame.

Owing to the structure in which the coupling member is thus attached to the central portion of the frame that is located between the two pupils of the viewer, that is, where the image display devices are not mounted directly to the frame, an advantage can be obtained. Even if the temple sections are spread outward, upon wearing of the frame onto the viewer's head, with the result of deformation of the frame, such a frame deformation would produce no or extremely little displacement (change in position) of the image forming device or the laminated structure. Therefore, the angle of convergence of the left and right images can be securely prevented from being changed. Moreover, since it is unnecessary to enhance the rigidity of the front section of the frame, there is no possibility of causing an increase in the weight of the frame, a lowering in design properties, or a rise in cost. In addition, since the image display device is not mounted directly to the frame, the design, color and the like of the frame can be freely selected according to the viewer's taste, and there are few limitations on the design of the frame, so that the degree of freedom in design is high. In addition, the coupling member is disposed between the viewer and the frame, and the projection image of the coupling member is included in the projection image of the frame. In other words, when the head mounted display is viewed from the front side of the viewer, the coupling member is hidden behind the frame. Accordingly, high design properties can be imparted to the head mounted display.

Note that a configuration is preferred in which the coupling member is attached to the side of facing the viewer, of the central portion (corresponding to a bridge portion of ordinary spectacles) of the front section that is located between the two pupils of the viewer.

While the two image display devices are coupled by the coupling member, specifically a mode may be adopted in which the image forming device is mounted to each end portion of the coupling member in such a manner that the mounted state is adjustable. In this case, a configuration is preferred in which each image forming device is located on the outer side than the viewer's pupil. Further, in such a configuration, let the distance between the center of the mounting portion of the image forming device on one side and one end portion (rim lock, or end piece, on one side) of the frame be $\alpha$, let the distance from the center of the coupling member to the end portion (rim lock on one side) of the frame be $\beta$, let the distance between the center of the mounting portion of the image forming device on the other side and the one end portion (rim lock on one side) of the frame be $\gamma$, and let the length of the frame be L, then it is desirable that $\alpha$ satisfies $0.01 \times L \leq \alpha \leq 0.30 \times L$, preferably $0.05 \times L \leq \alpha \leq 0.25 \times L$, $\beta$ satisfies $0.35 \times L \leq \beta \leq 0.65 \times L$, preferably $0.45 \times L \leq \beta \leq 0.55 \times L$, and $\gamma$ satisfies $0.70 \times L \leq \gamma \leq 0.99 \times L$, preferably $0.75 \times L \leq \gamma \leq 0.95 \times L$. The mounting of the image forming device to each end portion of the coupling member is specifically conducted, for example, by providing each end portion of the coupling member with through-holes at three positions, providing the image forming device with screw engagement portions corresponding to the through-holes, passing a small screw through each through-hole, and making screw engagement with the screw portion provided in the image forming device. A spring is inserted between the small screw and the screw engagement portion. In this way, the mounted state of the image forming device (the inclination of the image forming device relative to the coupling member) can be adjusted by regulating the fastened state of the small screws.

Here, the center of the mounting portion of the image forming device refers to a midpoint, along the axial direction of the frame, of a part where a projection image of the image forming device obtained when the image forming device and the frame are projected onto a virtual plane and a projection image of the frame overlap with each other, in a state in which the image forming device is mounted to the coupling member. In addition, the center of the coupling member refers to a midpoint, along the axial direction of the frame, of a part where the coupling member is in contact with the frame, in a state in which the coupling member is mounted to the frame. The length of the frame is the length of a projection image of the frame, in the case where the frame is curved. Note that the direction of projection is the direction perpendicular to the viewer's face.

Alternatively, while the two image display devices are coupled by the coupling member, specifically a mode may be adopted in which the coupling member couples the two laminated structures. Note that the two laminated structures may be integrally fabricated, and, in such a case, the coupling member is attached to the integrally fabricated laminated structure, which mode is also included in the mode in which the coupling member couples the two laminated structures. Let the distance between the center of the image forming device on one side and one end portion of the frame be $\alpha'$, and let the distance between the center of the image forming device on the other hand and the one end portion of the frame be $\gamma'$, then the values of $\alpha'$ and $\gamma'$ are desirably the same as the aforementioned values of $\alpha$ and $\gamma$.

Note that the center of the image forming device refers to the midpoint, along the axial direction of the frame, of the part where the projection image of the image forming device obtained by projecting the image forming device and the frame onto a virtual plane and the projection image of the frame overlap with each other, in a state in which the image forming device is mounted to the laminated structure.

The shape of the coupling member is essentially arbitrary, so long as the projection image of the coupling member is included in the projection image of the frame, and examples of the shape include a rod-like shape and an elongated plate-like shape. Examples of the material constituting the coupling member include metals, alloys, plastics, and combinations thereof.

In the display device or the like of the present disclosure, a signal for displaying an image on the image display device (a signal for forming a virtual image in the optical device) may be received from the exterior. In such a mode, information or data on an image to be displayed on the image display device may be recorded, stored or preserved in, for example, a so-called cloud computer or server. Where the display device is provided with communication means, for example, a mobile phone or smart phone, or where the display device and communication means are combined with each other, it is thereby possible to transfer or exchange various kinds of information or data between the cloud computer or server and the display device, and to receive the signal for displaying an image on the image display device (the signal for forming a virtual image in the optical device). Alternatively, the signal for displaying an image on the image display device (the signal for forming a virtual image in the optical device) may be stored in the display device. Note that the image displayed on the image display device includes various kinds of information and various kinds of data. Alternatively, a configuration may be adopted in which the display device is provided with an imaging device, an image picked up by the imaging device is outputted through communication means to a cloud computer or server, various kinds of information or data corresponding to the image picked up by the imaging device are searched at the cloud computer or server, and the various kinds of information or data thus searched are displayed as an image or images on the image display device.

When the image picked up by the imaging device is outputted through the communication means to the cloud computer or server, the image picked up by the imaging device may be displayed on the image display device and confirmed in the optical device. Specifically, a mode may be adopted in which an outer edge of a spatial region imaged by the imaging device is displayed in a frame form in the light controller. Alternatively, a mode may be adopted in which the light shielding ratio of a region of the light controller that corresponds to the spatial region to be imaged by the imaging device is set higher than the light shielding ratio of a region of the light controller that corresponds to the outside of the spatial region to be imaged by the imaging device. In such a mode, the spatial region to be imaged by the imaging device appears darker than the outside of the spatial region to be imaged by the imaging device, to the viewer. Alternatively, a mode may be adopted in which the light shielding ratio of the region of the light controller that corresponds to the spatial region to be imaged by the imaging device is set lower than the light shielding ratio of the region of the light controller that corresponds to the outside of the spatial region to be imaged by the imaging device. In such a mode, the spatial region to be imaged by the imaging device appears brighter than the outside of the spatial region to be imaged by the imaging device, to the viewer. As a result, the viewer can easily and reliably recognize what part of the exterior the imaging device is going to image.

It is preferable to correct the position of the region of the light controller that corresponds to the spatial region to be imaged by the imaging device. Specifically, where the display device is provided with, for example, a mobile phone or a smart phone, or where the display device is combined with a mobile phone, smart phone or personal computer, the spatial region imaged by the imaging device can be thereby displayed on the mobile phone, smart phone or personal computer. In the case where there is a difference between the spatial region displayed on the mobile phone, smart phone or personal computer and the region of the light controller corresponding to the spatial region to be imaged by the imaging device, the region of the light controller corresponding to the spatial region to be imaged by the imaging device may be moved, rotated or magnified/reduced by use of a control circuit for controlling the light shielding ratio (light transmittance) of the light controller (the control circuit may be substituted by the mobile phone, smart phone or personal computer), thereby eliminating the difference between the spatial region displayed on the mobile phone, smart phone or personal computer and the region of the light controller that corresponds to the spatial region to be imaged by the imaging device.

The display device or the like of the present disclosure that includes the above-described various modifications can be used, for example, for: receiving and displaying electronic mails, displaying various kinds of information in various sites on the Internet, displaying various kinds of descriptions, symbols, signs, marks, emblems, designs and so on relating to the operation, maintenance, disassembly and so on of observation targets such as various apparatuses; displaying various kinds of descriptions, symbols, signs, marks, emblems, designs and so on relating to observation targets such as persons or goods; displaying video or still images; displaying subtitles for movies and so on; displaying explanatory text and closed captions relating to an image synchronous with the image; and displaying various descriptions, explanatory text and so on for explaining the content, progress, background and so on of observation targets such as plays, kabuki plays, noh plays, kyogen plays, operas, concerts, ballets, various theatrical performances, amusement parks, museums, sightseeing spots, holiday resorts, sightseeing guides and so on, and can be used for displaying of closed captions. In plays, kabuki plays, noh plays, kyogen plays, operas, concerts, ballets, various theatrical performances, amusement parks, museums, sightseeing spots, holiday resorts, sightseeing guides and so on, text in the form of images relating to the observation targets need only be displayed on the image display device at appropriate timings. Specifically, for example, an image control signal is outputted to the display device, according to the progress of the movie or the like, or according to the progress of a play or the like, based on a predetermined schedule or time allocation, by manipulation of the worker or under control of a computer or the like, whereby an image is displayed on the display device. When various descriptions relating to observation targets such as various apparatuses, persons or goods are displayed, it is possible to display such various descriptions relating to the observation targets such as various apparatuses, persons or goods prepared in advance on the image display device by imaging the observation targets such as various apparatuses, persons or goods by the imaging device and analyzing the content of the picked-up image in the display device.

The image signal to the image forming device may include not only an image signal (e.g., character data) but also luminance data (luminance information) and/or chromaticity data (chromaticity information) relating to an image to be displayed. The luminance data may be luminance data corresponding to the luminance of a predetermined region including an observation target as viewed through the optical device, and the chromaticity data may be chromaticity data corresponding to the chromaticity of a predetermined region including an observation target as viewed through the optical device. With the luminance data relating to an image thus included, it is possible to control the luminance (brightness) of the image to be displayed. With the chromaticity data relating to an image thus included, it is possible to control the chromaticity (color) of the image to be displayed. With the luminance data and chromaticity data relating to an image thus included, it is possible to control the luminance (brightness) and the chromaticity (color) of the image to be displayed. In the case of the luminance data corresponding to the luminance of a predetermined region including an observation target as viewed through the image display device, the luminance data need only be set such that the value of the luminance of the image is higher (in other words, such that the image is displayed to be brighter) as the value of the luminance of the predetermined region including the observation target as viewed through the image display device is higher. In addition, in the case of the chromaticity data corresponding to the chromaticity of a predetermined region including an observation target as viewed through the image display device, the value of the chromaticity data need only be set such that the chromaticity of the predetermined region including the observation target as viewed through the image display device and the chromaticity of the image to be displayed are roughly in a complementary color relationship. The complementary color refers to a combination of colors in the relationship of being located exactly opposite to each other in the color circle. The complementary color also means a color that is complementary to another color, such as green to red, purple to yellow, and orange to blue. The complementary colors also refer to a color and another color which, when mixed in an appropriate ratio, cause a lowering in saturation, such as producing white in the case of light and producing black in the case of objects. However, the complementary property of visual effect in the case of placing colors side by side and the complementary property in the case of mixing colors differ from each other. The complementary color is also called contrasting color or opposite color. It is to be noted that the opposite color directly refers to the color to which the complementary color is opposed, whereas the complementary color refers to a wider range of color. A combination of complementary colors has a synergistic effect of mutually emphasizing the colors, which is called complementary color harmony.

By the display device or the like of the present disclosure, it is possible to configure a head mount display (HMD), for example. By this, it is possible to contrive reductions in weight and size of a display device, to largely reduce uncomfortable feeling when the display device is worn, and, further, to contrive a reduction in production cost. The display device or the like of the present disclosure can also be used as a stereoscopic vision display device. In this case, a polarizing plate or polarizing film need only be detachably attached to the optical device, or a polarizing plate or polarizing film need only be adhered to the optical device, as required.

Example 1

Figure 2:
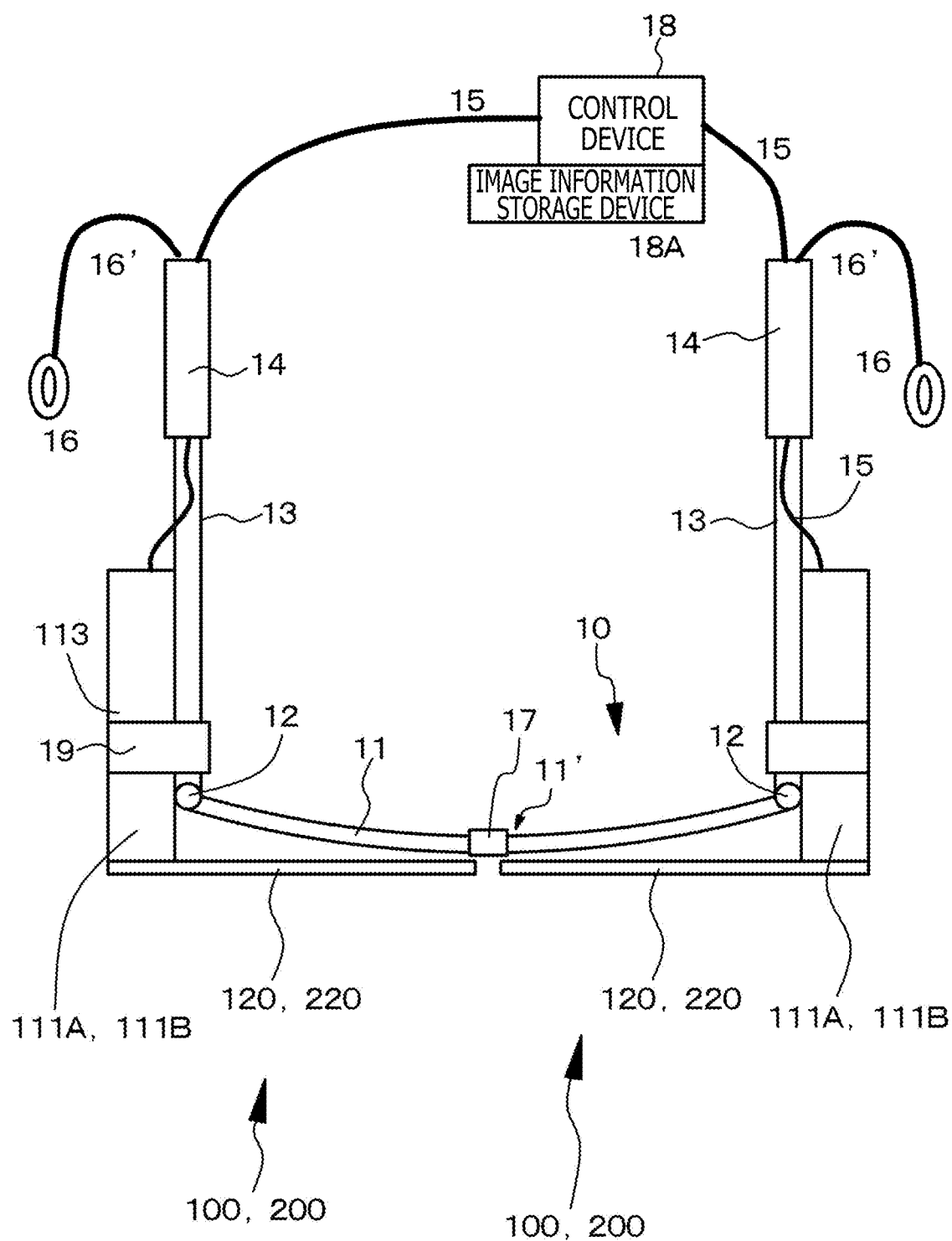
FIG. 2 is a schematic view, as viewed from above, of the display device of Example 1.
Figure 3:
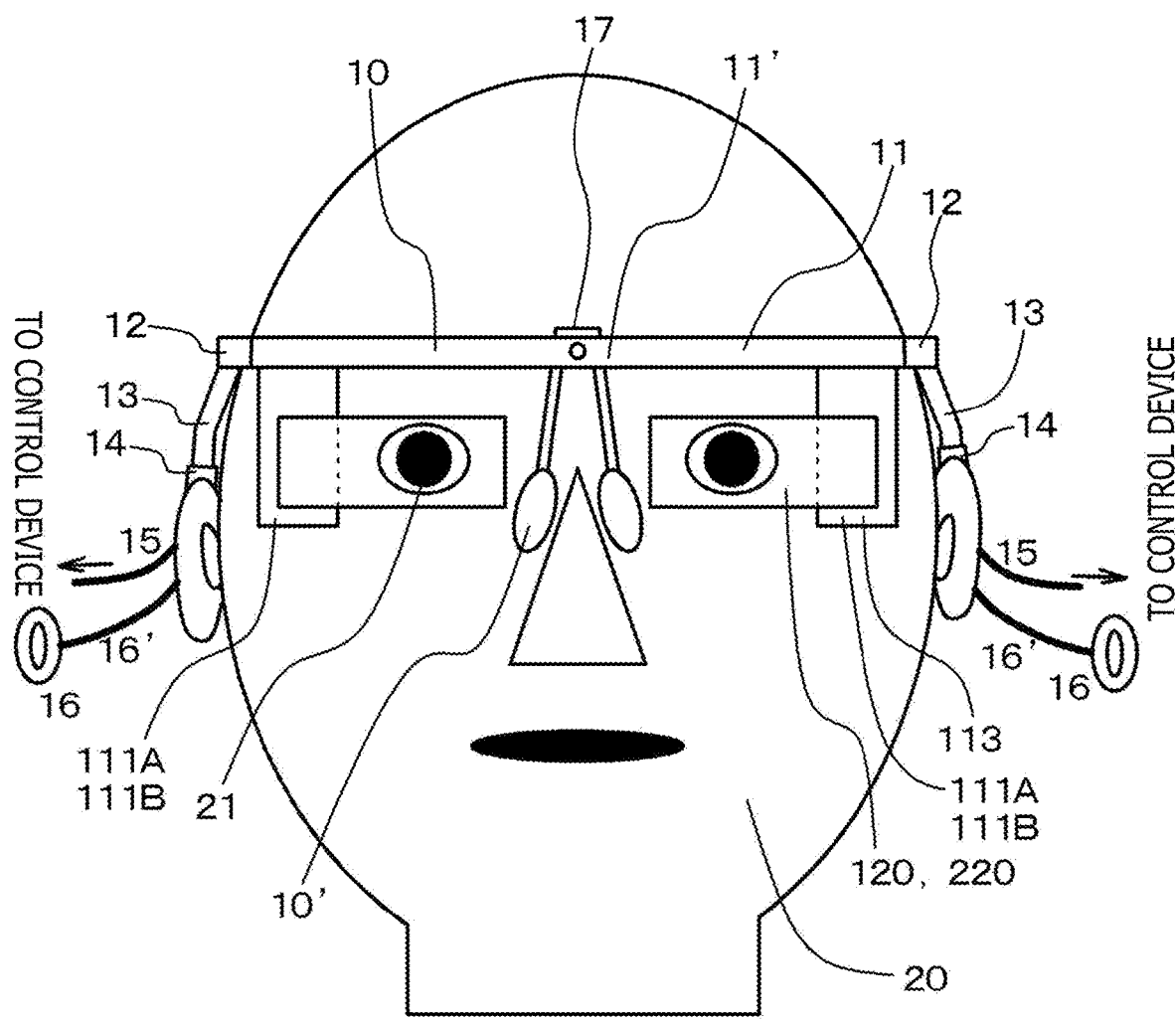
FIG. 3 is a schematic view, as viewed from a front side, of the display device of Example 1.
Figure 4A:
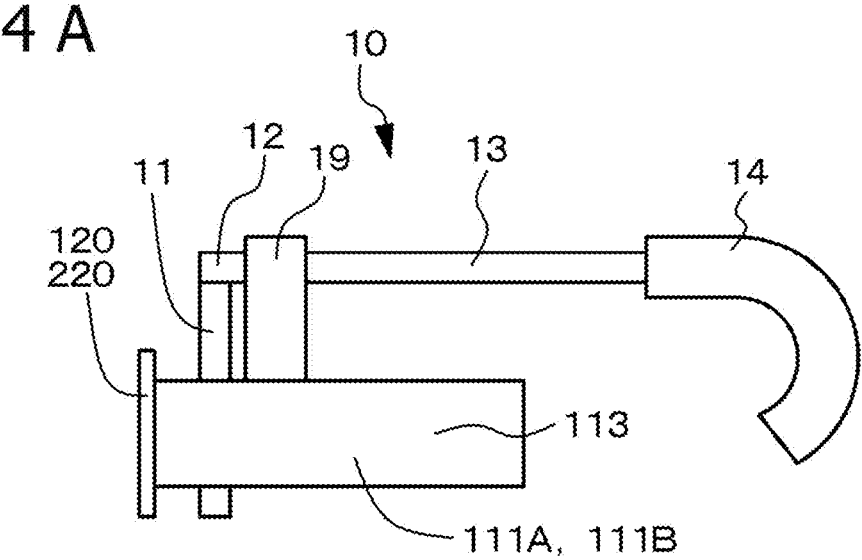
FIGS. 4A, 4B and 4C are a schematic view, as viewed from a lateral side, of the display device of Example 1, a figure depicting schematically a light propagation state in a laminated structure constituting an image display device, and a schematic sectional view depicting in an enlarged form a part of a reflection type volume hologram diffraction grating, respectively.
Figure 4B:
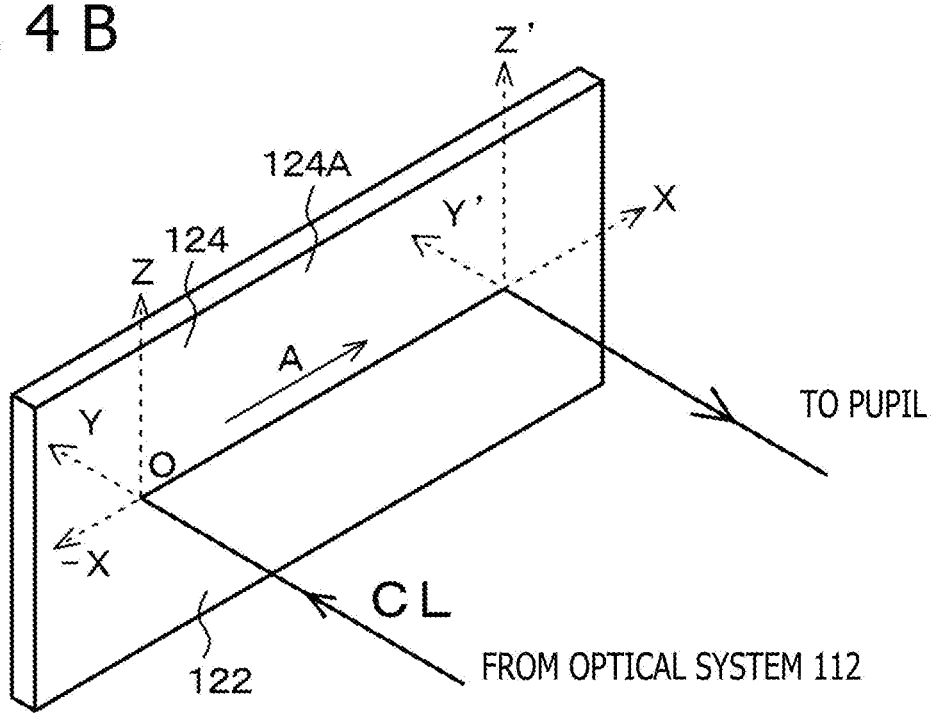
Figure 4C:
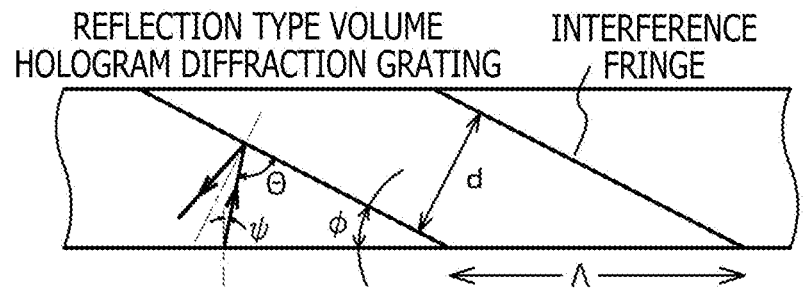
Figure 6A:
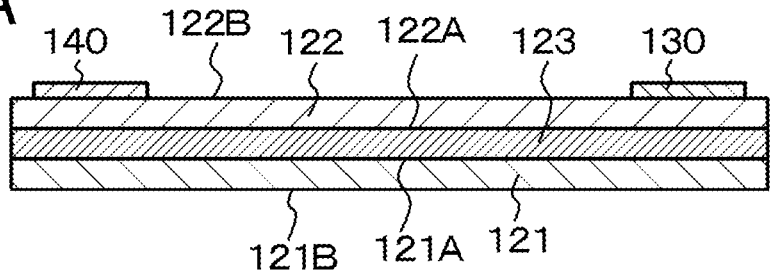
FIGS. 6A, 6B, 6C, 6D and 6E are conceptual figures of image display devices in display devices of Example 1, Example 3, Example 4, Example 5 and Example 6, respectively.

Example 1 relates to a display device (specifically, head mounted display, HMD) of the present disclosure, specifically to the display device of the first configuration and the image forming device of the first mode of the present disclosure. Conceptual figures of the image display device of Example 1 are depicted in FIGS. 1 and 6A; a schematic view, as viewed from above, of the display device of Example 1 is depicted in FIG. 2 and a schematic view of the same as viewed from the front side is depicted in FIG. 3; a schematic view, as viewed from a lateral side, of the display device of Example 1 is depicted in FIG. 4A; a light propagation state in a laminated structure constituting the image display device is schematically depicted in FIG. 4B; and a schematic sectional view depicting, in an enlarged form, a part of a reflection type volume hologram diffraction grating is depicted in FIG. 4C. Note that in some cases, hatching to the laminated structure is omitted, in the conceptual figure of the image display device.

The display device in Example 1 or in Examples 2 to 15 described later is specifically a head mounted display (HMD) that is provided with:

(A) a frame 10 (for example, a spectacles type frame 10) worn on a head of a viewer 20; and (B) an image display device 100, 200, or 300 mounted to the frame 10. Note that while the display device in Example 1 or in Examples 2 to 15 described later is specifically of the binocular type provided with two image display devices, the display device may be of the monocular type provided with one image display device. Image forming devices 111A and 111B (hereinafter, the image forming devices 111A and 111B may be generically referred to as "the image forming device 111") display, for example, a monochromatic (e.g., green) image (virtual image). The image display device 100, 200, or 300 in Example 1 or in Examples 2 to 15 described later is provided with:

(B-1) the image forming device 111; and (B-2) an optical device 120, 220, 320, or 330 that forms a virtual image based on light emitted from the image forming device 111, in which the light from the image forming device 111 enters a pupil 21 of a viewer 20 through the optical device 120, 220, 320, or 330.

The optical device 120, 220, 320, or 330 is provided at least with:

a first glass plate 121;

a second glass plate 122 that faces the first glass plate 121; and a shock absorbing layer (shock relaxing layer, adhesive layer) 123 sandwiched between the first glass plate 121 and the second glass plate 122. Further, in the display device in Example 1 or in Examples 2 to 15 described later, (B-3) an optical system (parallel light emitting optical system) 112 by which light emitted from the image forming device 111 is converted into parallel light is provided, as required, and the light flux converted into the parallel light by the optical system 112 is incident on the optical device 120, 220, 320, or 330, is guided and is emitted.

Note that the image display device 100, 200, or 300 may be fixedly mounted, or may be detachably mounted, to the frame 10. Here, the optical system 112 is disposed between the image forming device 111 and the optical device 120, 220, 320, or 330. The light flux converted into the parallel light by the optical system 112 is incident on the optical device 120, 220, 320, or 330, is guided and is emitted. In addition, the optical device 120, 220, 320, or 330 is of a semi-transmitting type (see-through type). Specifically, at least those portions of the optical device which face both eyes of the viewer 20 (more specifically, a laminated structure 124 and second deflection means 140 or 240 which will be described later) are semi-transmitting (see-through).

In the display device in Example 1 or in Examples 2 to 15 described later, the shock absorbing layer 123 including a UV-curing resin (acrylic resin, trade name: SVR1150, elastic modulus: 0.25 to 0.69 MPa) made by Dexerials Corporation or "HARDLOC OP/UV" made by Denka Co., Ltd. is sandwiched between the first glass plate 121 and the second glass plate 122 on a whole surface basis. The first glass plate 121 and the second glass plate 122 each include a reinforcement-treated blue glass plate having a thickness of 0.5 mm. Note that the shock absorbing layer 123 may be in the form of being sandwiched between an effective region of the first glass plate 121 (a region exclusive of a peripheral portion of the first glass plate 121, or a region where the first glass plate 121 guides light) and an effective region of the second glass plate 122 (a region exclusive of a peripheral portion of the second glass plate 122, or a region where the second glass plate 122 guides light). The refractive index of the material constituting the shock absorbing layer 123 is 1.45 to 1.65 (specifically, 1.48), while the refractive index of the material constituting the first glass plate 121 and the second glass plate 122 is specifically 1.51, with the difference between these refractive indexes being not more than 0.1.

In the display device in Example 1 or in Examples 2 to 7 or Examples 10 to 15 described later, the optical device 120 or 220 is provided further with deflection means, and the light from the image forming device 111 is deflected at the deflection means, is propagated by total reflection through the inside of the laminated structure 124 including the first glass plate 121, the shock absorbing layer 123 and the second glass plate 122, is deflected at the deflection means, and enters the pupil 21 of the viewer 20. The deflection means includes a plurality of hologram diffraction gratings.

The first glass plate 121 and the second glass plate 122 are disposed in this order from the viewer's side. In addition, the hologram diffraction grating specifically includes a reflection type hologram diffraction grating, and, more preferably, it includes a reflection type volume hologram diffraction grating. The reflection type volume hologram diffraction grating has a single diffraction grating layer (a single photopolymer layer), unless otherwise specified. The diffraction grating layer including a photopolymer material is formed with an interference fringe corresponding to one kind of wavelength band (or wavelength), and is produced by a conventional method. The pitch of the interference fringe formed in the diffraction grating layer (diffraction optical element) is constant, the interference fringe is rectilinear and it is parallel to the Z-axis direction. Note that the axis of the diffraction grating member is parallel to the X-axis, and the normal thereto is parallel to the Y-axis.

As an enlarged schematic partial sectional view of a reflection type volume hologram diffraction grating is depicted in FIG. 4C, the reflection type volume hologram diffraction grating is formed with an interference fringe having an inclination angle (slant angle) φ. Here, the inclination angle φ refers to the angle formed by a surface of the reflection type volume hologram diffraction grating and the interference fringe. The interference fringe is formed to range from the inside to the surface of the reflection type volume hologram diffraction grating. The interference fringe satisfies the Bragg condition. Here, the Bragg condition refers to a condition that satisfies the following equation (A).

In the equation (A), m is a positive integer, λ is wavelength, d is pitch of lattice planes (gap, in normal direction, between virtual planes including the interference fringe), Θ is complementary angle to an angle of incidence to the interference fringe. Note that the slant angle (inclination angle) φ of the interference fringe means an angle formed by the surface of the diffraction grating member and the interference fringe. The interference fringe is formed to range from the inside to the surface of the diffraction grating member. Besides, in the case where light enters the diffraction grating member at an incidence angle ψ, the relation between Θ, the inclination angle φ and the incidence angle ψ is as represented by the equation (B). Further, the pitch Λ of the interference fringe on the surface of the diffraction grating member is as represented by the equation (C).

$$m \cdot \lambda = 2 \cdot d \cdot \sin(\Theta) \quad (A)$$

$$\Theta = 90° - (\varphi + \psi) \quad (B)$$

$$\Lambda = d/\sin(\varphi) \quad (C)$$

In Example 1 and in Example 2 described later, the deflection means includes first deflection means 130 and second deflection means 140, the first deflection means 130 is disposed in either a region of the first glass plate 121 where light from the image forming device 111 enters or a region of the second glass plate 122 where the light from the image forming device 111 enters, the second deflection means 140 is disposed in or on either the first glass plate 121 or the second glass plate 122, and the light from the image forming device 111 is deflected at the first deflection means 130, is propagated by total reflection through the inside of the laminated structure 124 including the first glass plate 121, the shock absorbing layer 123 and the second glass plate 122, is deflected at the second deflection means 140, and enters the pupil 21 of the viewer 20. Here the first deflection means 130 includes a first diffraction grating member 131, and the second deflection means 140 includes a second diffraction grating member 141.

Here, that surface of the first glass plate 121 which faces the second glass plate 122 is referred to as first surface 121A, and that surface of the first glass plate 121 which is opposite to the first surface 121A of the first glass plate 121 is referred to as second surface 121B. Similarly, that surface of the second glass plate 122 which faces the first glass plate 121 is referred to as first surface 122A, and that surface of the second glass plate 122 which is opposite to the first surface 122A of the second glass plate 122 is referred to as second surface 122B.

As depicted in FIG. 6A, for example, the first deflection means 130 is disposed on (specifically, adhered to) the second surface 122B of the second glass surface 122 where the light from the image forming device 111 enters, and the second deflection means 140 is disposed on (specifically, adhered to) the second surface 122B of the second glass plate 122.

It is to be noted, however, that such a layout is not restrictive. The layout positions of the first deflection means 130 and the second deflection means 140 are summarized as follows.

<Layout Position of the First Deflection Means 130>

[A-1-1]

The second surface 122B of the second glass plate 122 where the light from the image forming device 111 enters

[A-1-2]

The first surface 122A of the second glass plate 122 where the light from the image forming device 111 enters

[A-1-3]

The first surface 121A of the first glass plate 121 where the light from the image forming device 111 enters

[A-1-4]

The second surface 121B of the first glass plate 121 where the light from the image forming device 111 enters <Layout Position of the Second Deflection Means 140>

[C-1-1]

The second surface 122B of the second glass plate 122

[C-1-2]

The first surface 122A of the second glass plate 122

[C-1-3]

The first surface 121A of the first glass plate 121

[C-1-4]

The second surface 121B of the first glass plate 121

Therefore, there are 4×4=16 combinations of the layout positions of the first deflection means 130 and the second deflection means 140.

In Example 1 or in Example 7 described later, a point where a center incident beam vertically incident on the optical device 120 or 220, of beams (center beam CL) emitted from the center of the image forming device 111 and passed through an image forming device side nodal point of the optical system 112, is incident on the optical device 120 or 220 is assumed to be an optical device center point O, an axis passing through the optical device center point O and parallel to the axial direction of the optical device 120 or 220 is assumed to be an X-axis, and an axis passing through the optical device center point O and coinciding with the normal to the optical device 120 or 220 is assumed to be a Y-axis. Note that the center point of the first deflection means 130 or 230 to be described next is the optical device center point O. Specifically, as depicted in FIG. 4B, in the image forming device 100 or 200, the center incident beam CL emitted from the center of the image forming device 111 and passed through the image forming device side nodal point of the optical system 112 perpendicularly impinges on the laminated structure 124. In other words, the center incident beam CL is incident on the laminated structure 124 at an incident angle of 0 degrees. In this case, the center of an image (virtual image) displayed coincides with the vertical direction to the first surface 124A of the laminated structure 124.

In the laminated structure 124, parallel light is propagated through the inside by total reflection, before being emitted. In this instance, since the laminated structure 124 is thin and the optical path along which the parallel light proceeds through the inside of the laminated structure 124 is long, the number of times of total reflection experienced until the parallel light reaches the second deflection means 140 differs depending on the angle of view. More specifically, of the parallel light incident on the laminated structure 124, the parallel light that is incident at such an angle as to travel away from the second deflection means 140 is reflected a smaller number of times than the parallel light that is incident on the laminated structure 124 at such an angle as to travel closer to the second deflection means 140. The reason for this lies in that of the parallel light diffracted or reflected at the first deflection means 130, the parallel light incident on the laminated structure 124 at such an angle as to travel away from the second deflection means 140 is greater than the parallel light incident on the laminated structure 124 at an angle in the opposite direction, in the angle formed with the normal to the laminated structure 124 when the light propagated through the inside of the laminated structure 124 impinges on an inner surface of the laminated structure 124. In addition, the shape of the interference fringe formed inside the second deflection means 140 and the shape of the interference fringe formed inside the first deflection means 130 are in symmetrical relation with respect to a virtual plane (YZ plane) perpendicular to the axis of the laminated structure 124. It is preferable that the first surface 124A or the second surface 124B of the laminated structure 124 is covered with a transparent protective member (transparent protective plate) (not depicted), from the viewpoint of preventing the first deflection means 130 and the second deflection means 140 from being damaged. Note that the laminated structure 124 and the transparent protective member need only be adhered to each other by an adhesive member at their peripheral portion. In addition, a transparent protective film may be adhered to the second surface 124B, thereby protecting the laminated structure 124.

In Example 1, the image forming device 111A is an image forming device of the first mode, and has a plurality of pixels arranged in a two-dimensional matrix pattern. Specifically, the image forming device 111A includes an image forming device (organic EL image forming device 115) including organic EL, and a convex lens 116. The organic EL image forming device 115 is provided with a plurality of (for example, 640×480) pixels (organic EL elements) arranged in a two-dimensional matrix pattern. Each image forming device 111A as a whole is accommodated in a housing 113 (in FIG. 1, indicated by alternate long and short dash lines), and the housing 113 is provided with an opening 114. The opening 114 is located in the place (position) of a rear focal point of the convex lens 116. The optical system 112 includes, for example, a convex lens, and, for generating parallel light, the opening 114 is located in the place (position) of a front focal point in the optical system 112. Light emitted from the organic EL image forming device 115 passes through the convex lens 116, passes through the opening 114, is incident on the optical system (parallel light emitting optical system, collimating optical system) 112, and is emitted as parallel light from the optical system 112.

The frame 10 includes a front section 11 disposed in front of the viewer 20, two temple sections 13 rotatably attached to both ends of the front section 11 through hinges 12, and modern sections 14 (also called tip sets, or ear pads) attached to tip portions of the temple sections 13. In addition, nose pads 10' are attached. Specifically, an assembly of the frame 10 and the nose pads 10' has substantially the same structure as that of ordinary spectacles. Further, housings 113 are detachably attached to the temple sections 13 through attaching members 19. The frame 10 is made from a metal or plastic. Note that each housing 113 may be non-detachably attached to the temple section 13 through the attaching member 19. In addition, for the viewer who possesses and is wearing a pair of spectacles, each housing 113 may be detachably attached by the attaching member 19 to the temple section 13 of the frame 10 of the spectacles possessed by the viewer. Each housing 113 may be attached to an outer side of the temple section 13, or may be attached to an inner side of the temple section 13. Alternatively, the laminated structure 124 may be fitted into the rim provided in the front section 11.

Further, a wiring (signal line, power line, etc.) 15 extending from the image forming device 111 on one side extends through the inside of the temple section 13 and the modern section 14 and from a tip portion of the modern section 14 to the exterior, to be connected to a control device (control circuit, control means) 18. Furthermore, each image forming device 111 is provided with a headphone section 16, and a headphone section wiring 16' extending from each image forming device 111 extends through the inside of the temple section 13 and the modern section 14 and from a tip portion of the modern section 14 to the headphone section 16. More specifically, the headphone section wiring 16' extends from the tip portion of the modern section 14 to the headphone section 16 in the manner of going round the rear side of the auricle (earconch). Such a configuration does not give an impression that the headphone section 16 and/or the headphone section wiring 16' is arranged disorderly, and the configuration ensures a clean-cut display device.

The wiring (signal line, power line, etc.) 15 is connected to the control device (control circuit) 18, as aforementioned. The control device 18 is provided with, for example, an image information storage device 18A. Besides, processing for image display is executed in the control device 18. The control device 18 and the image information storage device 18A can include known circuits.

An imaging device 17 including a solid-state imaging element, including a CCD or CMOS sensor, and a lens (these are not illustrated) is attached to a central portion 11' of the front section 11 by an appropriate attaching member (not depicted), as required. A signal from the imaging device 17 is outputted to the control device (control circuit) 18 through a wiring (not depicted) extending from the imaging device 17.

The optical device of Example 1 can be produced, for example, by adhering photopolymer films, for constituting the first deflection means 130 and the second deflection means 140, to the second surface 122B of the second glass plate 122, subjecting the photopolymer films to two-beam interference laser exposure based on a fixed angle using a laser having a desired wavelength, irradiating the photopolymer films with UV rays, and subjecting them to a heat treatment.

A dropping test of dropping the optical device in Example 1 down to a floor from a height of 1.2 m was conducted. Note that the floor has a structure in which plastic tiles (so-called P tiles) are directly adhered to a concrete slab. As a result, none of ten sheets of the optical devices put to the dropping test was broken. On the other hand, using a single glass plate (of the same material as that of the glass plate of Example 1) having a thickness of 1.0 mm, an optical device similar to that of Example 1 was produced as a comparative example. Specifically, unlike the optical device of Example 1, the optical device of comparative example includes a single glass plate, lacking the shock absorbing layer. Of ten sheets of the optical devices of the comparative example put to the dropping test, four sheets of the optical devices were broken.

Meanwhile, the parallelism of light guide means for guiding the light from the image forming device to the pupil of the viewer is required to be not more than one minute, and warpage of the light guide means is required to be not more than several micrometers. In addition, the material constituting the light guide means is required to be not susceptible to thermal deformation, since a heat treatment is conducted at the time of producing the first deflection means or the like and the second deflection means or the like. Further, the material constituting the light guide means is required to show little light scattering, since light flux is propagated by total reflection through the inside of the light guide means as an optical device. A material that satisfies these three requirements is a glass plate. However, the glass plate is usually a brittle material; for example, when the viewer (user) drops the head mounted display carelessly, the glass plate may be damaged. In the display device of Example 1 and the optical device of Example 1, however, the first glass plate and the second glass plate are laminated on each other through the shock absorbing layer as aforementioned, and, therefore, shock resistance of the optical device can be enhanced assuredly.

Example 2

Example 2 is a modification of Example 1. As a conceptual figure of an image display device 200 in a display device (head mounted display) of Example 2 is depicted in FIG. 5, in Example 2, an image forming device 111B is the image forming device of the second mode. Specifically, it is provided with a light source 117, and scanning means 119 for scanning parallel light emitted from the light source 117. More specifically, the image forming device 111B includes:
 the light source 117;
 a convex lens 118A for converting the light emitted from the light source 117 into parallel light; and
 the scanning means 119 for scanning the parallel light emitted from the convex lens 118A. Note that the image forming device 111B as a whole is accommodated in a housing 113 (in FIG. 5, indicated by alternate long and short dash lines), and the light is emitted to an optical system (parallel light emitting optical system, collimating optical system) 112. Each housing 113 is detachably attached to a temple section 13 by an attaching member 19.

The light source 117 includes a light emitting element that emits white light. The light emitted from the light source 117 is wholly incident on the convex lens 118A, and is emitted as parallel light. Then, this parallel light is reflected by a total reflection mirror 118B, horizontal scanning and vertical scanning are conducted by the scanning means 119 including a MEMS mirror which has a micromirror rotatable in two-dimensional directions and by which the incident parallel light can be scanned two-dimensionally, whereby a kind of conversion into a secondary image is performed, and virtual pixels (the number of pixels can be made to be, for example, the same as that in Example 1) are produced. Then, the light from the virtual pixels passes through the optical system (parallel light emitting optical system, collimating optical system) 112, and light flux made into parallel light is incident on an optical device 120. The scanning means 119 including the MEMS mirror is located at a front focal point of the optical system 112.

The optical device 120 has the same configuration or structure as that of the optical device described in Example 1, and, therefore, detailed description thereof is omitted. In addition, the display device in Example 2 also has substantially the same configuration or structure as that of the display device of Example 1, except for the difference in the image forming device 111B, and, therefore, detailed description thereof is omitted.

Example 3

Example 3 is a modification of Examples 1 and 2, and relates to a display device of the second configuration of the present disclosure. A conceptual figure of an image display device of Example 3 is depicted in FIG. 6B.

In the display device of Example 3,
 deflection means includes first-A deflection means 130A, first-B deflection means 130B and second deflection means 140,
 the first-A deflection means 130A and the first-B deflection means 130B are disposed in either a region of a first glass plate 121 or a region of a second glass plate 122 where light from an image forming device 111 enters, the second deflection means 140 is disposed in or on either the first glass plate 121 or the second glass plate 122, and the light from the image forming device 111 is deflected at the first-A deflection means 130A and the first-B deflection means 130B, is propagated by total reflection through the inside of a laminated structure 124 including the first glass plate 121, a shock absorbing layer 123 and the second glass plate 122, is deflected at the second deflection means 140, and enters a pupil 21 of a viewer 20.

Figure 6B:
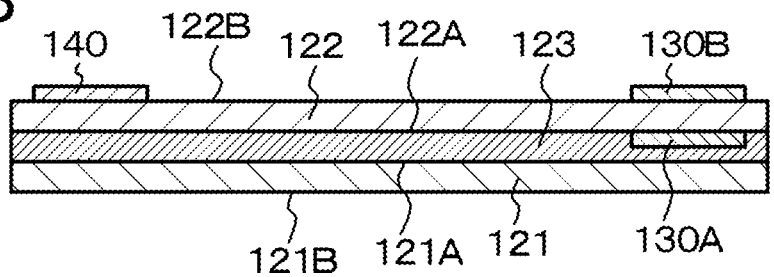

As depicted in FIG. 6B, for example, the first-A deflection means 130A is disposed in a region of a first surface 122a of the second glass plate 122 where the light from the image forming device 111 enters, the first-B deflection means 130B is disposed in a region of a second surface 122B of the second glass plate 122 where the light from the image forming device 111 enters, and the second deflection means 140 is disposed in or on the second surface 122B of the second glass plate 122.

It is to be noted, however, that such a layout is not restrictive. Layout positions of the first-A deflection means 130A, the first-B deflection means 130B and the second deflection means 140 are summarized as follows.

<Layout Positions of the First-A Deflection Means 130A and the First-B Deflection Means 130B>

[A-2-1]

The first surface 122A and the second surface 122B of the second glass plate 122 where the light from the image forming device 111 enters

[A-2-2]

The first surface 121A and the second surface 121B of the first glass plate 121 where the light from the image forming device 111 enters <Layout Position of the Second Deflection Means 140>

[C-2-1]

The second surface 122B of the second glass plate 122

[C-2-2]

The first surface 122A of the second glass plate 122

[C-2-3]

The first surface 121A of the first glass plate 121

[C-2-4]

The second surface 121B of the first glass plate 121

Therefore, there are 2×4=8 combinations of the layout positions of the first-A deflection means 130A, the first-B deflection means 130B and the second deflection means 140.

The optical device of Example 3 can be produced, for example, based on the following production method. Specifically, a photopolymer film for constituting the first-A deflection means 130A is adhered to the first surface 122A of the second glass plate 122, is subjected to two-beam interference laser exposure based on a fixed angle with a laser having a desired wavelength, is irradiated with UV rays, and is thereafter subjected to a heat treatment. Next, photopolymer films for constituting the first-B deflection means 130B and the second deflection means 140 are adhered to the second surface 122B of the second glass plate 122, are subjected to two-beam interference laser exposure based on a fixed angle using a laser having a desired wavelength, are irradiated with UV rays, and are thereafter subjected to a heat treatment. The optical devices in Examples 4 to 6 described later can also be produced by basically the same method.

The display device of Example 3 has the same configuration or structure as those of the display devices described in Examples 1 and 2, except for a difference in the deflection means, and, therefore, detailed description thereof is omitted.

Example 4

Example 4 is also a modification of Examples 1 and 2, relates to a display device of the third-A configuration of the present disclosure, and relates to an optical device according to the first mode of the present disclosure and a method of producing the same. A conceptual figure of an image display device of Example 4 is depicted in FIG. 6C.

In the display device of Example 4, deflection means includes first-A deflection means 130A, first-B deflection means 130B and second deflection means 140, the first-A deflection means 130A is disposed in a region of a first glass plate 121 where light from an image forming device 111 is incident, the first-B deflection means 130B is disposed in a region of a second glass plate 122 where the light from the image forming device 111 enters, the second deflection means 140 is disposed in or on the first glass plate 121 or the second glass plate 122, and the light from the image forming device 111 is deflected at the first-A deflection means 130A and the first-B deflection means 130B, is propagated by total reflection through the inside of a laminated structure 124 including the first glass plate 121, a shock absorbing layer 123 and the second glass plate 122, is deflected at the second deflection means 140, and enters a pupil 21 of a viewer 20.

In addition, an optical device of Example 4 is an optical device according to the first mode of the present disclosure, and is an optical device that guides the light from the image forming device 111 to the pupil 21 of the viewer 20. In addition, the optical device is provided with a first glass plate 121, a second glass plate 122, first-A deflection means 130A, first-B deflection means 130B and second deflection means 140, the first-A deflection means 130A is disposed in a region of the first glass plate 121 where light from an image forming device 111 is incident, the first-B deflection means 130B is disposed in a region of the second glass plate 122 where the light from the image forming device 111 enters, the second deflection means 140 is disposed in or on the first glass plate 121 or the second glass plate 122, the first-A deflection means 130A and the first-B deflection means 130B are aligned with each other, and the first glass plate 121 and the second glass plate 122 are laminated on each other through a shock absorbing layer 123.

Figure 6C:
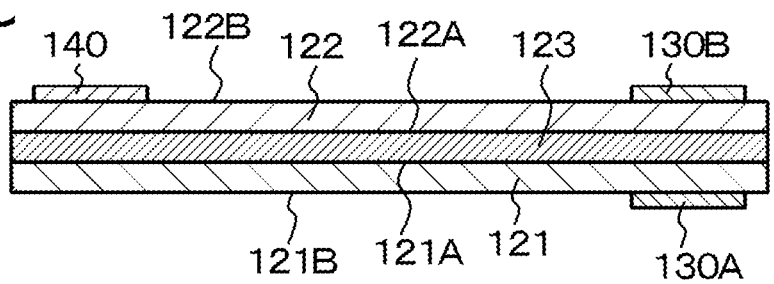

As depicted in FIG. 6C, for example, the first-A deflection means 130A is disposed in a region of the second surface 121B of the first glass plate 121 where the light from the image forming device 111 enters, the first-B deflection means 130B is disposed in a region of the second surface 122B of the second glass plate 122 where the light from the image forming device 111 enters, and the second deflection means 140 is disposed in or on the second surface 122B of the second glass plate 122.

It is to be noted, however, that such a layout is not restrictive. Layout positions of the first-A deflection means 130A, the first-B deflection means 130B and the second deflection means 140 are summarized as follows.

<Layout Position of the First-A Deflection Means 130A>
[A-3-1]
The second surface 121B of the first glass plate 121 where the light from the image forming device 111 enters
[A-3-2]
The first surface 121A of the first glass plate 121 where the light from the image forming device 111 enters
<Layout of the First-B Deflection Means 130B>
[B-3-1]
The second surface 122B of the second glass plate 122 where the light from the image forming device 111 enters
[B-3-2]
The first surface 122A of the second glass plate 122 where the light from the image forming device 111 enters
<Layout Position of the Second Deflection Means 140>
[C-1]
The second surface 122B of the second glass plate 122
[C-2]
The first surface 122A of the second glass plate 122
[C-3]
The first surface 121A of the first glass plate 121
[C-4]
The second surface 121B of the first glass plate 121

Therefore, there are 2×2×4=16 combinations of the layout positions of the first-A deflection means 130A, the first-B deflection means 130B and the second deflection means 140.

A method of producing the optical device of Example 4 is a method of producing an optical device according to the first mode of the present disclosure that guides light from the image forming device 111 to the pupil 21 of the viewer 20, the method including the steps of:

preparing a first glass plate 121 and a second glass plate 122 having a configuration in which first-A deflection means 130A is disposed in a region of the first glass plate 121 where the light from the image forming device 111 enters, first-B deflection means 130B is disposed in a region of the second glass plate 122 where the light from the image forming device 111 enters, and second deflection means 140 is disposed in or on the first glass plate 121 or the second glass plate 122; and aligning the first-A deflection means 130A and the first-B deflection means 130B with each other, and adhering the first glass plate 121 and the second glass plate 122 to each other through a shock absorbing layer 123.

At the time of laminating the first glass plate 121 and the second glass plate 122 on each other, it is necessary to cause the diffraction directions of the first-A deflection means 130A and the first-B deflection means 130B to accurately coincide with each other. For this purpose, it is sufficient to burn an alignment mark on a part of the first-A deflection means 130A, burn an alignment mark also on a part of the first-B deflection means 130B, and laminate the first glass plate 121 and the second glass plate 122 on each other in such a manner that these alignment marks overlap with each other. Substantially the same is applicable also to Examples 5 and 6 which will be described later.

The display device of Example 4 has the same configuration or structure as those of the display devices described in Examples 1 and 2, except for a difference in deflection means, and, therefore, detailed description thereof is omitted. In Example 4, not only the shock resistance of the optical device can be enhanced assuredly, but also enhancement of production yield of the optical device can be contrived since the first-A deflection means 130A is disposed in or on the first glass plate 121 and, independently therefrom, the first-B deflection means 130B is disposed in or on the second glass plate 122. This applies also to Examples 5 and 6 which will be described later.

Example 5

Example 5 also is a modification of Examples 1 and 2, relates to a display device of the third-B configuration of the present disclosure, and relates to an optical device according to the second mode of the present disclosure and a method of producing the same. A conceptual figure of an image forming device of Example 5 is depicted in FIG. 6D.

In a display device of Example 5, deflection means includes first deflection means, second-A deflection means 140A and second-B deflection means 140B, the first deflection means is disposed in a region of a first glass plate 121 or a region of a second glass plate 122 where light from an image forming device 111 is incident, the second-A deflection means 140A is disposed in or on the first glass plate 121, the second-B deflection means 140A is disposed in or on the second glass plate 122, and the light from the image forming device 111 is deflected at the first deflection means, is propagated by total reflection through the inside of a laminated structure 124 including the first glass plate 121, a shock absorbing layer 123 and the second glass plate 122, is deflected at the second-A deflection means 140A and the second-B deflection means 140B, and enters a pupil 21 of a viewer 20.

In addition, an optical device of Example 5 is an optical device according to the second mode of the present disclosure, and an optical device that guides the light from the image forming device 111 to the pupil 21 of the viewer 20. In addition, the optical device is provided with a first glass plate 121, a second glass plate 122, first deflection means, second-A deflection means 140A and second-B deflection means 140B, the first deflection means is disposed in a region of the first glass plate 121 or the second glass plate 122 where the light from the image forming device 111 enters, the second-A deflection means 140A is disposed in or on the first glass plate 121, the second-B deflection means 140B is disposed in or on the second glass plate 122, the second-A deflection means 140A and the second-B deflection means 140B are aligned with each other, and the first glass plate 121 and the second glass plate 122 are laminated on each other through a shock absorbing layer 123.

Figure 6D:
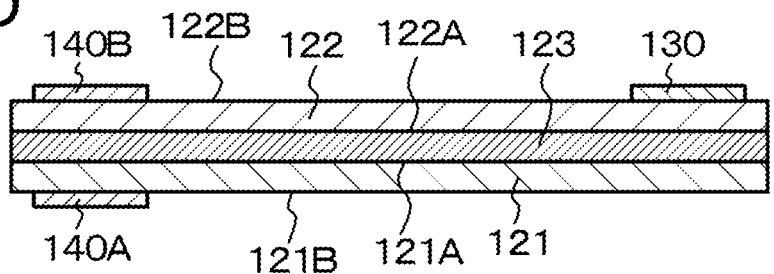

As depicted in FIG. 6D, for example, the first deflection means 130 is disposed in a region of a second surface 122B of the second glass plate 122 where the light from the image forming device 111 enters, the second-A deflection means 140A is disposed in a region of the second surface 121B of the first glass plate 121, and the second-B deflection means 140B is disposed in a region of the second surface 122B of the second glass plate 122.

It is to be noted, however, that such a layout is not restrictive. Layout positions of the first deflection means 130, the second-A deflection means 140A and the second-B deflection means 140B are summarized as follows.

<Layout Position of the First Deflection Means 130>
[A-4-1]
The second surface 122B of the second glass plate 122 where the light from the image forming device 111 enters

[A-4-2]

The first surface 122A of the second glass plate 122 where the light from the image forming device 111 enters

[A-4-3]

The first surface 121A of the first glass plate 121 where the light from the image forming device 111 enters

[A-4-4]

The second surface 121B of the first glass plate 121 where the light from the image forming device 111 enters <Layout Position of the Second-A Deflection Means 140A>

[C-4-1]

The second surface 121B of the first glass plate 121

[C-4-2]

The first surface 121A of the first glass plate 121

<Layout Position of the Second-B Deflection Means 140B>

[D-4-1]

The second surface 122B of the second glass plate 122

[D-4-2]

The first surface 122A of the second glass plate 122

Therefore, there are 4×2×2=16 combinations of the layout positions of the first deflection means 130, the second-A deflection means 140A and the second-B deflection means 140B.

A method of producing the optical device of Example 5 is a method of producing an optical device according to the second mode of the present disclosure that guides the light from the image forming device 111 to the pupil 21 of the viewer 20, the method including the steps of:

preparing a first glass plate 121 and a second glass plate 122 having a configuration in which first deflection means is disposed in a region of the first glass plate 121 where the light from the image forming device 111 enters, second-A deflection means 140A is disposed in or on the first glass plate 121, and second-B deflection means 140B is disposed in or on the second glass plate 122;

aligning the second-A deflection means 140A and the second-B deflection means 140B with each other, and adhering the first glass plate 121 and the second glass plate 122 to each other through a shock absorbing layer 123.

The display device of Example 5 has the same configuration or structure as those of the display devices described in Examples 1 and 2, except for a difference in the deflection means, and, therefore, detailed description thereof is omitted.

Example 6

Example 6 also is a modification of Examples 1 and 2, relates to a display device of the fourth configuration of the present disclosure, and relates to an optical device according to the third mode of the present disclosure and a method of producing the same. A conceptual figure of an image display device of Example 6 is depicted in FIG. 6E.

In the display device of Example 6, deflection means includes first-A deflection means 130A, first-B deflection means 130B, second-A deflection means 140A and second-B deflection means 140B, the first-A deflection means 130A is disposed in a region of a first glass plate 121 where light from an image forming device 111 is incident, the first-B deflection means 130B is disposed in a region of a second glass plate 122 where the light from the image forming device 111 enters, the second-A deflection means 140A is disposed in or on the first glass plate 121, the second-B deflection means 140B is disposed in or on the second glass plate 122, and the light from the image forming device 111 is deflected at the first-A deflection means 130A and the first-B deflection means 130B, is propagated by total reflection through the inside of a laminated structure 124 including the first glass plate 121, a shock absorbing layer 123 and the second glass plate 122, is deflected at the second-A deflection means 140A and the second-B deflection means 140B, and enters a pupil 21 of a viewer 20.

In addition, the optical device of Example 6 is an optical device according to the third mode of the present disclosure, and is an optical device that guides the light from the image forming device 111 to the pupil 21 of the viewer 20. Besides, the optical device is provided with a first glass plate 121, a second glass plate 122, first-A deflection means 130A, first-B deflection means 130B, second-A deflection means 140A and second-B deflection means 140B, the first-A deflection means 130A is disposed in a region of the first glass plate 121 where the light from the image forming device 111 enters, the first-B deflection means 130B is disposed in a region of the second glass plate 122 where the light from the image forming device 111 enters, the second-A deflection means 140A is disposed in or on the first glass plate 121, the second-B deflection means 140B is disposed in or on the second glass plate 122, the first-A deflection means 130A and the first-B deflection means 130B are aligned with each other, and the second-A deflection means 140A and the second-B deflection means 140B are aligned with each other, and the first glass plate 121 and the second glass plate 122 are laminated on each other through a shock absorbing layer 123.

Figure 6E:
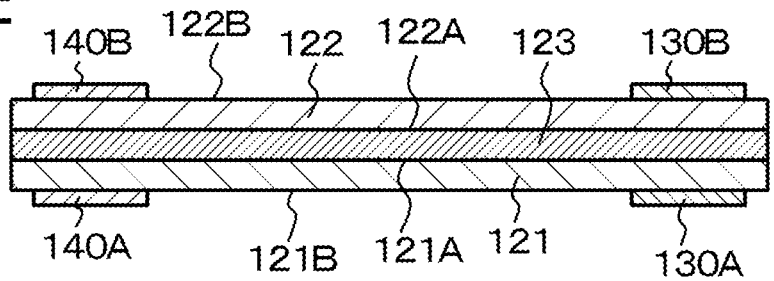

As depicted in FIG. 6E, for example, the first-A deflection means 130A is disposed in a region of a second surface 121B of the first glass plate 121 where the light from the image forming device 111 enters, the first-B deflection means 130B is disposed in a region of the second surface 122B of the second glass plate 122 where the light from the image forming device 111 enters, the second-A deflection means 140A is disposed in a region of a second surface 121B of the first glass plate 121, and the second-B deflection means 140B is disposed in a region of the second surface 122B of the second glass plate 122.

It is to be noted, however, that such a layout is not restrictive. Layout positions of the first-A deflection means 130A, the first-B deflection means 130B, the second-A deflection means 140A and the second-B deflection means 140B are summarized as follows.

<Layout Position of the First-A Deflection Means 130A>

[A-5-1]

The second surface 121B of the first glass plate 121 where the light from the image forming device 111 enters

[A-5-2]

The first surface 121A of the first glass plate 121 where the light from the image forming device 111 enters <Layout Position of the First-B Deflection Means 130B>

[B-5-1]

The second surface 122B of the second glass plate 122 where the light from the image forming device 111 enters

[B-5-2]

The first surface 122A of the second glass plate 122 where the light from the image forming device 111 enters <Layout Position of the Second-A Deflection Means 140A>
[C-5-1]
The second surface 121B of the first glass plate 121
[C-5-2]
The first surface 121A of the first glass plate 121
<Layout Position of the Second-B Deflection Means 140B>
[D-5-1]
The second surface 122B of the second glass plate 122
[D-5-2]
The first surface 122A of the second glass plate 122

Therefore, there are 2×2×2×2=16 combinations of the layout positions of the first-A deflection means 130A, the first-B deflection means 130B, the second-A deflection means 140A and the second-B deflection means 140B.

A method of producing the optical device of Example 6 is a method of producing an optical device according to the third mode of the present disclosure that guides the light from the image forming device 111 to the pupil 21 of the viewer 20, the method including the steps of:

preparing a first glass plate 121 and a second glass plate 122 having a configuration in which first-A deflection means 130A is disposed in a region of the first glass plate 121 where the light from the image forming device 111 enters, first-B deflection means 130B is disposed in a region of the second glass plate 122 where the light from the image forming device 111 enters, second-A deflection means 140A is disposed in or on the first glass plate 121, and second-B deflection means 140B is disposed in or on the second glass plate 122; and aligning the first-A deflection means 130A and the first-B deflection means 130B with each other, aligning the second-A deflection means 140A and the second-B deflection means 140B with each other, and laminating the first glass plate 121 and the second glass plate 122 on each other through a shock absorbing layer 123.

The display device of Example 6 has the same configuration or structure as those of the display devices described in Examples 1 and 2, except for a difference in the deflection means, and, therefore, detailed description thereof is omitted.

Example 7

Figure 7:
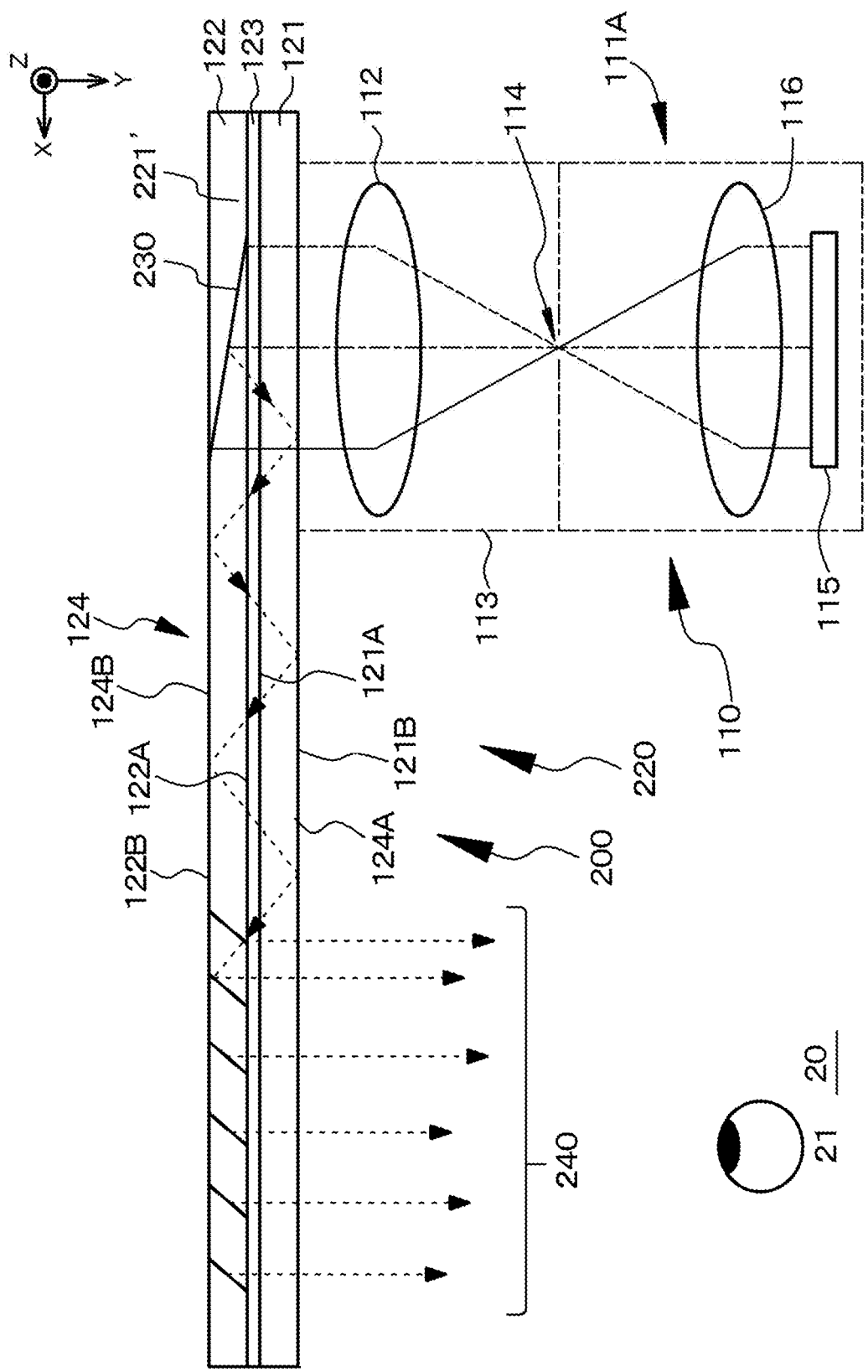
FIG. 7 is a conceptual figure of an image display device in a display device of Example 7.

While Example 7 also is a modification of Examples 1 and 2, first deflection means reflects light incident on a laminated structure 124, and second deflection means transmits or reflects, multiple times, the light propagated by total reflection through the inside of the laminated structure 124. Thus, while a conceptual figure of an image display device in a display device of Example 7 is depicted in FIG. 7, the first deflection means 230 functions as a reflecting mirror, whereas the second deflection means 240 functions as a semi-transmitting mirror. Specifically, the first deflection means 230 and the second deflection means 240 are disposed in the inside of the laminated structure 124 (in Example 7, in the inside of the second glass plate 122). More specifically, the first deflection means 230 provided in the inside of the second glass plate 122 constituting the laminated structure 124 includes a light reflecting film (a kind of mirror) which includes aluminum (Al) and which reflects the light incident on the laminated structure 124. On the other hand, the second deflection means 240 provided in the inside of the laminated structure 124 includes a multilayer film in which a multiplicity of dielectric stacked films are laminated. The dielectric stacked film includes, for example, a $TiO_2$ film as a high dielectric constant material, and an $SiO_2$ film as a low dielectric constant material. The multilayer film in which a multiplicity of dielectric stacked films are laminated is disclosed in JP 2005-521099A. While six layers of dielectric stacked films are illustrated in the figure, this is not restrictive. Between the dielectric stacked film and the dielectric stacked film is sandwiched a thin piece including the same material as the material constituting the second glass plate 122. Note that at the first deflection means 230, parallel light incident on the laminated structure 124 is reflected (or diffracted) in such a manner that the parallel light incident on the laminated structure 124 undergoes total reflection in the inside of the laminated structure 124. On the other hand, at the second deflection means 240, the parallel light propagated by total reflection through the inside of the laminated structure 124 is reflected (or diffracted) multiple times, and is emitted from the laminated structure 124 toward a pupil 21 of a viewer 20 in the state of parallel light.

To fabricate the first deflection means 230, it is sufficient to cut out a portion 122' of the second glass plate at which to provide the first deflection means 230, thereby providing the second glass plate 122 with a slant surface at which to form the first deflection means 230, to form a light reflecting film on the slant surface by vacuum deposition, and thereafter to adhere the cut-out portion 122' of the second glass plate 122 to the first deflection means 230. In addition, to fabricate the second deflection means 240, it is sufficient to produce a multilayer film in which multiplicities of layers of the same material as the second glass plate 122 and dielectric stacked films (which can be produced, for example, by a vacuum deposition method) are laminated, to cut out a portion of the second glass plate 122 at which to provide the second deflection means 240, thereby forming a slant surface, to adhere the multilayer film to the slant surface, and to perform polishing or the like, thereby adjusting the outer shape. In this way, an optical device 220 in which the first deflection means 230 and the second deflection means 240 are provided in the inside of the laminated structure 124 can be obtained.

Except for the above-mentioned points, the display device of Example 7 has substantially the same configuration or structure as those of the display devices of Examples 1 and 2, and, therefore, detailed description thereof is omitted. Note that the first deflection means 230 and the second deflection means 240 may be disposed in the inside of the first glass plate 121.

Example 8

Figure 8:
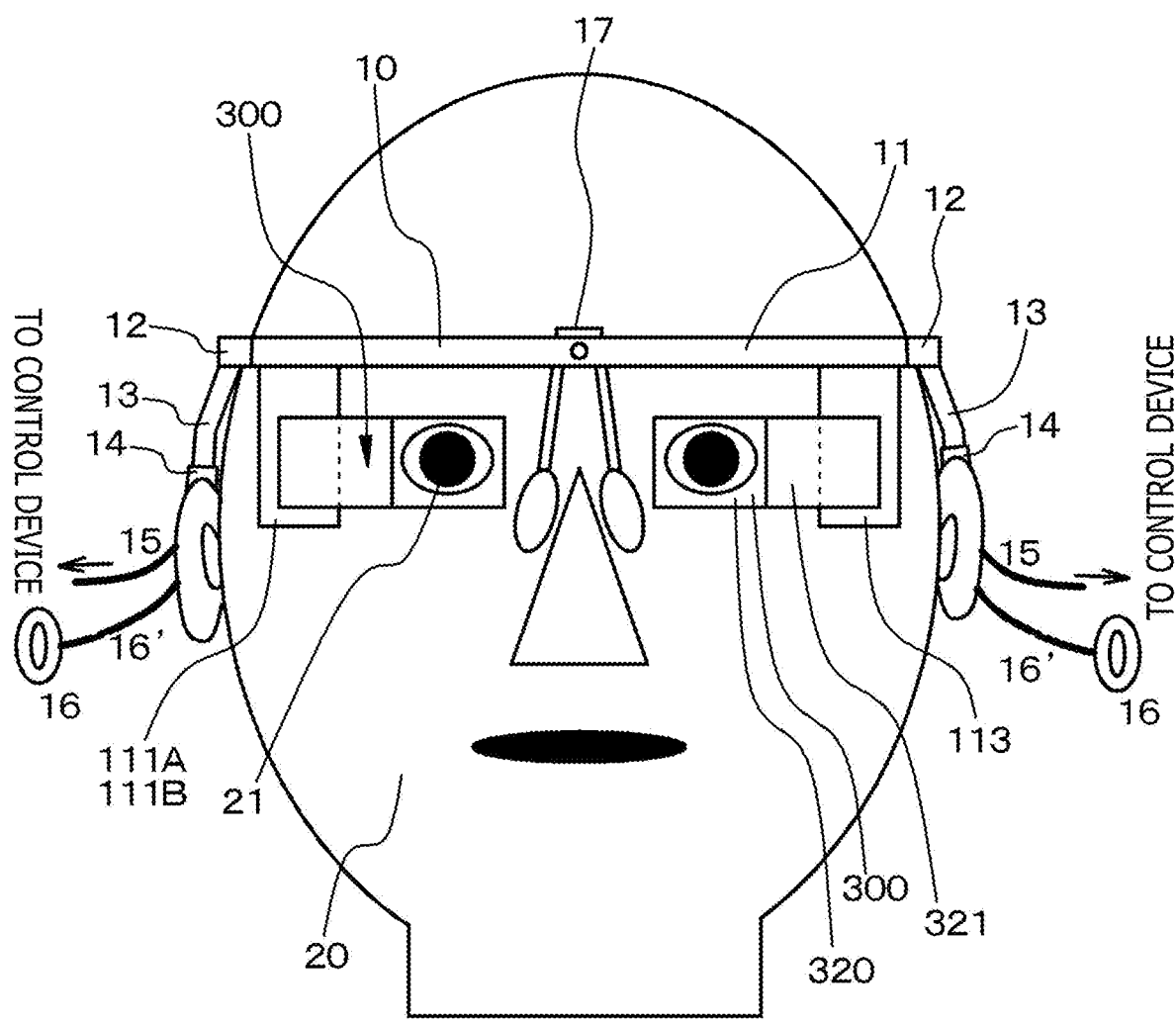
FIG. 8 is a schematic view, as viewed from a front side, of a display device of Example 8.
Figure 9:
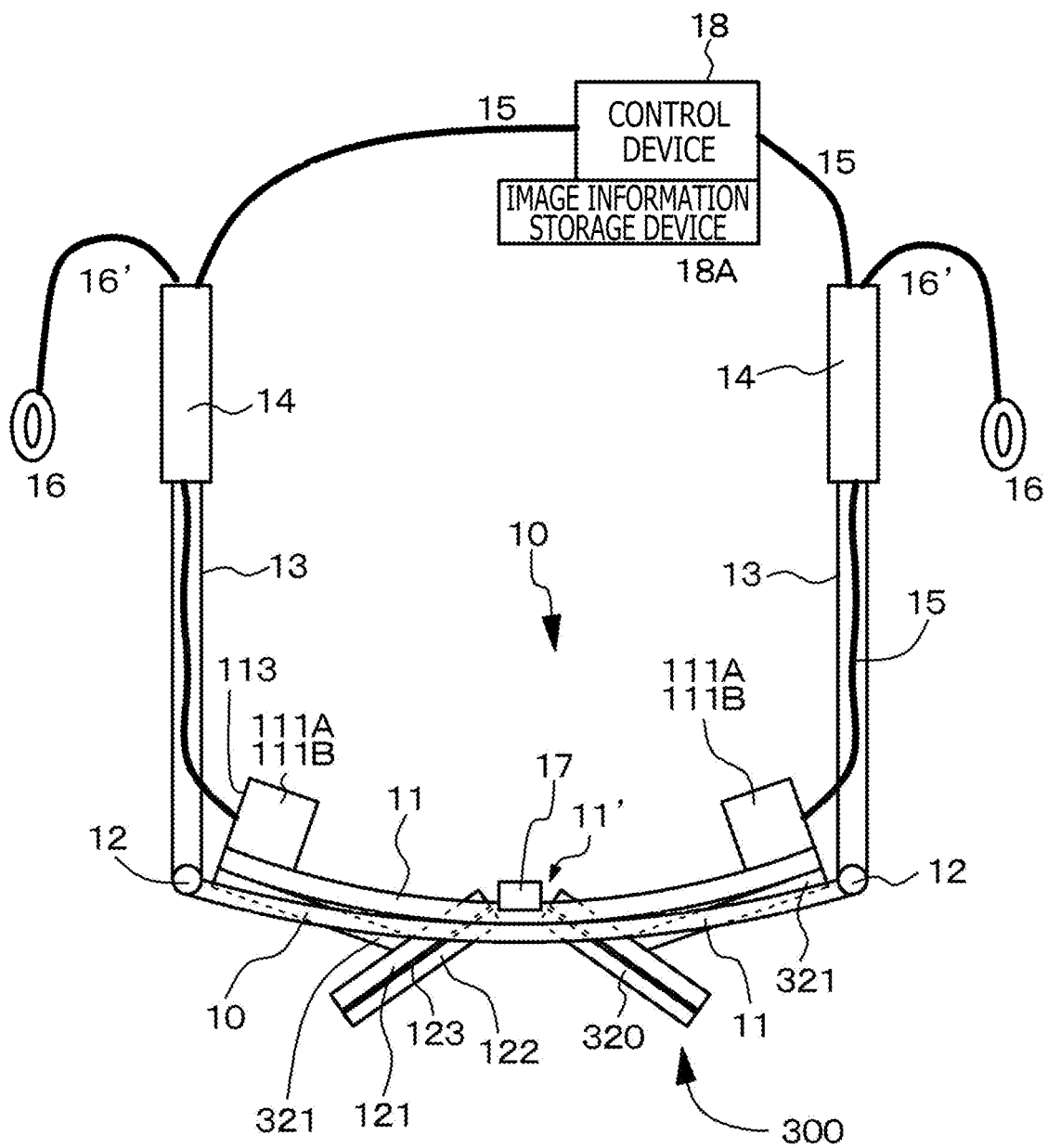
FIG. 9 is a schematic view, as viewed from above, of the display device of Example 8.

Example 8 also is a modification of Examples 1 and 2. A schematic view, as viewed from the front side, of a display device of Example 8 is depicted in FIG. 8, and a schematic view, as viewed from above, of the same is depicted in FIG. 9.

In Example 8, an optical device 320 constituting an image display device 300 includes a semi-transmitting mirror on which light emitted from an image forming device 111 is incident and which emits the light toward a pupil 21 of a viewer 20. Specifically, the optical device 320 is provided with a first glass plate 121, a second glass plate 122 that faces the first glass plate 121, and a shock absorbing layer 123 sandwiched between the first glass plate 121 and the second glass plate 122. The first glass plate 121 is formed with the semi-transmitting mirror (not depicted). Note that while a structure in which the light emitted from the image forming device 111 is propagated through the inside of a transparent member 321 such as a glass plate or plastic plate and is incident on the first glass plate 121 (semi-transmitting mirror) of the optical device 320 is adopted in Example 8, a structure may be adopted in which the light is propagated through the air and is incident on the first glass plate 121 (semi-transmitting mirror) of the optical device 320. In addition, the image forming device may be, for example, the image forming device (image forming device 111B) of the second mode described in Example 2.

Each image forming device 111 is mounted to a front section 11 by use of a small screw or screws, for example. Besides, the member 321 is attached to each image forming device 111, and the optical device 320 is mounted to the member 321. Except for this point, the display device of Example 8 has substantially the same configuration or structure as those of the display devices of Examples 1 and 2, and, therefore, detailed description thereof is omitted. Note that the second glass plate 122 may be formed with the semi-transmitting mirror (not depicted).

Example 9

Figure 10:
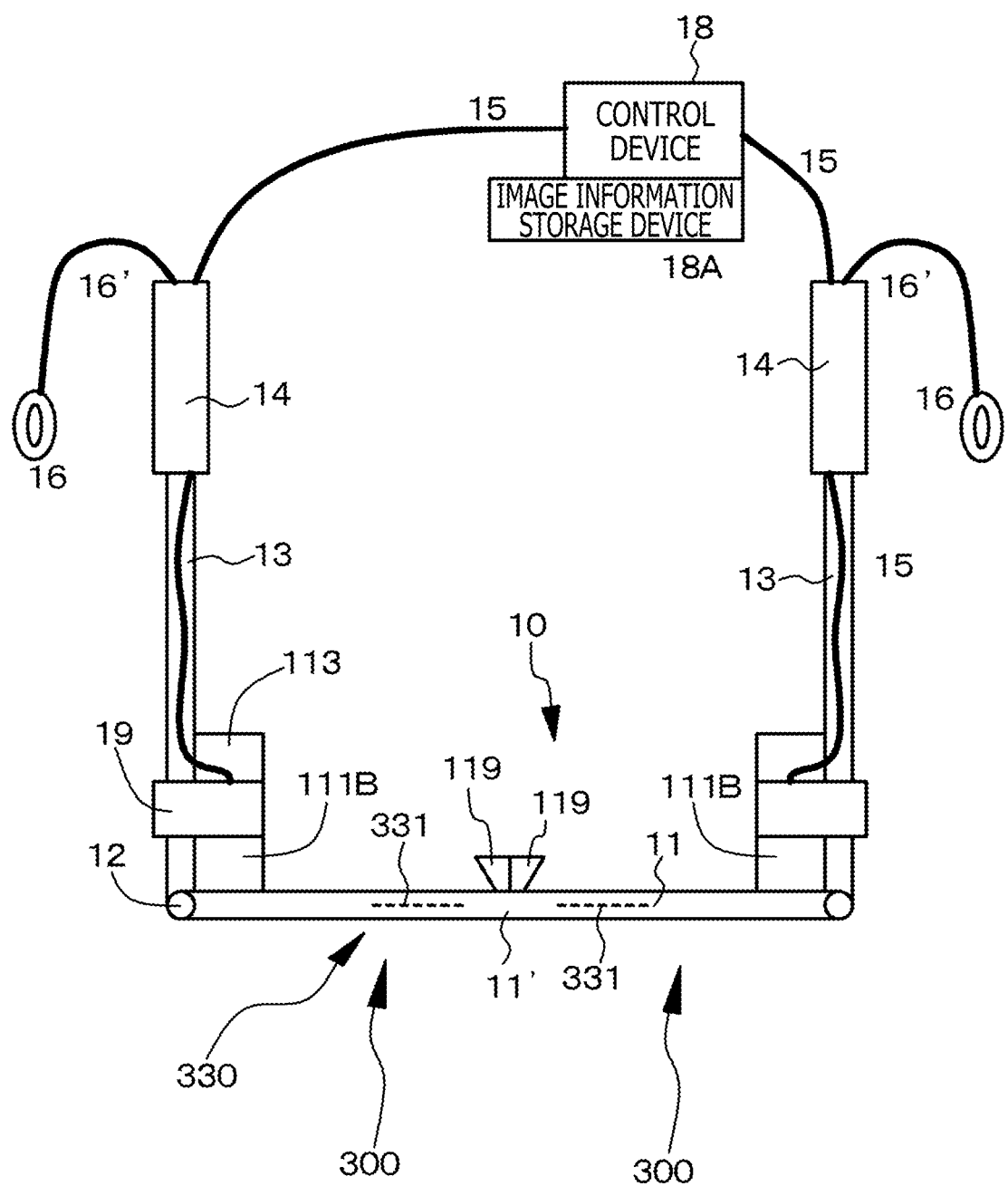
FIG. 10 is a schematic view, as viewed from above, of a display device of Example 9.

Example 9 also is a modification of the image display devices of Examples 1 and 2. A schematic view, as viewed from above, of a display device of Example 9 is depicted in FIG. 10. Note that in FIG. 10, an imaging device 17 is omitted from illustration.

In Example 9, also, an optical device 330 constituting an image display device 300 includes a semi-transmitting mirror 331 on which light emitted from the image forming device is incident and which emits the light toward a pupil 21 of a viewer 20. Specifically, the optical device 330 is provided with a first glass plate 121, a second glass plate 122 that faces the first glass plate 121, and a shock absorbing layer 123 sandwiched between the first glass plate 121 and the second glass plate 122. The semi-transmitting mirror 331 is formed on the first glass plate 121. The image forming device may be substantially the image forming device (image forming device 111B) of the second mode described in Example 2. Specifically, in Example 9, unlike in Example 8, light emitted from a light source 117 disposed in a housing 113 is propagated in the inside of an optical fiber (not depicted), and is incident on scanning means 119 attached to a part 11' of a frame 10 in the vicinity of a nose pad, for example, and the light scanned by the scanning means 119 is incident on the semi-transmitting mirror 331. Alternatively, the light emitted from the light source 117 disposed in the housing 113 is propagated through the inside of the optical fiber (not depicted), and is incident on the scanning means 119 attached to an upper side of parts of the frame 10 corresponding respectively to both eyes, for example, and the light scanned by the scanning means 119 is incident on the semi-transmitting mirror 331. Alternatively, the light emitted from the light source 117 disposed in the housing 113 is incident on the scanning means 119 disposed in the housing 113, and the light scanned by the scanning means 119 is directly incident on the semi-transmitting mirror 331. Then, the light reflected by the semi-transmitting mirror 331 enters the pupil 21 of the viewer 20. The display device of Example 9 has substantially the same configuration or structure as those of the display devises of Examples 1 and 2, except for the above-mentioned differences, and, therefore, detailed description thereof is omitted. Note that the second glass plate 122 may be formed with the semi-transmitting mirror 331.

Example 10

Figure 11:
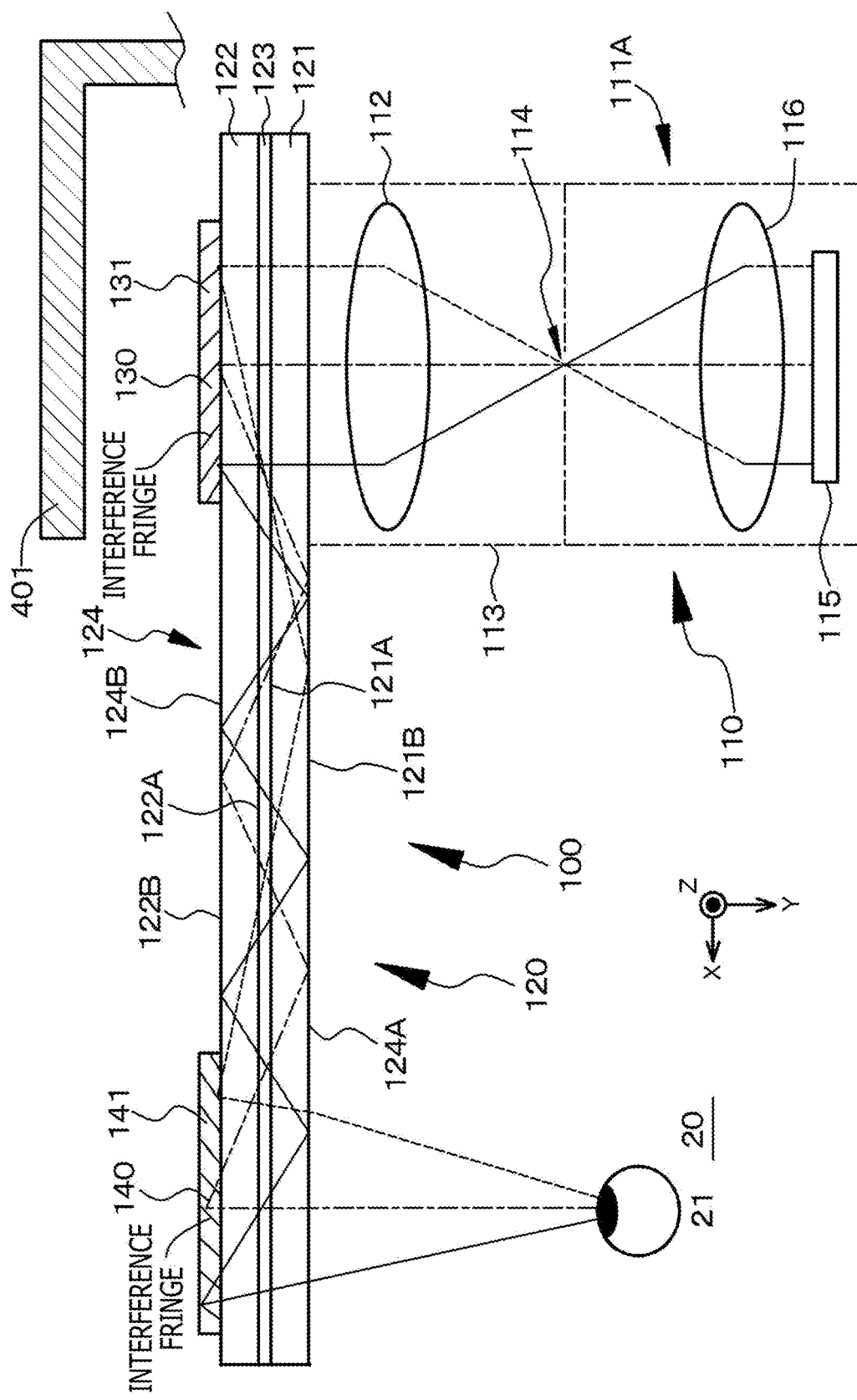
FIG. 11 is a conceptual figure of an image display device in a display device of Example 10.
Figure 12:
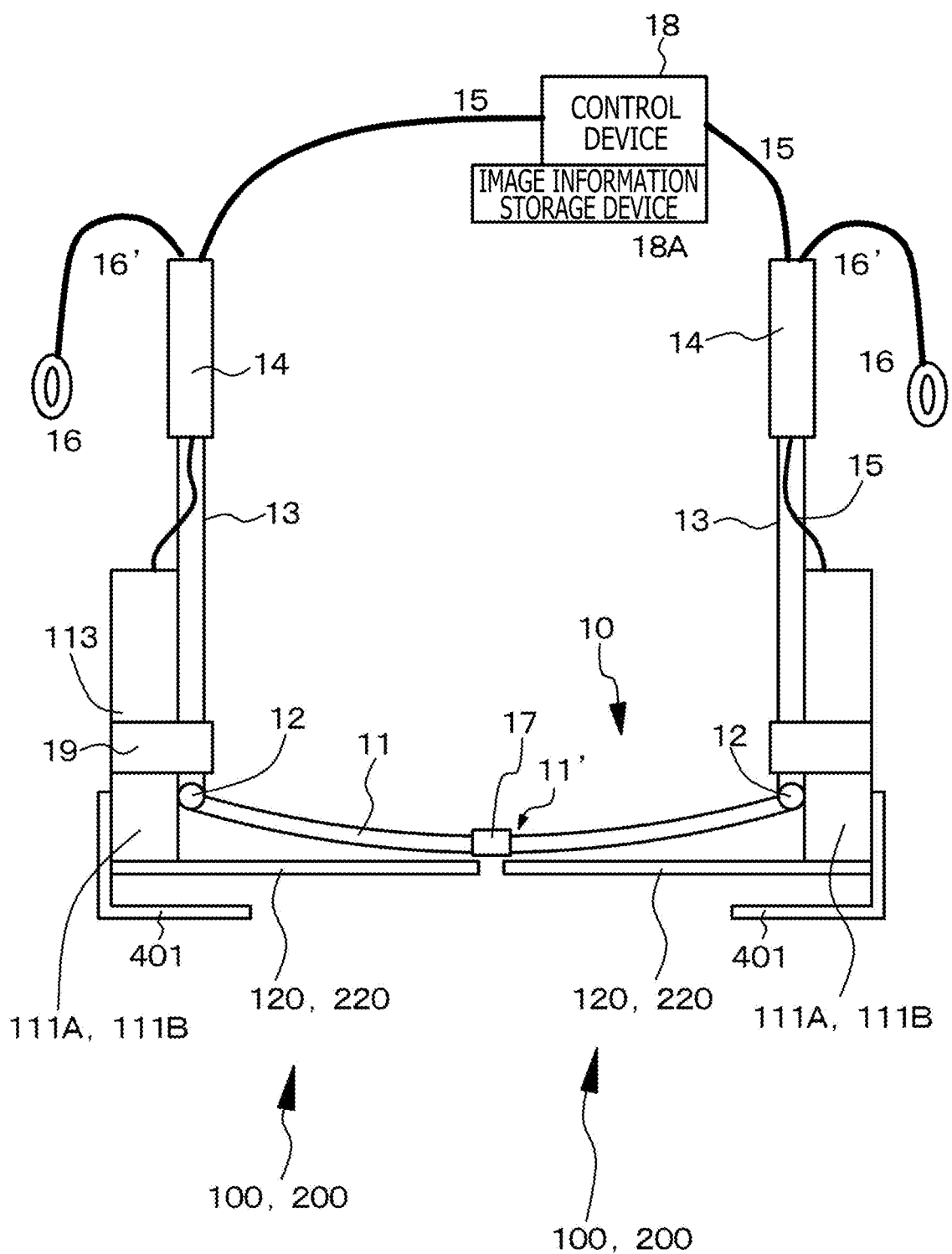
FIG. 12 is a schematic view, as viewed from above, of the display device of Example 10.
Figure 13:
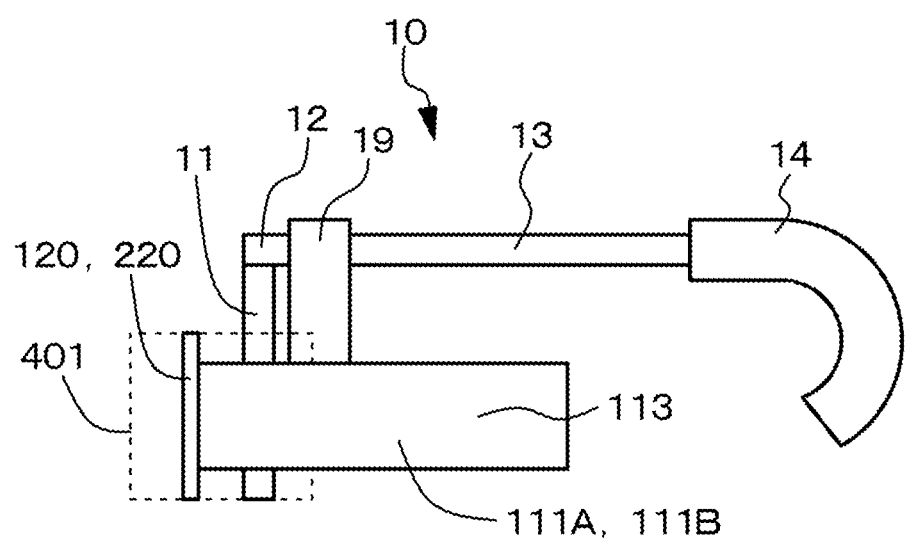
FIG. 13 is a schematic view, as viewed from a lateral side, of the display device of Example 10.

Example 10 is a modification of Examples 1 to 9. A conceptual figure of an image display device is depicted in FIG. 11, a schematic view of a display device as viewed from above is depicted in FIG. 12, and a schematic view of the same as viewed from a lateral side is depicted in FIG. 13. As depicted in the figures, in the display device of Example 10, a light shielding member 401 is disposed or provided on an outer side of a second surface 124B of a laminated structure 124 in such a manner as to cover first deflection means 130, first-A deflection means 130A or first-B deflection means 130B (hereinafter, these will be generically referred to as "the first deflection means 130 or the like"). Here, an orthogonal projection image of the first deflection means 130 or the like onto the laminated structure 124 is included in an orthogonal projection image of the light shielding member 401 onto the laminated structure 124.

Specifically, for example, the light shielding member 401 that shields incidence of external light on an optical device 120 or 220 is disposed in a region of the optical device 120 or 220 where light emitted from an image forming device 111 is incident, specifically, in a region where the first deflection means 130 or the like is provided. Here, the region of the optical device 120 or 220 where the light emitted from the image forming device 111 is incident is included in the projection image of the light shielding member 401 onto the optical device 120 or 220. The light shielding member 401 is disposed in or on the side opposite to the side on which the image forming device 111 of the optical device 120 or 220 is disposed, in the state of being spaced from the optical device 120 or 220. The light shielding member 401 is made, for example, from a transparent plastic material. The light shielding member 401 extends integrally from the housing 113 of the image forming device 111, or is attached to the housing 113 of the image forming device 111, or extends integrally from a frame 10, or is attached to the frame 10, or is attached to the optical device 120 or 220. Note that in the example depicted in the figures, the light shielding member 401 extends integrally from the housing 113 of the image forming device 111. Thus, the light shielding member 401 that shields incidence of external light on the optical device 120 or 220 is disposed in the region of the optical device 120 or 220 where the light emitted from the image forming device 111 is incident. Therefore, external light does not enter the region of the optical device 120 or 220 where the light emitted from the image forming device 111 is incident, specifically, on the first deflection means 130 or the like, so that undesired stray light or the like is prevented from being generated, and image display quality of the display device is prevented from being lowered.

Figure 14:
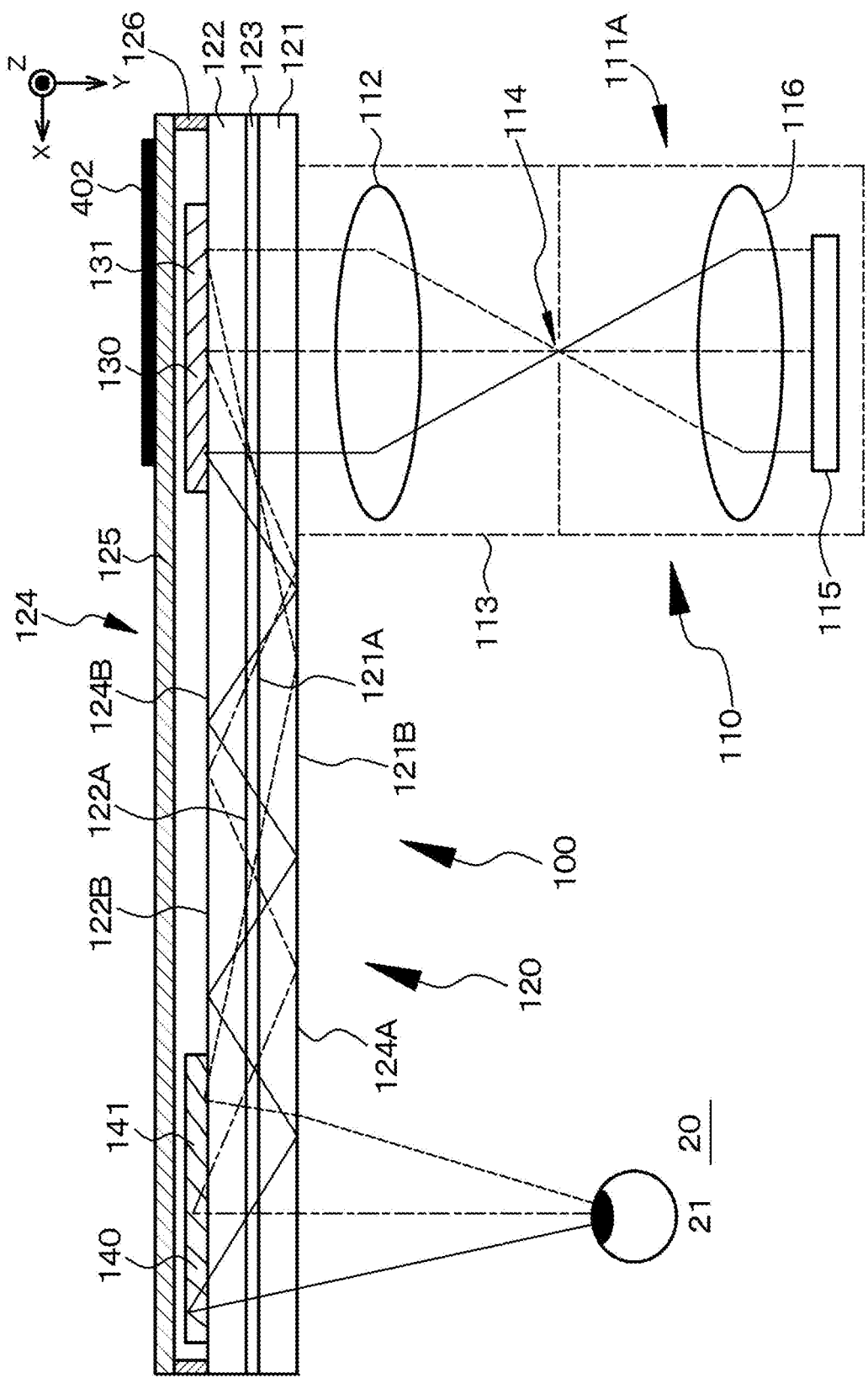
FIG. 14 is a conceptual figure of a modification of an image display device in the display device of Example 10.

Alternatively, as depicted in FIG. 14, a light shielding member 402 is disposed at a part of the optical device 120 or 220 on the side opposite to the side on which the image forming device 111 is disposed. Specifically, the light shielding member 402 can be formed by printing an opaque ink on the optical device 120 or 220 (specifically, a transparent protective member 125 that covers a second surface 124B of the laminated structure 124). An outer edge portion of the laminated structure 124 and an outer edge portion of the transparent protective member 125 are sealed or adhered by a sealing member 126. Note that the light shielding member 401 and the light shielding member 402 may be combined with each other.

Example 11

Figure 15:
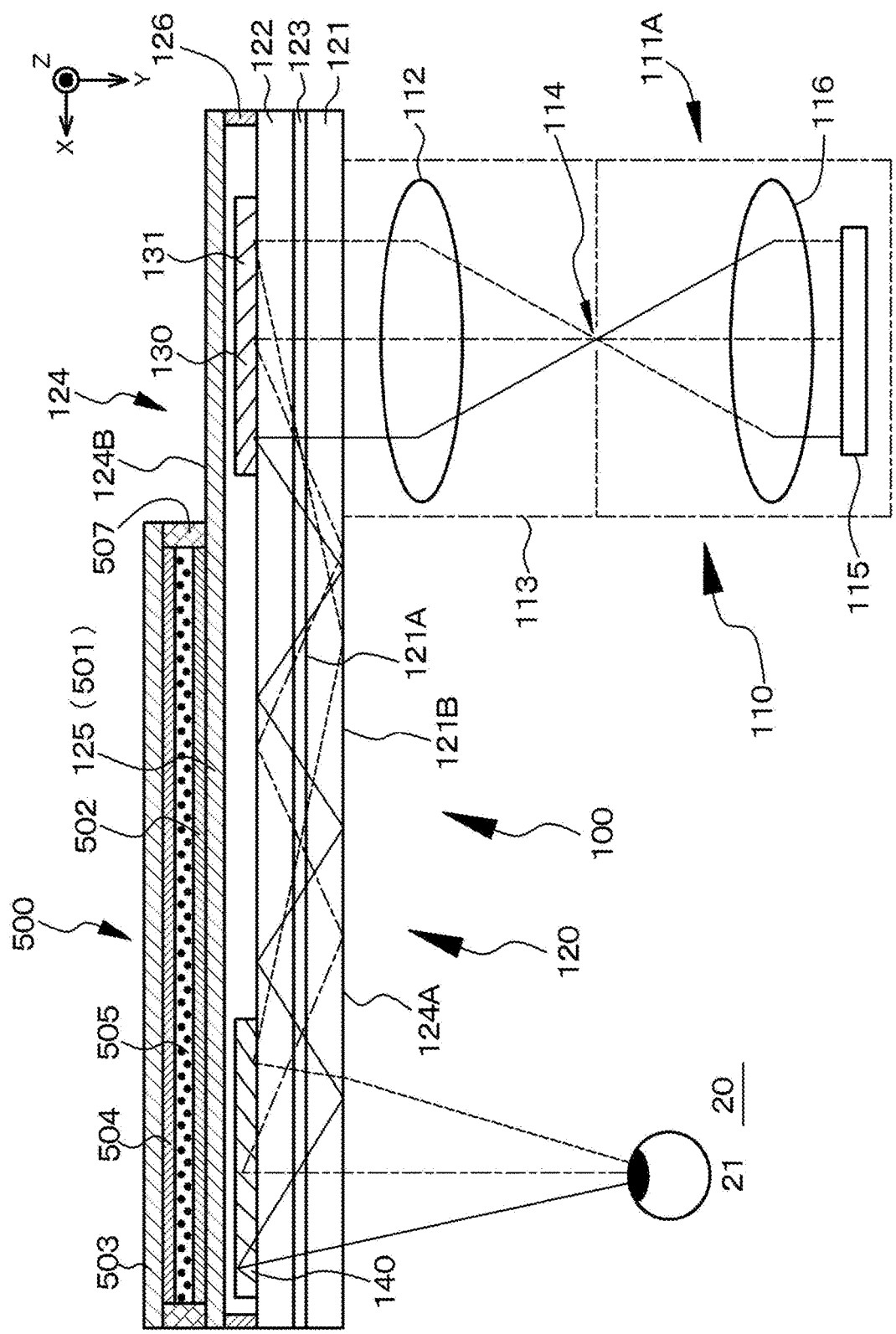
FIG. 15 is a conceptual figure of an image display device in a display device of Example 11.
Figure 16:
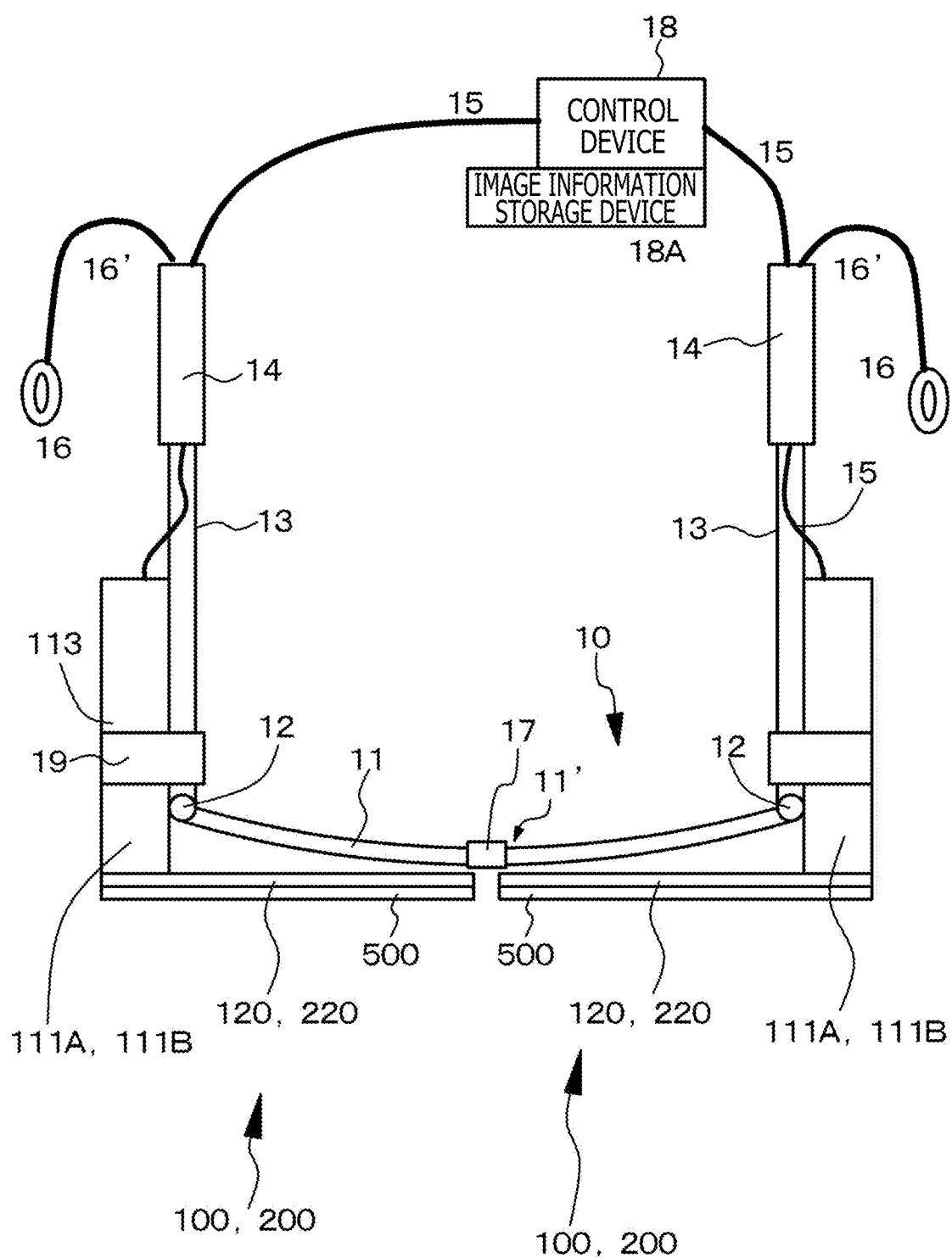
FIG. 16 is a schematic view, as viewed from above, of the display device of Example 11.
Figure 17A:
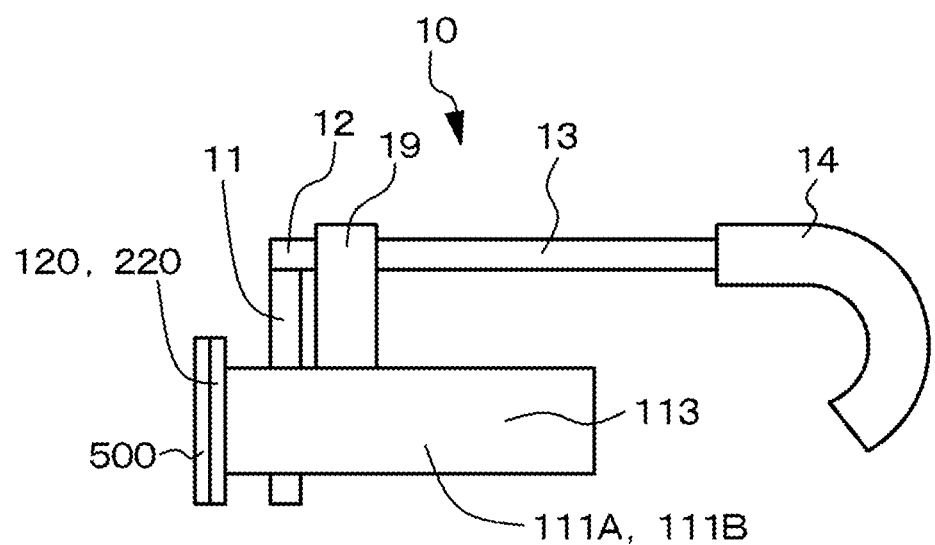
FIGS. 17A and 17B are a schematic view, as viewed from a lateral side, of the display device of Example 11, and a schematic view, as viewed from a front side, of parts of an optical device and a light controller in the display device of Example 11, respectively.
Figure 17B:
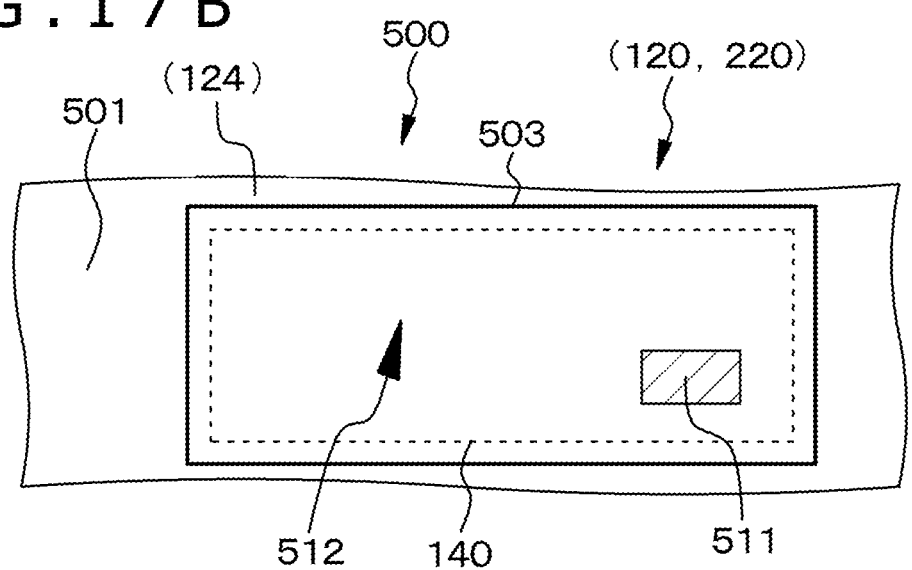
Figure 18A:
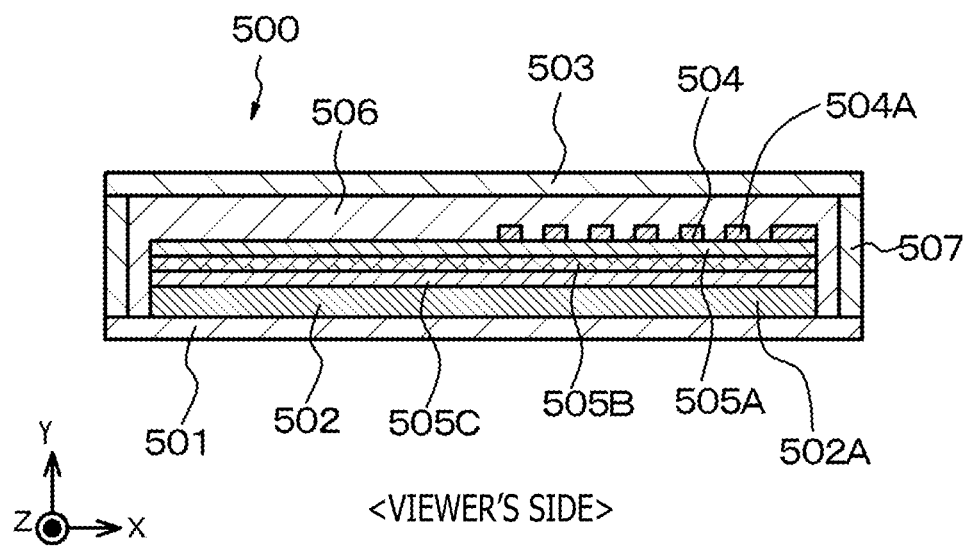
FIGS. 18A and 18B are a schematic sectional view of the light controller in the display device of Example 11, and a schematic front view of the light controller.
Figure 18B:
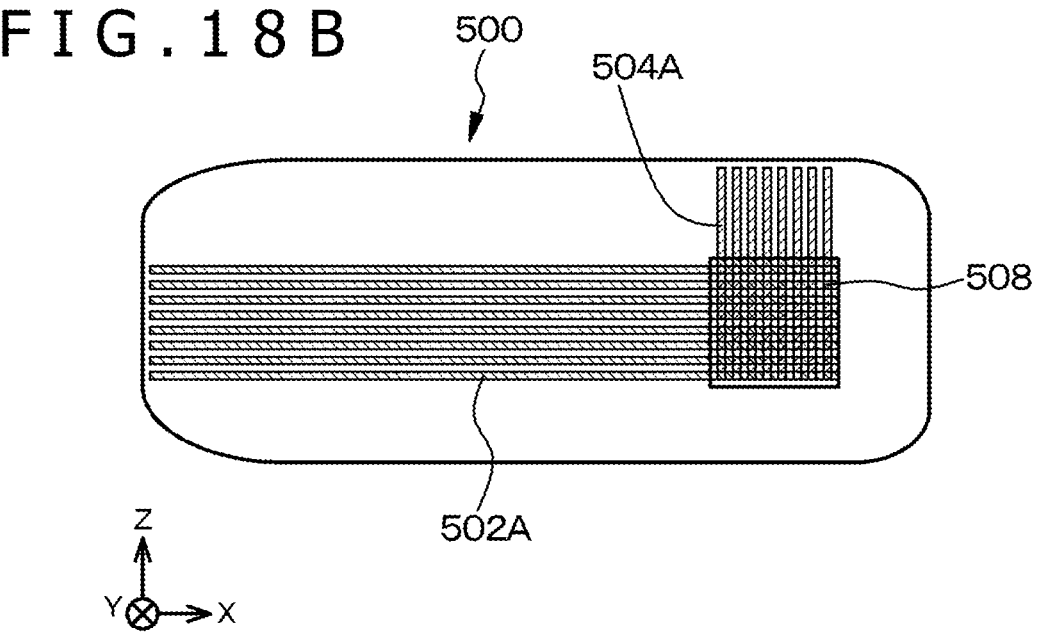

Example 11 is a modification of Examples 1 to 10. A conceptual figure of an image forming device of Example 11 is depicted in FIG. 15, a schematic view of a display device of Example 11 as viewed from above is depicted in FIG. 16, and a schematic view of the same as viewed from a lateral side is depicted in FIG. 17A. In addition, a schematic front view of an optical device and a light controller is depicted in FIG. 17B, a schematic sectional view of the light controller is depicted in FIG. 18A, and a schematic plan view of the light controller is depicted in FIG. 18B.

In Example 11, a light controller 500 is disposed in or on a second surface side of a laminated structure 124. The light controller 500 controls the quantity of external light that is externally incident. A virtual image formation region of an optical device 120 or 220 overlaps with the light controller 500. The light controller 500 is controlled such that when a virtual image is formed in a part of the virtual image formation region on the basis of the light emitted from an image forming device 111, the light shielding ratio in a virtual image projection region 511 of the light controller 500 in which a projection image of the virtual image onto the light controller 500 is included is higher than the light shielding ratio in other region 512 of the light controller 500. Note that the position of the virtual image projection region 511 in the light controller 500 is not fixed but varies depending on the position where the virtual image is formed; in addition, the number of the virtual image projection regions 511 also varies depending on the number of virtual images (or the number of a series of virtual image groups, the number of virtual image groups made into blocks, etc.).

When the light controller 500 operates, the light shielding ratio in the other region 512 of the light controller 500 is, for example, not more than 0.95, assuming that the light shielding ratio in the virtual image projection region of the light controller 500 in which the projection image of the virtual image onto the light controller 500 is included is "1." Alternatively, the light shielding ratio in the other region of the light controller 500 is, for example, not more than 30%. On the other hand, when the light controller 500 operates, the light shielding ratio in the virtual image projection region 511 of the light controller 500 is 35% to 99%, for example, 80%. The light shielding ratio in the virtual image projection region 511 may thus be constant, or may be varied depending on the illuminance in the environment in which the display device is situated, as will be described later.

In Example 11 or in Examples 12 and 13 which will be described later, the light controller 500 as a kind of optical shutter for controlling the quantity of external light that is externally incident is disposed in or on the side of the optical device 120 or 220 opposite to the side on which the image forming device 111 is disposed. In other words, the light controller 500 is disposed in a region on the side of the optical device 120 or 220 opposite to the side of the viewer 20. Thus, the optical device 120 or 220 and the light controller 500 are disposed in this order from the viewer's side; however, the light controller 500 and the optical device 120 or 220 may be disposed in this order from the viewer's side. A transparent protective member 125 functions also as a first substrate 501 of the light controller 500, whereby a reduction in the overall weight of the display device can be contrived, and an unpleasant feeling is not given to the user of the display device. In addition, a second substrate 503 can be made thinner than the transparent protective member 125. The same can be achieved also in Examples 12 and 13. It is to be noted, however, that this is not restrictive, and the transparent protective member 125 and the first substrate 501 of the light controller 500 may include different members. The size of the light controller 500 may be the same as, greater than or smaller than the size of a laminated structure 124. It is only necessary that the virtual image formation region (which is second deflection means 140, second-A deflection means 140A or second-B deflection means 140B, and these will hereinafter be generically referred to as "the second deflection means 140 or the like") should be located within the projection image of the light controller 500. A connector (not depicted) is attached to the light controller 500, and the light controller 500 is electrically connected to a control circuit (specifically, a control device 18) for controlling the light shielding ratio of the light controller 500, through the connector and a wiring.

In Example 11 or in Examples 12 and 13 which will be described later, as a schematic sectional view is depicted in FIG. 18A and a schematic plan view is depicted in FIG. 18B, the light controller 500 includes:

the first substrate 501;

the second substrate 503 that faces the first substrate 501;

a first transparent electrode 502 provided on an opposed surface of the first substrate 501 that is opposed to (faces) the second substrate 503;

a second transparent electrode 504 provided on an opposed surface of the second substrate 503 that is opposed to (faces) the first substrate 501; and a light controlling layer 505 sandwiched between the first transparent electrode 502 and the second transparent electrode 504. In addition, the first transparent electrode 502 includes a plurality of belt-shaped first transparent electrode segments 502A extending in a first direction;

the second transparent electrode 504 includes a plurality of belt-shaped second transparent electrode segments 504A extending in a second direction different from the first direction; and control of the light shielding ratio at a part of the light controller that corresponds to an overlapping region of the first transparent electrode segment 502A and the second transparent electrode segment 504A (a minimum unit region 508 where the light shielding ratio of the light controller varies) is performed based on control of a voltage or voltages to be impressed on the first transparent electrode segment 502A and the second transparent electrode segment 504A. The first direction and the second direction are orthogonal to each other; specifically, the first direction extends in a transverse (or row) direction (X-axis direction), and the second direction extends in a longitudinal (or column) direction (Z-axis direction).

The second substrate 503 includes a plastic material. In addition, the first transparent electrode 502 and the second transparent electrode 504 include transparent electrodes including indium-tin composite oxide (ITO), and are formed based on a combination of a PVD method such as sputtering method with a lift-off method. A protective layer 506 including a SiN layer, a SiO2 layer, an Al2O3 layer, a TiO2 layer or a stacked film thereof is formed between the second transparent electrode 504 and the second substrate 503. With the protective layer 506 formed, an ion shielding property for inhibiting migration of ions, water-proofing property, moisture-proofing property, and scratch resistance can be imparted to the light controller 500. In addition, the transparent protective member 125 (the first substrate 501) and the second substrate 503 are sealed at an outer edge portion with a sealing material 507 including UV-curing resin or thermosetting resin such as UV-curing epoxy resin or UV-and-heat-curing epoxy resin. The first transparent electrode 502 and the second transparent electrode 504 are connected to a control device 18 through a connector and a wiring which are not depicted.

The light shielding ratio (light transmittance) of the light controller 500 can be controlled by a voltage or voltages to be impressed on the first transparent electrode 502 and the second transparent electrode 504. Specifically, for example, when a voltage is impressed on the second transparent electrode 504 with the first transparent electrode 502 grounded, the light shielding ratio of the light controlling layer 505 is varied. The potential difference between the first transparent electrode 502 and the second transparent electrode 504 may be controlled, or the voltage impressed on the first transparent electrode 502 and the voltage impressed on the second transparent electrode 504 may be controlled independently.

Note that let the number of pixels in a transverse (or row) direction in the virtual image formation region (the second deflection means 140 or the like) in the light controller 500 be $M_0$, let the number of pixels in a longitudinal (or column) direction be No, then the number $M_1 \times N_1$ of the minimum unit regions 508 where the light shielding ratio of the light controller 500 varies is, for example, $M_0=M_1$ (that is, k=1) and $N_0=N_1$ (that is, k'=1), where $M_1/M_0=k$ and $N_1/N_0=k'$. It is to be noted, however, that this is not restrictive, and a mode can be adopted in which $1.1 \leq k$, preferably $1.1 \leq k \leq 1.5$, more preferably $1.15 \leq k \leq 1.3$, and $1.1 \leq k'$, preferably $1.1 \leq k' \leq 1.5$, more preferably $1.15 \leq k' \leq 1.3$. The values of k and k' may be equal or may be different, and, in this Example, k=k'=1.

In Example 11 or in Examples 12 and 13 which will be described later, the light controller 500 includes an optical shutter based on application of a color change of a substance generated by an oxidation-reduction reaction of an electrochromic material. Specifically, the light controlling layer includes an electrochromic material. More specifically, the light controlling layer has a stacked structure of $WO_3$ layer 505A/$Ta_2O_5$ layer 505B/$Ir_xSn_{1-x}O$ layer 505C from the second transparent electrode side. The $WO_3$ layer 505A shows reduction development. Besides, the $Ta_2O_5$ layer 505B constitutes a solid electrolyte, and the $Ir_xSn_{1-x}O$ layer 505C shows oxidation color development.

In the $Ir_xSn_{1-x}O$ layer, Ir and $H_2O$ react with each other, to exist as iridium hydroxide $Ir(OH)_n$. When a negative potential is applied to the second transparent electrode 504 and a positive potential is applied to the first transparent electrode 502, migration of protons $H^+$ from the $Ir_xSn_{1-x}O$ layer into the $Ta_2O_5$ layer and release of electrons to the first transparent electrode 502 are generated, and the following oxidation reaction proceeds, resulting in coloring of the $Ir_xSn_{1-x}O$ layer.

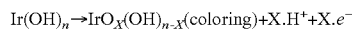

$$Ir(OH)_n \to IrO_X(OH)_{n-X}(\text{coloring}) + X \cdot H^+ + X \cdot e^-$$

On the other hand, protons $H^+$ in the $Ta_2O_5$ layer migrate into the $WO_3$ layer, electrons are injected from the second transparent electrode 504 into the $WO_3$ layer, and, in the $WO_3$ layer, the following reduction reaction proceeds, resulting in coloring of the $WO_3$ layer.

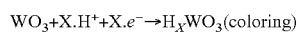

$$WO_3 + X \cdot H^+ + X \cdot e^- \to H_XWO_3(\text{coloring})$$

Conversely, when a positive potential is applied to the second transparent electrode 504 and a negative potential is applied to the first transparent electrode 502, a reduction reaction proceeds in the reverse direction to the abovementioned in the $Ir_xSn_{1-x}O$ layer, resulting in decoloring, and an oxidation reaction proceeds in the reverse direction to the above-mentioned in the $WO_3$ layer, resulting in decoloring. Note that $H_2O$ is contained in the $Ta_2O_5$ layer, and is ionized upon impression of voltage on the first transparent electrode and the second transparent electrode, to be contained in the state of protons $H^+$ and $OH^-$ ions, thereby contributing to the coloring reaction and the decoloring reaction.

Information or data relating to an image to be displayed on the image display device 100, 200, or 300 or a signal to be received by a receiver is recorded, stored or preserved in, for example, a so-called cloud computer or server. Where the display device is provided with communication means (transmission-reception device), for example, a mobile phone or smart phone, or where communication means (reception device) is incorporated in the control device (control circuit, control means) 18, transfer or exchange of various information, data or signal between the cloud computer or server and the display device through the communication means can be performed, a signal based on various information or data, namely, a signal for displaying an image on the image display device 100, 200, or 300 can be received, and the reception device can receive the signal.

Specifically, when an input indicating a demand for "information" to be acquired is given to a mobile phone or smart phone by the viewer, the mobile phone or smart phone accesses a cloud computer or server, and acquires the "information" from the cloud computer or server. In this way, the control device 18 receives the signal for displaying an image on the image display device 100, 200, or 300. In the control device 18, a known image processing is conducted based on this signal, and the "information" is displayed as an image on the image forming device 111. The image of the "information" is displayed in the optical device 120, 220, or 320 as a virtual image at a predetermined position controlled by the control device 18, based on the light emitted from the image forming device 111. Specifically, a virtual image is formed at a part of a virtual image formation region (the second deflection means 140 or the like).

In the case where the light controller 500 is provided, the light controller 500 is controlled such that the light shielding ratio in a virtual image projection region 511 of the light controller 500 where a projection image of the virtual image onto the light controller 500 is included is higher than the light shielding ratio in the other region 512 of the light controller 500. Specifically, a voltage or voltages to be impressed on the first transparent electrode 502 and the second transparent electrode 504 are controlled by the control device 18. Here, the size and position of the virtual image projection region 511 of the light controller 500 are determined based on the signal for displaying the image on the image forming device 111.

In some cases, the signal for displaying an image on the image display device 100, 200, or 300 may be stored in the display device (specifically, in the control device 18 or an image information storage device 18A).

Alternatively, a mode may be adopted in which an image picked up by an imaging device 17 provided in the display device is outputted to a cloud computer or server through communication means, various information or data corresponding to the image picked up by the imaging device 17 is searched in the cloud computer or server, the various information or data thus searched is outputted to the display device through the communication means, and the searched various information or data is displayed as an image or images on the image display device 100, 200, or 300. In addition, when such a mode and inputting of the "information" are used jointly, for example, information regarding the place where the viewer is present, the direction in which the viewer faces, etc. can be weighted, so that the "information" can be displayed on the image forming device 111 with higher accuracy.

A mode may be adopted in which the light shielding ratio in the virtual image projection region 511 of the light controller 500 is increased, prior to the formation of a virtual image on the optical device 120 or 220 based on the light emitted from the image forming device 111. The time from the increase in the light shielding ratio in the virtual image projection region 511 of the light controller 500 to the formation of the virtual image may be, for example, 0.5 to 30 seconds, the value being not restrictive. In this way, at what position of the optical device and when the virtual image is going to be formed can be preliminarily grasped by the viewer, and enhancement of virtual image visibility to the viewer can be contrived. A mode can be adopted in which the light shielding ratio in the virtual image projection region 511 of the light controller 500 is sequentially increases as time passes. In other words, so-called a fade-in state can be realized.

In the case where the virtual image is not formed, the light shielding ratio of the light controller 500 as a whole need only be set equal to the light shielding ratio in the other region of the light controller 500. When the formation of the virtual image is finished and the virtual image has disappeared, the light shielding ratio in the virtual image projection region 511 of the light controller 500 where the projection image of the virtual image onto the light controller 500 is included may immediately be set equal to the light shielding ratio in the other region of the light controller 500. However, the light shielding ratio in the virtual image projection region 511 may be set equal to the light shielding ratio in the other region of the light controller 500 with a lapse of time (for example, in three seconds). In other words, a so-called fade-out state can be realized.

Figure 19A:
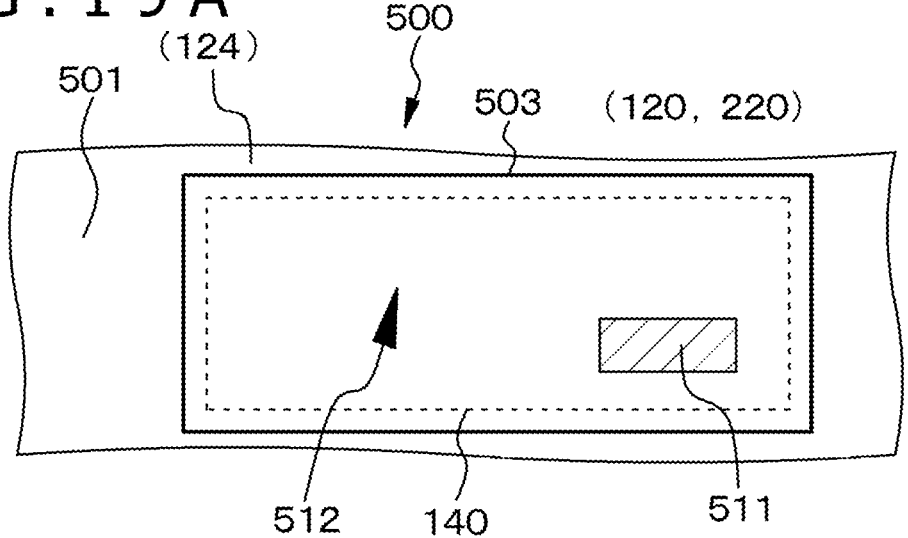
Figure 19B:
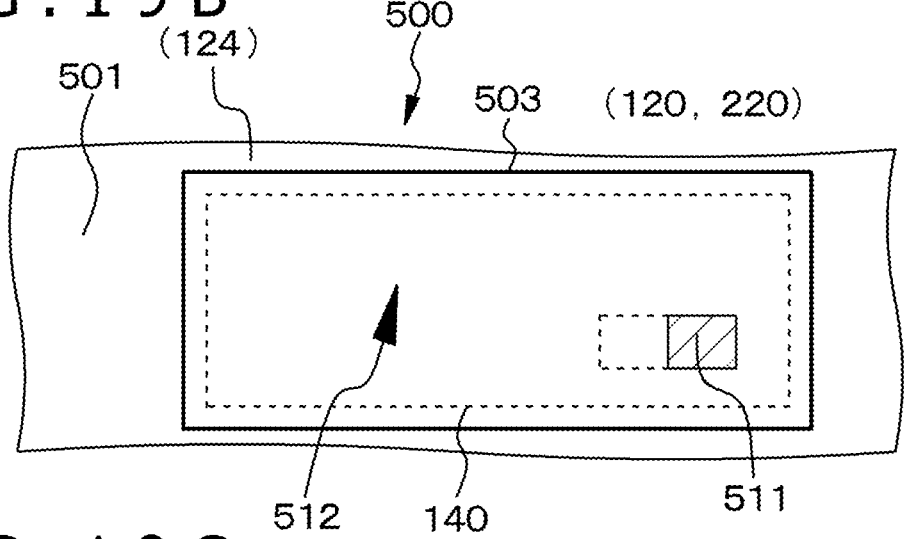
Figure 19C:
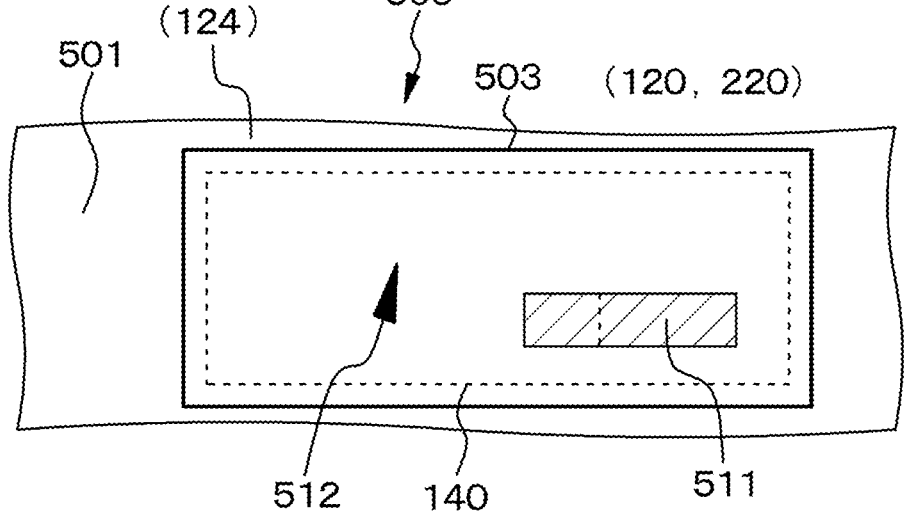

A case is assumed in which one virtual image is formed on the optical device 120 or 220 based on the light emitted from the image forming device 111 and, next, a next virtual image different from the one virtual image is formed. In this case, let the area of a virtual image projection region 511 of the light controller 500 that corresponds to the one virtual image be $S_1$, and let the area of a virtual image projection region 511 of the light controller 500 that corresponds to the next virtual image be $S_2$ then a mode can be adopted in which:

in the case where $S_2/S_1 < 0.8$ or $1 < S_2/S_1$, the virtual image projection region 511 of the light controller 500 in which the next virtual image is formed is a region of the light controller 500 in which the projection image of the next virtual image onto the light controller 500 is included (see FIGS. 19A, 19B and 19C); and in the case where $0.8 \leq S_2/S_1 \leq 1$, the virtual image projection region 511 of the light controller 500 in which the next virtual image is formed is a region of the light controller 500 in which the projection image of the one virtual image onto the light controller 500 is included. In other words, a mode can be adopted in which the virtual image projection region corresponding to the one virtual image can be maintained (that is, the state depicted in FIG. 19A can be maintained) in the case where the reduction in the area of the virtual image projection region from the formation of the one virtual image to the formation of the next virtual image is 0% to 20%.

Figure 20:
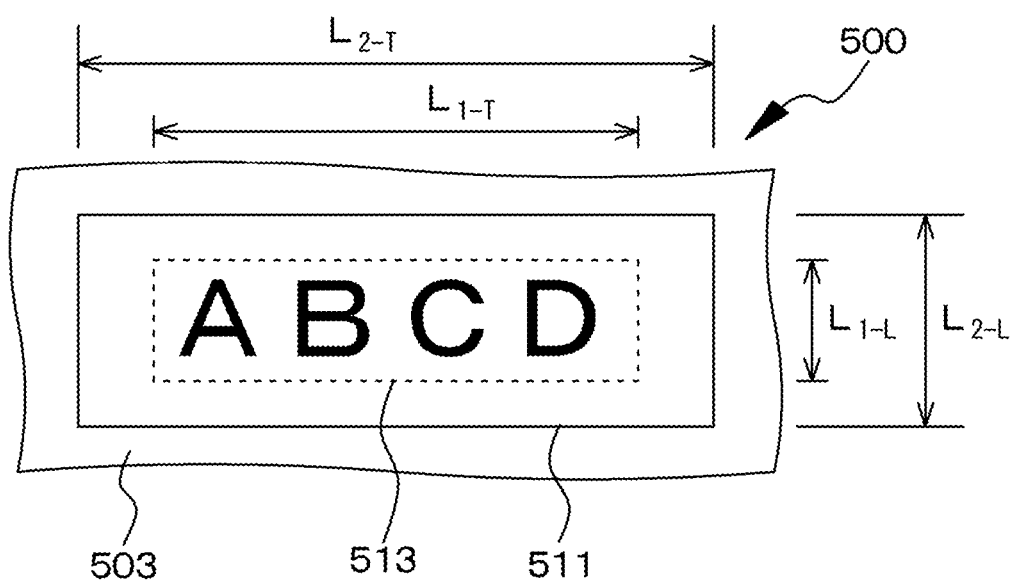
FIG. 20 is a figure depicting schematically a virtual rectangle circumscribing a virtual image formed in an optical device and a rectangular shape of a virtual image projection region of the light controller.

In addition, a mode can be adopted in which when a virtual rectangle 513 circumscribing the virtual image formed on the optical device 120 or 220 is assumed, the virtual image projection region 511 of the light controller 500 is larger than the virtual rectangle 513, as depicted in FIG. 20. In this case, let the lengths in the transverse direction and the longitudinal direction of the virtual rectangle 513 circumscribing the virtual image formed on the optical device 120 or 220 be $L_{1-T}$ and $L_{1-L}$ and let the shape of the virtual image projection region 511 of the light controller 500 be a rectangular shape having lengths in transverse and longitudinal directions of $L_{2-T}$ and $L_{2-L}$, then it is preferable that the conditions of:

$$1.0 \leq L_{2-T}/L_{1-T} \leq 1.5, \text{ and}$$

$$1.0 \leq L_{2-L}/L_{1-L} \leq 1.5$$

are satisfied. Note that in FIG. 20, a state in which "ABCD" is formed as a virtual image.

The light controller 500 may be normally in an operating state, or operating/non-operating (on/off) states may be prescribed by a viewer's command (operation); alternatively, the light controller 500 may be normally in a non-operating state and its operation may be started based on a signal for displaying an image on the image display device 100, 200, or 300. In order to prescribe the operating/non-operating state by the viewer's command (operation), it is sufficient that, for example, the display device is provided further with a microphone and the operation of the light controller 500 is controlled by a voice input through the microphone. Specifically, switching of operation/non-operation of the light controller 500 may be controlled by the command based on a natural voice of the viewer. Alternatively, information to be acquired may be inputted through a voice input. Alternatively, it is sufficient that the display device is provided further with an IR emitting/receiving device and the operation of the light controller 500 is controlled by the IR emitting/receiving device. Specifically, it is sufficient that a viewer's wink is detected by the IR emitting/receiving device, and switching of operation/non-operation of the light controller 500 is controlled thereby.

As has been described above, in the display device of Example 11, when a virtual image is formed at a part of the virtual image formation region based on the light emitted from the image forming device, the light controller is controlled in such a manner that the light shielding ratio in the virtual image projection region of the light controller in which the projection image of the virtual image onto the light controller is included is higher than the light shielding ratio in the other region of the light controller. Therefore, a high contrast can be imparted to the virtual image viewed by the viewer. Moreover, since the region with a high light shielding ratio is not the whole region of the light controller but is a narrow region of the virtual image projection region of the light controller in which the projection image of the virtual image onto the light controller is included, the viewer using the display device can recognize the external environment assuredly and safely.

A mode may be adopted in which a frame is provided with a front section disposed in front of the viewer, two temple sections rotatably attached to both ends of the front section through hinges, and nose pads, and the light controller 500 is disposed in or on the front section. In addition, the optical device may be mounted to the light controller 500. Note that the optical device may be mounted to the light controller 500 in a close contact state, or may be mounted to the light controller 500 with a gap therebetween. Further, in these cases, as aforementioned, a mode may be adopted in which the front section has a rim, and the light controller 500 is fitted in the rim. Alternatively, a mode may be adopted in which at least one of the laminated structure 124 (the first substrate 501) and the second substrate 503 is fitted in the rim, a mode may be adopted in which the light controller 500 and the laminated structure 124 are fitted in the rim, and a mode may be adopted in which the laminated structure 124 is fitted in the rim.

The light controlling layer 505 may include an optical shutter including a liquid crystal display. In this case, specifically, the light controlling layer 505 includes a liquid crystal material layer including, for example, a TN (twisted nematic) liquid crystal material or an STN (super-twisted nematic) liquid crystal material. A first transparent electrode 502 and a second transparent electrode 504 are patterned, and the light shielding ratio (light transmittance) in a partial region 512 of the light controller 500 can be varied to be different from the light shielding ratio in the other region. Alternatively, either one of the first transparent electrode 502 and the second transparent electrode 504 is a so-called solid electrode that is not patterned, while the other is patterned, and the other is connected to a TFT. Then, control of the light shielding ratio in a minimum unit region 508 where the light shielding ratio of the light controller 500 varies is performed by the TFT. In other words, the control of the light shielding ratio may be conducted based on an active matrix system. It is natural that the control of the light shielding ratio based on the active matrix system is applicable to the light controller 500 described in Example 11 or in Examples 12 and 13 which will be described later.

In addition, an optical shutter that controls the light shielding ratio (light transmittance) by an electro-wetting phenomenon can also be used. Specifically, a structure is adopted in which a first transparent electrode and a second transparent electrode are provided, and a space between the first transparent electrode and the second transparent electrode is filled with an insulating first liquid and a conductive second liquid. Then, a voltage is impressed between the first transparent electrode and the second transparent electrode, whereby the shape of the interface formed by the first liquid and the second liquid is changed, for example, from a flat surface shape into a curved shape, and the light shielding ratio (light transmittance) can be thereby controlled. Alternatively, an optical shutter formed by applying an electrode-position system (electrolytic deposition) based on an electrodeposition-dissociation phenomenon generated by a reversible oxidation-reduction reaction of a metal (for example, silver particles) can also be used. Specifically, $Ag^+$ and $I^-$ are preliminarily dissolved in an organic solvent, and an appropriate voltage is impressed on electrodes, whereby $Ag^+$ is reduced to be deposited as Ag, thereby lowering the light shielding ratio (light transmittance) of the light controller; on the other hand, Ag is oxidized to be dissolved as $Ag^+$, thereby raising the light shielding ratio (light transmittance) of the light controller.

In some cases, a configuration may be adopted in which the light passing through the light controller is colored in a desired color by the light controller; in this case, the color in which the light is colored by the light controller can be varied. Specifically, it is sufficient to laminate on one another, for example, a light controller by which the light is colored in red, a light controller by which the light is colored in green, and a light controller by which the light is colored in blue.

The light controller may be detachably disposed in a region where the light of the optical device is emitted. In order to detachably disposing the light controller in this way, it is sufficient that, for example, the light controller is mounted to the optical device by use of a small screw or screws including a transparent plastic, and is connected to a control circuit (for example, one included in a control device 18 for controlling the image forming device) for controlling the light shielding ratio of the light controller, through a connector and a wiring.

Example 12

Figure 21A:
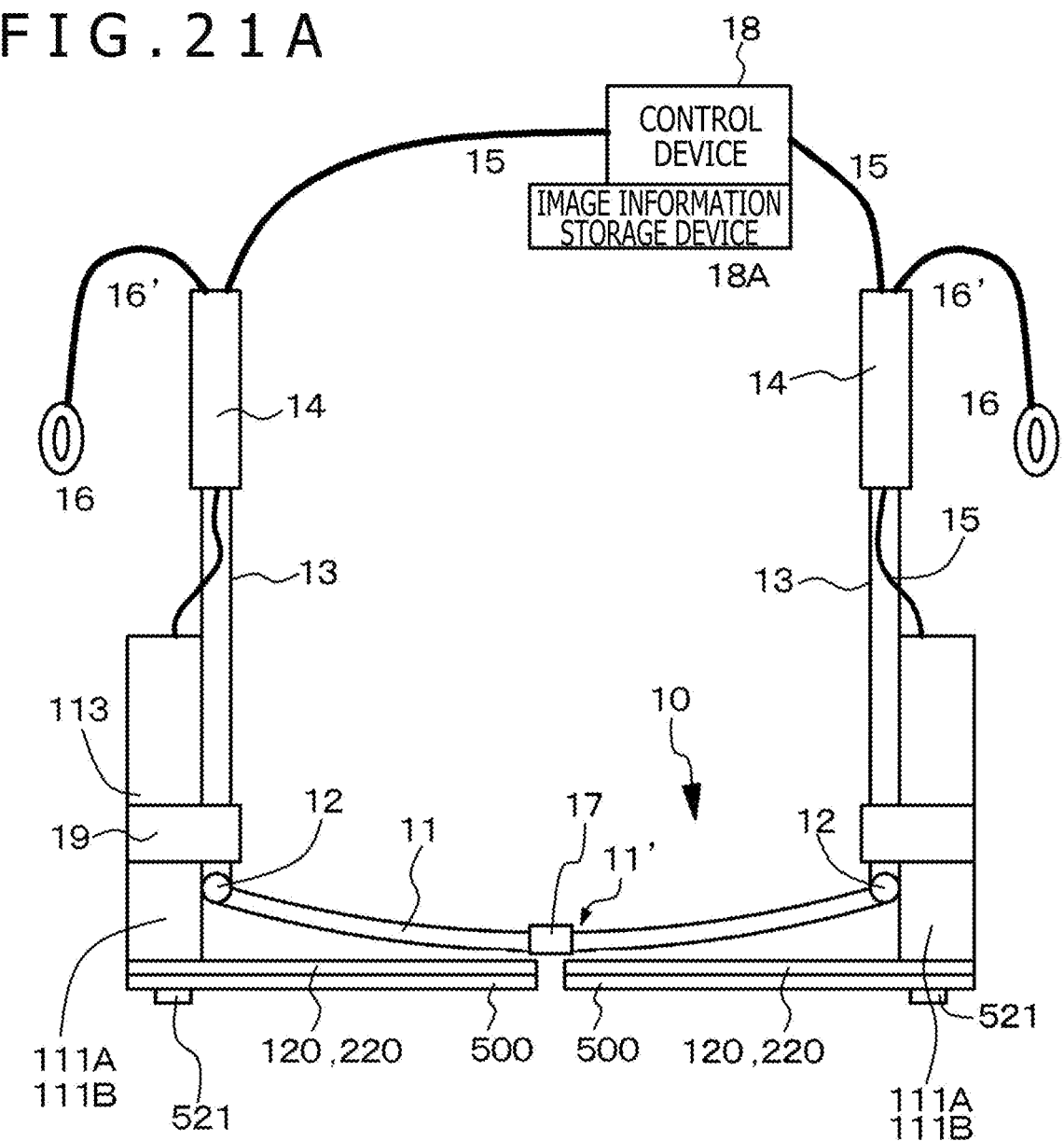
FIGS. 21A and 21B are a schematic view, as viewed from above, of a display device of Example 12, and a schematic diagram of a circuit for controlling an environmental illuminance measuring sensor, respectively.
Figure 21B:
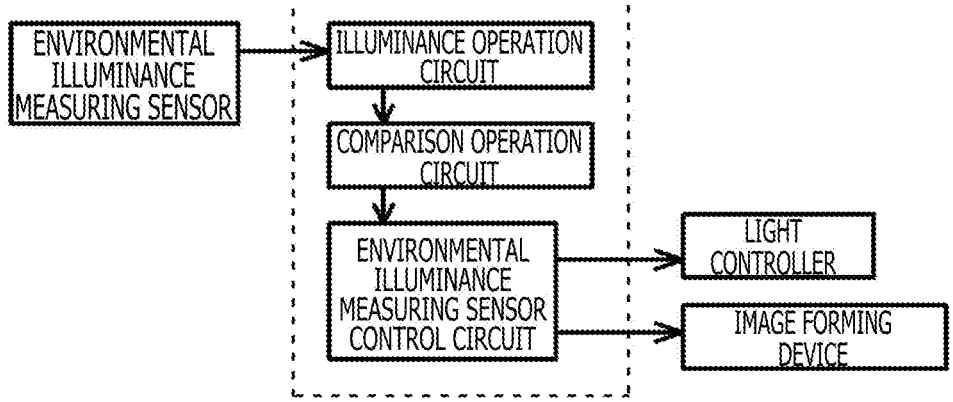

Example 12 is a modification of Example 11. A schematic view of a display device of Example 12 as viewed from above is depicted in FIG. 21A. In addition, a schematic diagram of a circuit for controlling an environmental illuminance measuring sensor is depicted in FIG. 21B.

The display device of Example 12 is provided further with an environmental illuminance measuring sensor 521 for measuring the illuminance of the environment in which the display device is situated, and the light shielding ratio of a light controller 500 is controlled based on the result of measurement by the environmental illuminance measuring sensor 521. Together with this or independently, the luminance of an image formed on an image forming device 111 is controlled based on the result of measurement by the environmental illuminance measuring device 521. The environmental illuminance measuring sensor 521, which has a known configuration or structure, need only be disposed at an outside end portion of an optical device 120 or 220 or at an outside end portion of the light controller 500. The environmental illuminance measuring sensor 521 is connected to a control device 18 through a connector and a wiring which are not illustrated. The control device 18 includes a circuit for controlling the environmental illuminance measuring sensor 521. The circuit for controlling the environmental illuminance measuring sensor 521 includes an illuminance operation circuit that receives a measurement from the environmental illuminance measuring sensor 521 and determines the illuminance, a comparison operation circuit that compares the illuminance value obtained by the illuminance operation circuit with a reference value, and an environmental illuminance measuring sensor control circuit that controls the light controller 500 and/or the image forming device 111 based on the value obtained by the comparison operation circuit, these circuits being able to include known circuits. In controlling the light controller 500, control of the light shielding ratio of the light controller 500 is performed. On the other hand, in controlling the image forming device 111, control of the luminance of an image formed by the image forming device 111 is performed. Note that the control of the light shielding ratio in the light controller 500 and the control of the luminance of the image formed in the image forming device 111 may be carried out independently or may be carried out with a correlation therebetween.

For instance, when the result of measurement by the environmental illuminance measuring sensor 521 has become not less than a predetermined value (first illuminance measurement), the light shielding ratio of the light controller 500 is set to be not less than a predetermined value (first light shielding ratio). On the other hand, when the result of measurement by the environmental illuminance measuring sensor 521 has become not more than a predetermined value (second illuminance measurement), the light shielding ratio of the light controller 500 is set to be not more than a predetermined value (second light shielding ratio). Here, the first illuminance measurement may be, for example, 10 lux, the first light shielding ratio may be, for example, a value in the range of 99% to 70%, the second illuminance measurement may be, for example, 0.01 lux, and the second light shielding ratio may be, for example, a value in the range of 49% to 1%.

Note that the environmental illuminance measuring sensor 521 in Example 12 is applicable to the display devices described in Examples 1 to 10. In addition, in the case where the display device is provided with an imaging device 17, the environmental illuminance measuring sensor 521 may also include a light receiving element for exposure measurement that is provided in the imaging device 17.

In the display device of Example 12 or of Example 13 which will be described below, the light shielding ratio of the light controller is controlled based on the result of measurement by the environmental illuminance measuring sensor, the luminance of an image formed on the image forming device is controlled based on the result of measurement by the environmental illuminance measuring sensor, and the light shielding ratio of the light controller is controlled based on the result of measurement by a transmitted light illuminance measuring sensor, and the luminance of an image formed on the image forming device is controlled based on the result of measurement by the transmitted light illuminance measuring sensor. Therefore, a high contrast can be imparted to the virtual image viewed by the viewer, and optimization of a viewed state of the virtual image depending on the illuminance of the surrounding environment where the display device is situated can be contrived.

Example 13

Figure 22A:
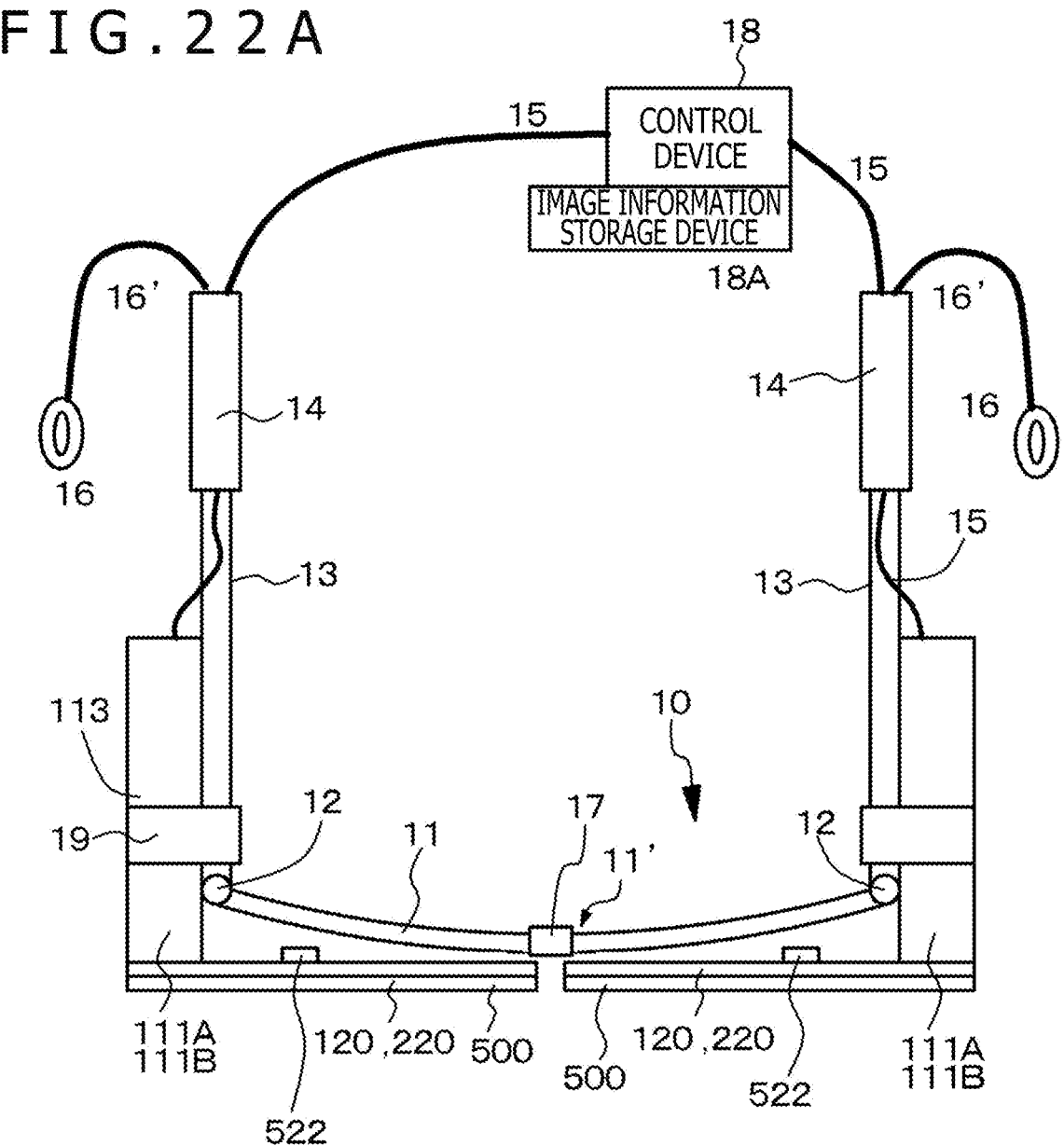
FIGS. 22A and 22B are a schematic view, as viewed from above, of a display device of Example 13, and a schematic diagram of a circuit for controlling a transmitted light illuminance measuring sensor, respectively.
Figure 22B:
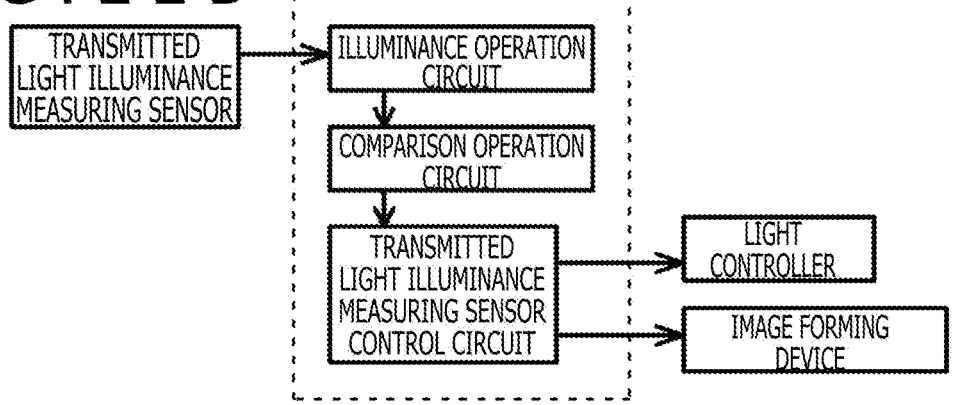

Example 13 also is a modification of Example 11. A schematic view of a display device of Example 13 as viewed from above is depicted in FIG. 22A. In addition, a schematic diagram of a circuit for controlling a transmitted light illuminance measuring sensor is depicted in FIG. 22B.

The display device of Example 13 is provided further with a transmitted light illuminance measuring sensor 522 that measures illuminance based on light coming from an external environment and transmitted through a light controller, namely, measures whether or not environmental light is transmitted through the light controller so as to be incident while being controlled to a desired illuminance. Based on the result of measurement by the transmitted light illuminance measuring sensor 522, the light shielding ratio of the light controller 500 is controlled. Together with this or independently, the luminance of an image formed by an image forming device 111 is controlled based on the result of measurement by the transmitted light illuminance measuring sensor 522. The transmitted light illuminance measuring sensor 522, which has a known configuration or structure, is disposed more on the viewer's side than an optical device 120 or 220. Specifically, the transmitted light illuminance measuring sensor 522 need only be disposed, for example, on an inside surface of a housing 113, or on a viewer's side surface of a laminated structure 124. The transmitted light illuminance measuring sensor 522 is connected to a control device 18 through a connector and a wiring which are not illustrated. The control device 18 includes a circuit for controlling the transmitted light illuminance measuring sensor 522. The circuit for controlling the transmitted light illuminance measuring sensor 522 includes an illuminance operation circuit that receives a measurement from the transmitted light illuminance measuring sensor 522 and determines the illuminance, a comparison operation circuit that compares the illuminance value determined by the illuminance operation circuit with a reference value, and a transmitted light illuminance measuring sensor control circuit that controls a light controller 500 and/or an image forming device 111 based on the value obtained by the comparison operation circuit, these circuits being able to include known circuits. In controlling the light controller 500, control of the light shielding ratio of the light controller 500 is performed. On the other hand, in controlling the image forming device 111, control of the luminance of an image formed by the image forming device 111 is conducted. Note that the control of the light shielding ratio in the light controller 500 and the control of the luminance of an image in the image forming device 111 may be carried out independently or may be carried out with a correlation therebetween. Further, in the case where the result of measurement by the transmitted light illuminance measuring sensor 522 has not yet been controlled to a desired illuminance taking into account the illuminance detected by the environmental illuminance measuring sensor 521, namely, in the case where the result of measurement by the transmitted light illuminance measuring sensor 522 has not yet been controlled to a desired illuminance, or in the case where a further subtle illuminance control is desired, it is sufficient to control the light shielding ratio of the light controller while monitoring the value determined by the transmitted light illuminance measuring sensor 522. A configuration may be adopted in which at least two transmitted light illuminance measuring sensors are disposed, and measurement of illuminance based on the light transmitted through a high light shielding ratio portion and measurement of illuminance based on the light transmitted through a low light shielding ratio portion are performed.

Note that the transmitted light illuminance measuring sensor 522 in Example 13 is applicable to the display devices described in Examples 1 to 10. Alternatively, the transmitted light illuminance measuring sensor 522 in Example 13 and the environmental illuminance measuring sensor 521 in Example 12 may be combined with each other. In this case, by conducting various tests, the control of the light shielding ratio in the light controller 500 and the control of the luminance of an image in the image forming device 111 may be carried out independently or carried out with a correlation therebetween. In each of the light controller for the right eye and the light controller for the left eye, a voltage or voltages to be impressed on a first transparent electrode and a second transparent electrode may be controlled, whereby equalization of the light shielding ratio in the light controller for the right eye and the light shielding ratio in the light controller for the left eye can be contrived. A potential difference between the first transparent electrode and the second transparent electrode may be controlled, or the voltage impressed on the first transparent electrode and the voltage impressed on the second transparent electrode may be controlled independently. The light shielding ratio in the light controller for the right eye and the light shielding ratio in the light controller for the left eye can be controlled, for example, based on the result of measurement by the transmitted light illuminance measuring sensor 522. Alternatively, a configuration can be adopted in which the viewer observes the brightness of the light passed through the light controller and the optical device for the right eye and the brightness of the light passed through the light controller and the optical device for the left eye, and the viewer performs manual control or adjustment by operating a switch, a button, a dial, a slider, a knob or the like.

Example 14

Example 14 is a modification of Examples 3 to 6.

Figure 29A:
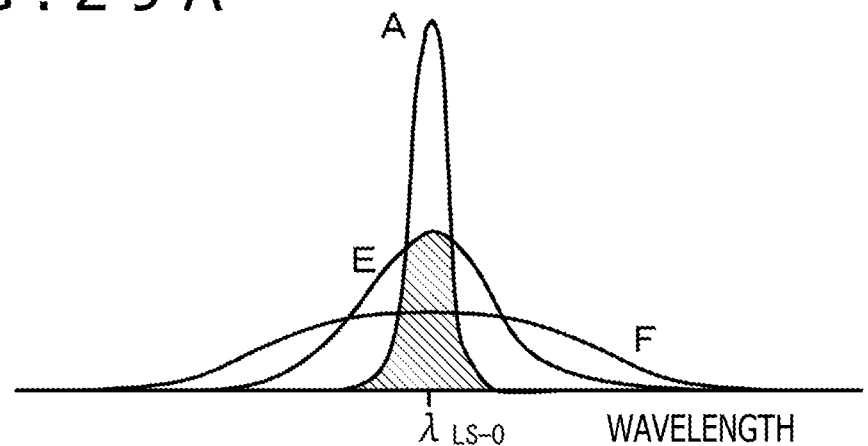
FIGS. 29A, 29B and 29C are schematic diagrams for explaining the relation between light incident on an optical device in a conventional display device and brightness of an image viewed by a viewer.
Figure 29B:
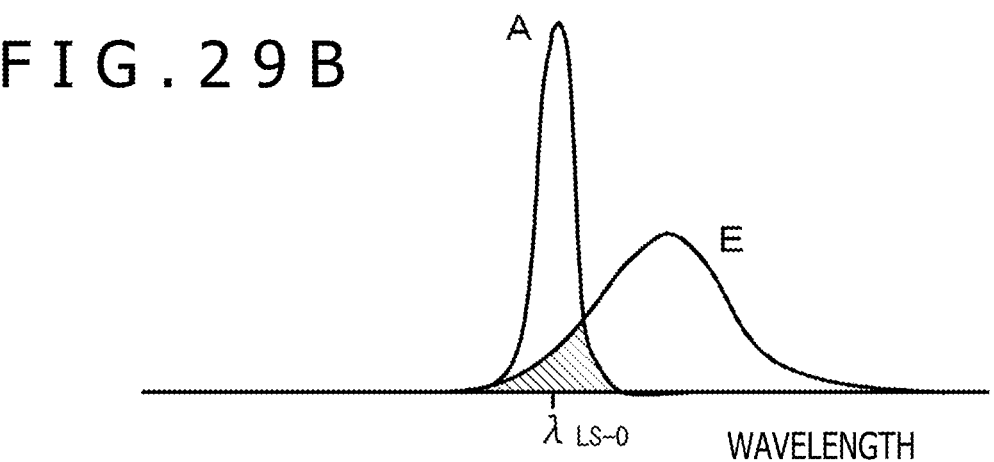
Figure 29C:
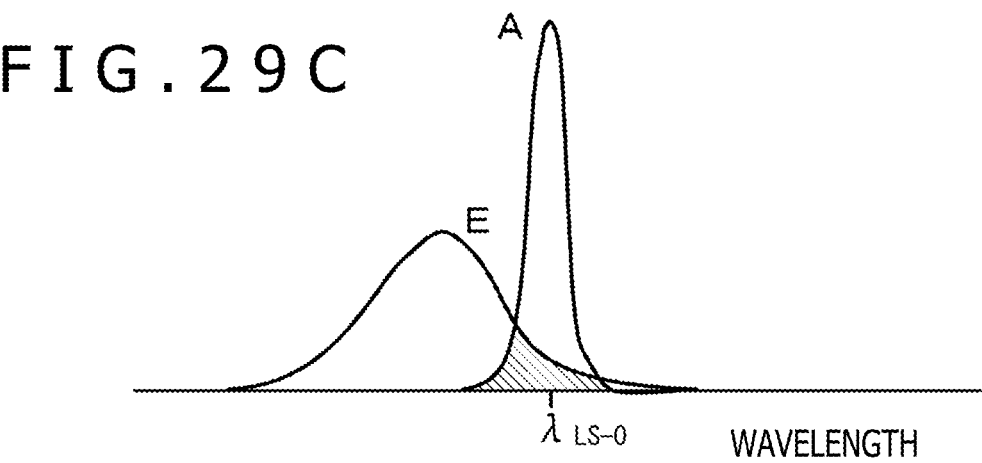

Schematic diagrams for explaining the relation between the light incident on an optical device in a conventional display device and the brightness of the image viewed by the viewer are depicted in FIGS. 29A, 29B and 29C. In FIGS. 29A, 29B and 29C, the optical spectrum of the light incident on the optical device 920 is represented by curve "A," variation in diffraction efficiency with respect to the wavelength of the light incident on a first diffraction grating member 930 is represented by curve "E," and it is referred to as a "diffraction efficiency variation curve" E. Meanwhile, in the case where it is intended to increase the brightness of the image viewed by the viewer, usually, the thickness of the first diffraction grating member 930 including a hologram diffraction grating is increased, to thereby enhance the diffraction efficiency of the first diffraction grating member 930. In the case where such a measure is taken, however, the diffraction efficiency variation curve E would have a sharp peak. A diffraction efficiency variation curve in the case where the thickness of the first diffraction grating member 930 including a hologram diffraction grating is small and the diffraction efficiency of the first diffraction grating member 930 is low is represented by curve "F" in FIG. 29A. Let the peak wavelength of the light incident on the first diffraction grating member 930 be $\lambda_{LS\text{-}0}$, then the optical device 920 is designed such that the peak of the diffraction efficiency variation curve E and the wavelength $\lambda_{LS\text{-}0}$ coincide with each other in a light beam $LB_C$ in FIG. 34. A light beam $LB_C$ represents a light beam from the center of the image (angle of view: 0 degrees, namely, a light beam at center angle of view), and is a light beam coinciding with the optical axis of the pupil 21 of the viewer 20. In such an optical device 920, however, in regard of a light beam $LB_L$ or a light beam $LB_R$ in FIG. 34, the peak of the diffraction efficiency variation curve E would be deviated from the wavelength $\lambda_{LS\text{-}0}$ (see FIGS. 29B and 29C). Here, in FIGS. 29A, 29B and 29C, the hatched area is a portion that contributes to the brightness of the image viewed by the viewer of the light incident on the optical device 920. As a result of the foregoing, therefore, a situation may be generated in which the brightness of the image viewed by the viewer largely varies depending on the right side of the image, the center of the image and the left side of the image, making it impossible to meet the demand that the brightness of the image should be as uniform as possible.

In the display device of a fifth configuration of the present disclosure that is able to meet the demand that brightness of the image viewed by the viewer should be high and the brightness of the image should be as uniform as possible, a first interference fringe is formed in the inside of first-A deflection means, a second interference fringe is formed in the inside of first-B deflection means, a third interference fringe is formed in the inside of second deflection means, and the relations of:

$$\varphi_1 < \varphi_3 < \varphi_2, \text{ and } d_1 = d_3 = d_2$$

are satisfied; alternatively, in the display device of a sixth configuration of the present disclosure that includes the display device of the fifth configuration of the present disclosure, the relation of:

$$\lambda_1 < \lambda_3 < \lambda_2$$

is satisfied, where $\varphi_1$: slant angle of the first interference fringe
$\varphi_2$: slant angle of the second interference fringe
$\varphi_3$: slant angle of the third interference fringe
$d_1$: pitch of the first interference fringe
$d_2$: pitch of the second interference fringe
$d_3$: pitch of the third interference fringe
$\lambda_1$: peak wavelength of the light incident on the laminated structure and deflected by the first-A deflection means
$\lambda_2$: peak wavelength of the light incident on the laminated structure and deflected by the first-B deflection means
$\lambda_3$: peak wavelength of the light deflected by the first-A deflection means and the first-B deflection means, propagated by total reflection through the inside of the laminated structure, and deflected by the second deflection means.

By prescribing the relation between the slant angle and the pitch of the interference fringes possessed by the three hologram diffraction gratings, in this way, and by prescribing the relation among the peak wavelengths of the lights deflected by the three hologram diffraction gratings, it is possible to make high the brightness of the image viewed by the viewer and to make the image brightness as uniform as possible.

Note that though not restrictive, it is preferable that in the display device of the fifth configuration of the present disclosure, the relation of:

$$0.7 \text{ degrees} \leq |\varphi_2 - \varphi_1| \leq 4.7 \text{ degrees}$$

is satisfied. Alternatively, it is preferable that in the display device of the sixth configuration of the present disclosure, the relations of:

$$0 \text{ nm} < |\lambda_3 - \lambda_1| \leq 40 \text{ nm, and}$$

$$0 \text{ nm} < |\lambda_2 - \lambda_3| \leq 40 \text{ nm}$$

are satisfied.

In the display device of the sixth configuration of the present disclosure, let the diffraction efficiency of the first-A deflection means be $\eta_1$, let the diffraction efficiency of the first-B deflection means be $\eta_2$, and let the diffraction efficiency of the second deflection means be $\eta_3$, then it is preferable that the relations:

$$\eta_1/\eta_3 \geq 1.0, \text{ and } \eta_2/\eta_3 \geq 1.0,$$

desirably $$\eta_1/\eta_3 > 1.0, \text{ and } \eta_2/\eta_3 >> 1.0,$$

are satisfied. With the diffraction efficiency of the second deflection means set to be not higher than the diffraction efficiencies of the first-A deflection means and the first-B deflection means, desirably be lower than the diffraction efficiencies of the first-A deflection means and the first-B deflection means, it is possible to contrive further uniformization of the image viewed by the viewer along the axial direction of the laminated structure. It is more desirable that the value of $\eta_3$ satisfies the following condition.

$$\eta_3 \leq 0.25$$

The value of $\eta_1$ and the value of $\eta_2$ may be equal or different. Note that the diffraction efficiency is represented by $I_1/I_0$, where $I_0$ is the light intensity of the light incident on a hologram diffraction grating, and $I_1$ is the light intensity of +1 order diffracted light diffracted by the hologram diffraction grating. In addition, in the display device of the sixth configuration of the present disclosure, let the thickness of the first-A deflection means be $T_1$, let the thickness of the first-B deflection means be $T_2$, and let the thickness of the second deflection means be $T_3$, then it is preferable that the relations of:

$$1.0 \text{ µm} \leq T_1, T_2 \leq 10 \text{ µm, and } T_1 \geq T_3, T_2 \leq T_3,$$

desirably $T_1 > T_3$, $T_2 > T_3$
are satisfied. With the thickness of the second deflection means set to be not greater than the thicknesses of the first-A deflection means and the first-B deflection means, preferably, be smaller than the thicknesses of the first-A deflection means and the first-B deflection means, it is possible to contrive further uniformization of the image viewed by the viewer along the axial direction of the laminated structure. It is desirable that the value of $T_3$ satisfies the following condition.

$$T_3 \leq 2.0 \text{ µm}$$

The value of $T_1$ and the value of $T_2$ may be equal or different. Further, in the display device of the fifth configuration of the present disclosure or in the display device of the sixth configuration of the present disclosure, a configuration may be adopted in which the incident light having a wavelength $\lambda_1$ in terms of the incident beam corresponding to the center angle of view is (primarily) diffracted by the first-A deflection means rather than the first-B deflection means, and the incident light having a wavelength $\lambda_2$ in terms of the incident beam corresponding to the center angle of view is (primarily) diffracted by the first-B deflection means rather than the first-A deflection means.

Specifically, a part of parallel light incident on the laminated structure 124 satisfies the Bragg condition (wavelength, incidence angle, lattice plane pitch) for the generation of diffraction or reflection at the first-A deflection means 130A, but, on the other hand, does not satisfy the Bragg condition for the generation of diffraction or reflection at the first-B deflection means 130B. In addition, another part of the parallel light incident on the laminated structure 124 satisfies the Bragg condition (wavelength, incidence angle, lattice plane pitch) for the generation of diffraction or reflection at the first-B deflection means 130B, but, on the other hand, does not satisfy the Bragg condition for the generation of diffraction or reflection at the first-A deflection means 130A. Therefore, a part of the parallel light incident on the laminated structure 124 is primarily diffracted or reflected at the first-A deflection means 130A, but is not diffracted or reflected at the first-B deflection means 130B, and passes through the first-B deflection means 130B. Similarly, another part of the parallel light incident on the laminated structure 124 satisfies the Bragg condition for the primary generation of diffraction or reflection at the first-B deflection means 130B, but, on the other hand, does not satisfy the Bragg condition for the generation of diffraction or reflection at the first-A deflection means 130A. Therefore, another part of the parallel light incident on the laminated structure 124 is diffracted or reflected at the first-B deflection means 130B, but is not diffracted or reflected at the first-A deflection means 130A, and passes through the first-A deflection means 130A.

Figure 27A:
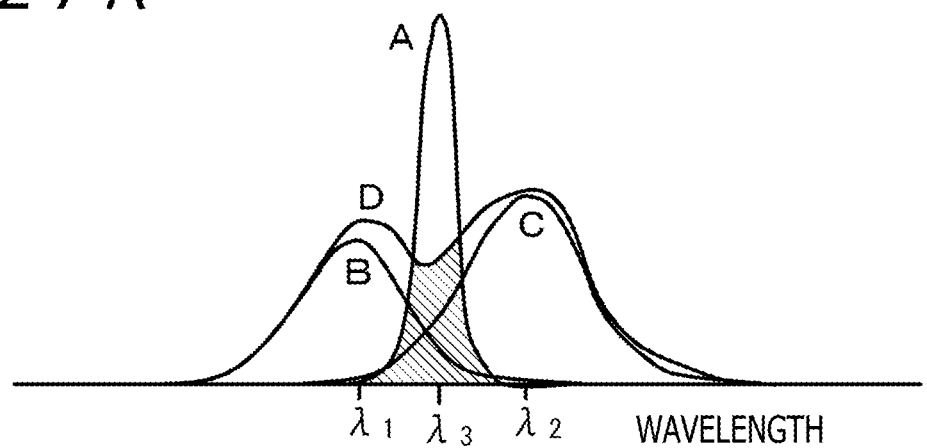
FIGS. 27A, 27B and 27C are schematic diagrams for explaining the relation between light incident on the optical device in the display device of Example 1 and brightness of an image viewed by a viewer.
Figure 27B:
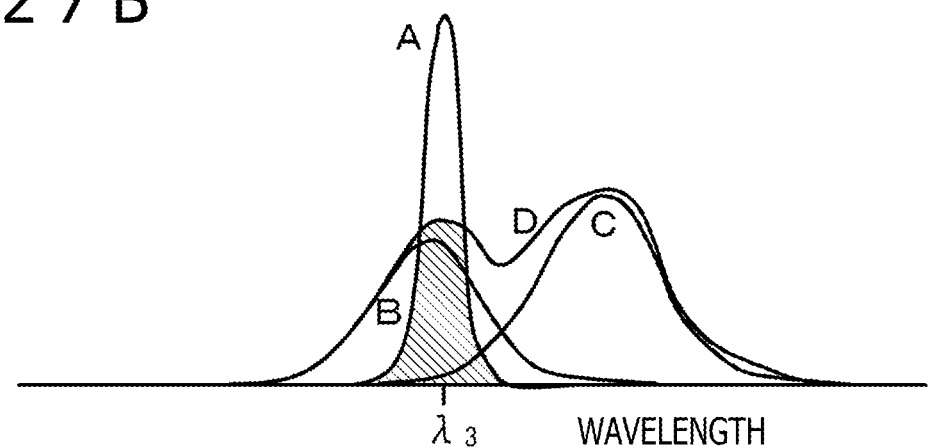
Figure 27C:
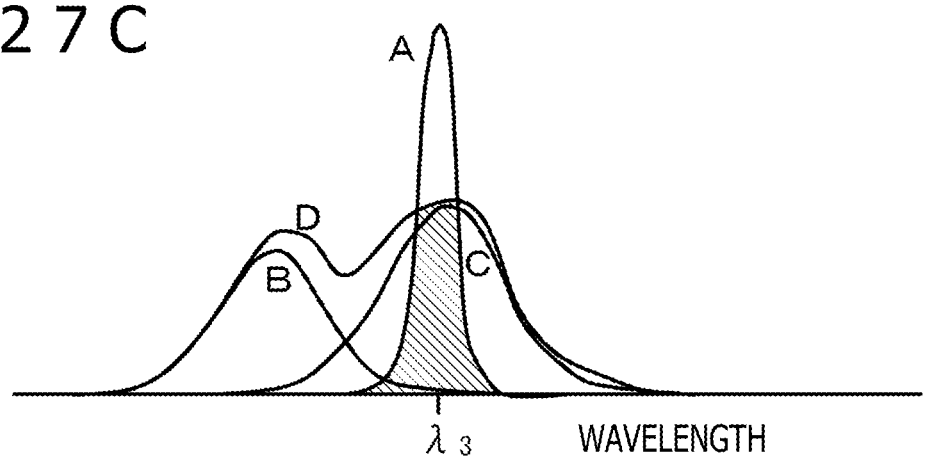

Schematic diagrams for explaining the relation between the light incident on the optical device in the display device of Example 14 and the brightness of an image viewed by the viewer are depicted in FIGS. 27A, 27B and 27C. In FIGS. 27A, 27B and 27C, optical spectrum of the light incident on the optical device 120 is represented by curve "A," a diffraction efficiency variation curve based on first-A deflection means 130A is represented by "B," a diffraction efficiency variation curve based on first-B deflection means 130B is represented by "C," and a synthesized diffraction efficiency variation curve based on the first-A deflection means 130A and the first-B deflection means 130B is represented by "D." As described above, in the case where it is intended to make higher the brightness of the image viewed by the viewer, the thickness of the hologram diffraction grating is increased, thereby enhancing the diffraction efficiency of the first deflection means as a whole. In the case where the first deflection means includes one hologram diffraction grating, a diffraction efficiency variation curve E (see FIGS. 29A, 29B and 29C) with respect to the wavelength of the light incident on the first deflection means would have a sharp peak. The optical device of Example 14, however, as aforementioned, is provided with the first-A deflection means 130A and the first-B deflection means 130B which include two hologram diffraction gratings differing in diffraction characteristics. As a result, where the peak wavelength of the light incident on the optical device 120 is $\lambda_{LS-0}$ ($=\lambda_3$), all of a light beam $LB_C$, a light beam $LB_L$ and a light beam $LB_R$ depicted in FIG. 34 overlap with one another at a high-efficiency portion of the diffraction efficiency variation curve D based on the first-A deflection means 130A and the first-B deflection means 130B (see FIGS. 27A, 27B and 27C). Specifically, it is sufficient that the peak (or the vicinity thereof) of the optical spectrum (see the curve "A") of the light incident on the optical device 120 is located between a peak (or the vicinity thereof) in the diffraction efficiency variation curve B based on the first-A deflection means 130A and a peak (or the vicinity thereof) in the diffraction efficiency variation curve C based on the first-B deflection means 130B. Note that in FIGS. 27A, 27B and 27C, the hatched area is a portion that contributes to the brightness of the image viewed by the viewer of the light incident on the optical device 120. Then, as a result of the foregoing, the brightness of the image viewed by the viewer is prevented from largely varying depending on the right side of the image, the center of the image and the left side of the image, and the image brightness can be made as uniform as possible.

Figure 28:
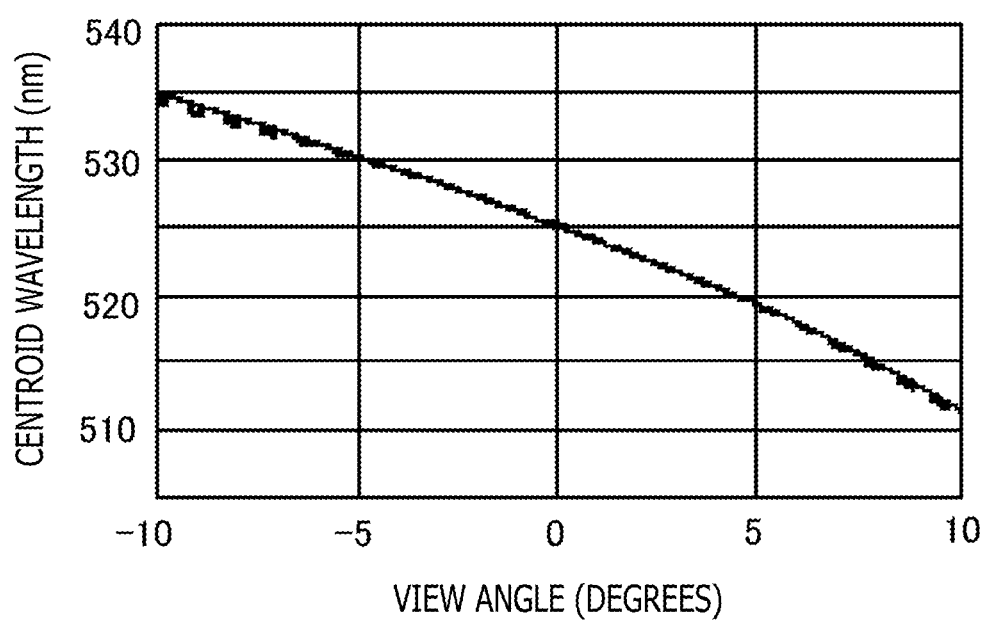
FIG. 28 is a graph depicting the results of determination of the relation between angle of view and centroid wavelength in the display device of Example 1 and a conventional display device.

In addition, the relation between angle of view and centroid wavelength in the optical device of Example 14 that is provided with the first-A deflection means 130A and the first-B deflection means 130B and the relation between angle of view and centroid wavelength in a conventional optical device (see FIG. 34) in which first deflection means includes one hologram diffraction grating are depicted in a graph in FIG. 28. Note that in FIG. 28, the solid line depicts the results in Example 14, and the dotted line (substantially overlapping with the solid line) depicts the results of the conventional example. The axis of abscissas in FIG. 28 represents angle of view, and the axis of ordinates represents centroid wavelength. Note that as depicted in FIG. 34, the angle of view refers to the angle in a horizontal plane that is formed between the light beam $LB_C$ (the light beam at the center angle of view) and the light beam entering the pupil 21 of the viewer. It is seen from FIG. 28 that no difference in centroid wavelength is observed, whether the first deflection means includes two hologram diffraction gratings or the first deflection means includes one hologram diffraction grating. In other words, it is understood that there is little difference in the color of the image obtained, whether the first deflection means includes two hologram diffraction gratings or the first deflection means includes one hologram diffraction grating.

Respective values of $\varphi_1$, $\varphi_3$, $\varphi_2$, $d_1=d_3=d_2$, $\lambda_1$, $\lambda_3$, $\lambda_2$, $\eta_1$, $\eta_2$, $\eta_3$, $T_1$, $T_2$, and $T_3$ are exemplified in Table 1 below, but these values are not restrictive.

TABLE 1

$\varphi_1$ = 55.0 degrees
$\varphi_3$ = 57.0 degrees
$\varphi_2$ = 58.0 degrees
$d_1 = d_3 = d_2 = 0.330$ μm
$\lambda_1$ = 510 nm
$\lambda_3$ = 520 nm
$\lambda_2$ = 540 nm
$\eta_1$ = 0.60
$\eta_2$ = 0.60
$\eta_3$ = 0.15
$T_1$ = 3.0 μm
$T_2$ = 3.0 μm
$T_3$ = 1.0 μm Note that the display device and the optical device of Example 14 described above are applicable to the display devices and optical devices described in Examples 3 to 6.

Example 15

Example 15 is a modification of Examples 3 to 6, and relates to assembly of an optical device.

First-A deflection means 130A and first-B deflection means 130B should be aligned accurately. Particularly, control or management of the parallelism between the extending direction of a first interference fringe formed in the first-A deflection means 130A and the extending direction of a second interference fringe formed in the first-B deflection means 130B is important. The same can be said also with respect to the second-A deflection means and the second-B deflection means. In Example 4, it has been described that an alignment mark is burned on a part of the first-A deflection means 130A, an alignment mark is burned also on a part of the first-B deflection means 130B, and these deflection means are adhered to each other such that these alignment marks overlap with each other. In Example 15, the alignment of the first-A deflection means 130A and the first-B deflection means 130B will be described more in detail below. Note that while the alignment of the first-A deflection means 130A and the first-B deflection means 130B will be described exclusively in the following description, the alignment of the second-A deflection means 140A and the second-B deflection means 140B can also be described in the same way, by replacing the first-A deflection means 130A with the second-A deflection means 140A and replacing the first-B deflection means 130B with the second-B deflection means 140B.

A schematic view of a laminated structure of a display device of Example 15 as viewed from the side opposite to the viewer's side and a schematic view of the same as viewed from the viewer's side are depicted in FIGS. 30A and 30B. Note that in FIGS. 30A and 30B, for clearly depicting a first interference fringe formation region and a second interference fringe formation region, the first interference fringe formation region and the second interference fringe formation region are hatched.

Specifically, in the display device of Example 15,
the first-A deflection means 130A has a first interference fringe formation region 132 formed therein with a first interference fringe, and alignment marks 134A and 134B are provided outside of the first interference fringe formation region 132, and the first-B deflection means 130B has a second interference fringe formation region 136 formed therein with a second interference fringe, and alignment marks 138A, 138B are provided outside of the second interference fringe formation region 136.

Specifically,
the first-A deflection means 130A has the first interference fringe formation region 132 formed therein with the first interference fringe, the first-B deflection means 130B has the second interference fringe formation region 136 formed therein with the second interference fringe,
the first-A deflection means 130A is provided with a 1A-th alignment mark 134A and a 1B-th alignment mark 134B on the outside 133 of the first interference fringe formation region 132 in the extending direction of the first interference fringe, oppositely to each other with the first interference fringe formation region 132 therebetween,
the first-B deflection means 130B is provided with a 2A-th alignment mark 138A and a 2B-th alignment mark 138B on the outside 137 of the second interference fringe formation region 136 in the extending direction of the second interference fringe, oppositely to each other with the second interference fringe formation region 136 therebetween,
the 1A-th alignment mark 134A and the 1B-th alignment mark 134B are formed with the same interference fringe as the interference fringe provided in the first interference fringe formation region 132, and
the 2A-th alignment mark 138A and the 2B-th alignment mark 138B are formed with the same interference fringe as the interference fringe provided in the second interference fringe formation region 136.

Further, in the optical device and the display device of Example 15, the 1A-th alignment mark 134A and the 2A-th alignment mark 138A have such shapes that the 1A-th alignment mark 134A and the 2A-th alignment mark 138A do not overlap with each other, in the state where the relative positioning (alignment) of the first-A deflection means 130A and the first-B deflection means 130B has been completed; in addition, the 1B-th alignment mark 134B and the 2B-th alignment mark 138B have such shapes that the 1B-th alignment mark 134B and the 2B-th alignment mark 138B do not overlap with each other, in the state where the relative positioning (alignment) of the first-A deflection means 130A and the first-B deflection means 130B has been completed. Alternatively, or at the same time, the 1A-th alignment mark 134A and the 2A-th alignment mark 138A are disposed at such positions that the 1A-th alignment mark 134A and the 2A-th alignment mark 138A do not overlap with each other, in the state where the relative (positioning) alignment of the first-A deflection means 130A and the first-B deflection means 130B has been completed; in addition, the 1B-th alignment mark 134B and the 2B-th alignment mark 138B are disposed at such positions that the 1B-th alignment mark 134B and the 2B-th alignment mark 138B do not overlap with each other, in the state where the relative positioning (alignment) of the first-A deflection means 130A and the first-B deflection means 130B has been completed. Besides, the 1A-th alignment mark 134A, the 1B-th alignment mark 134B, the 2A-th alignment mark 138A and the 2B-th alignment mark 138B are disposed on an end side of the laminated structure 124. Specifically, the plan-view shape of each of the alignment marks 134A, 134B, 138A and 138B is an annular shape (ring shape). In addition, each of the alignment marks 134A, 134B, 138A and 138B is provided on the outside of that portion of the interference fringe formation region 132 or 136 which is on the side opposite to that portion of the interference fringe formation region 132 or 136 at which light is emitted.

Figure 31A:
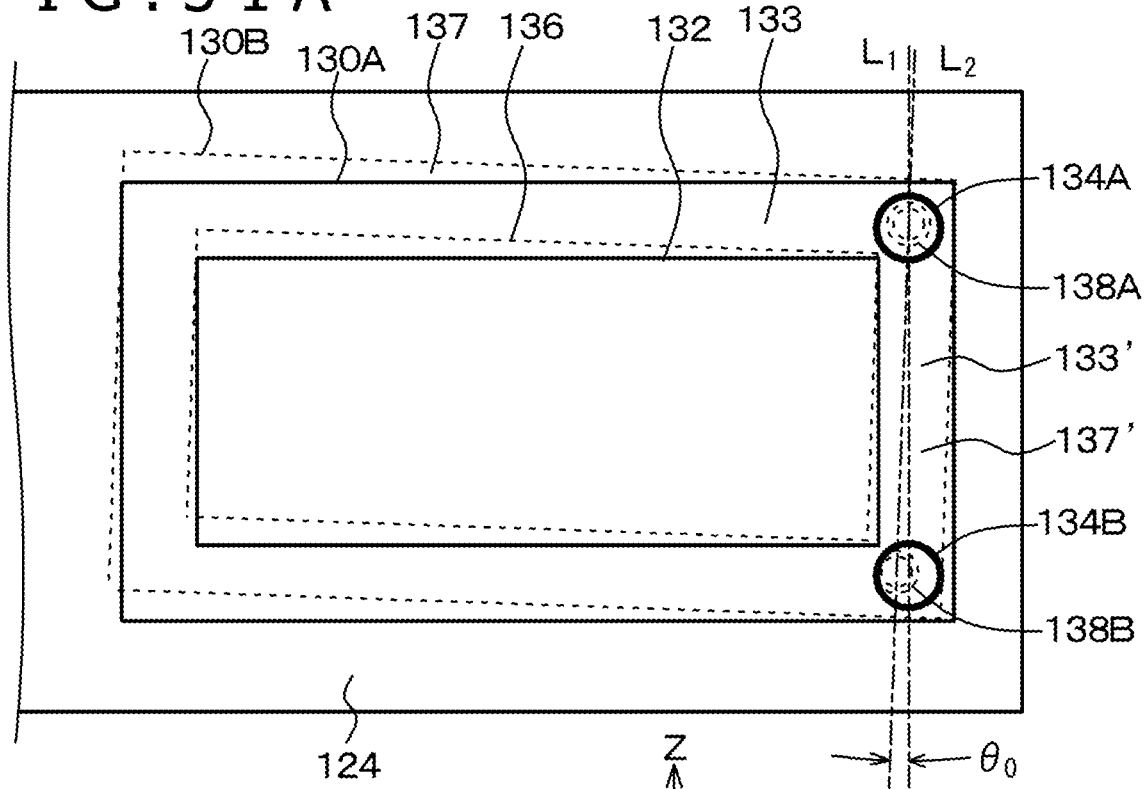
FIGS. 31A and 31B are schematic partial plan views of a laminated structure, etc. for explaining alignment of first-A deflection means and first-B deflection means.
Figure 31B:
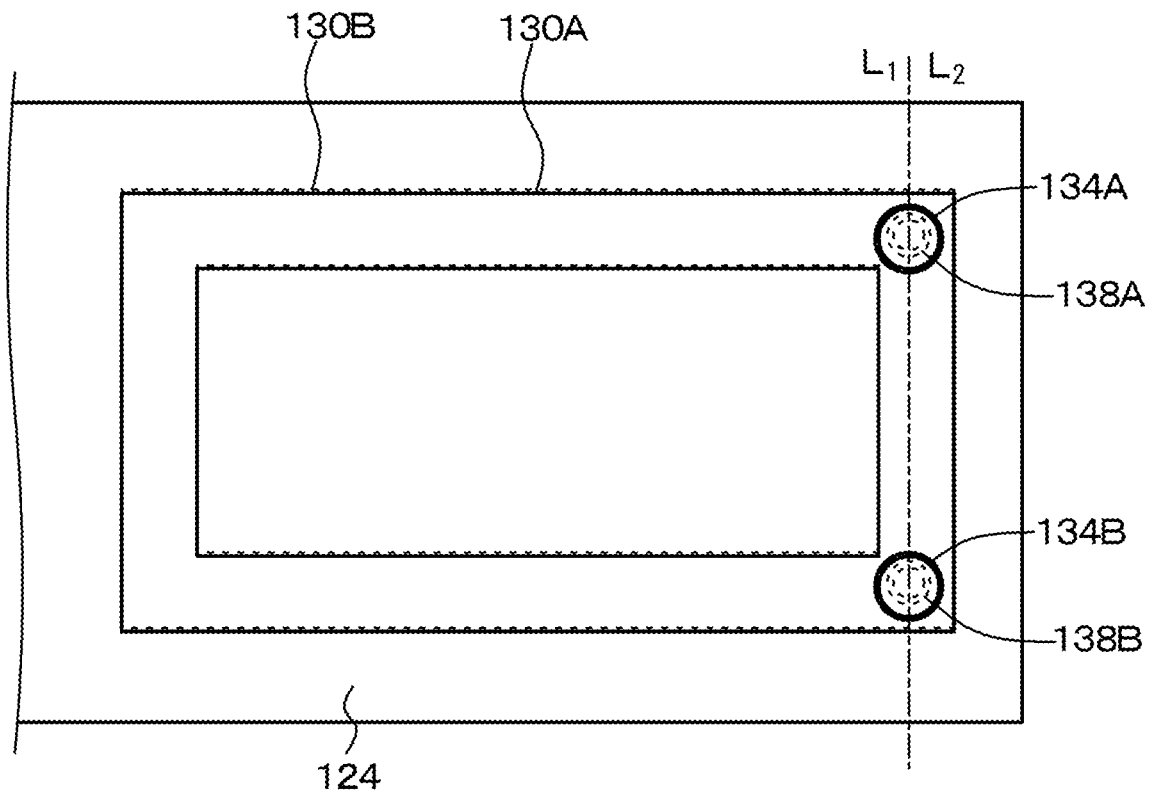
Figure 32A:
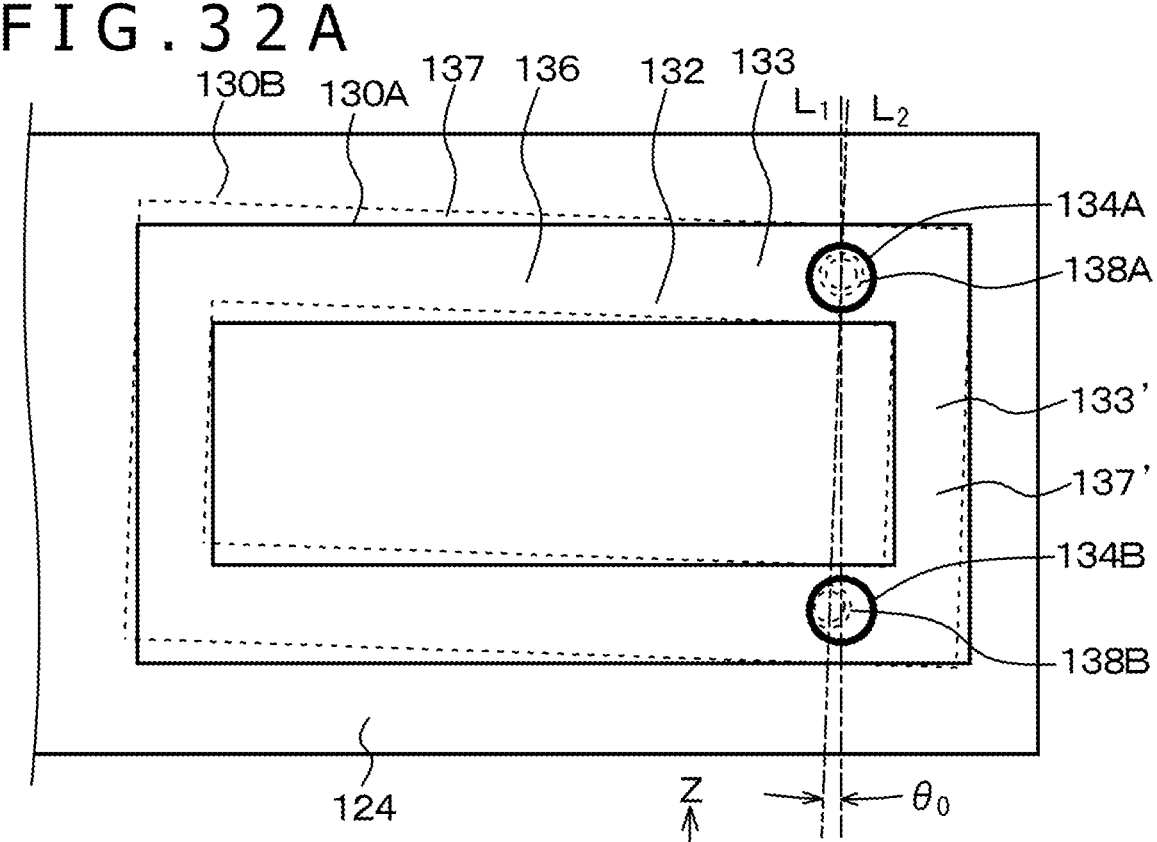
FIGS. 32A and 32B are schematic partial plan views of a laminated structure, etc. for explaining alignment of first-A deflection means and first-B deflection means in a modification of the Example depicted in FIGS. 31A and 31B.
Figure 32B:
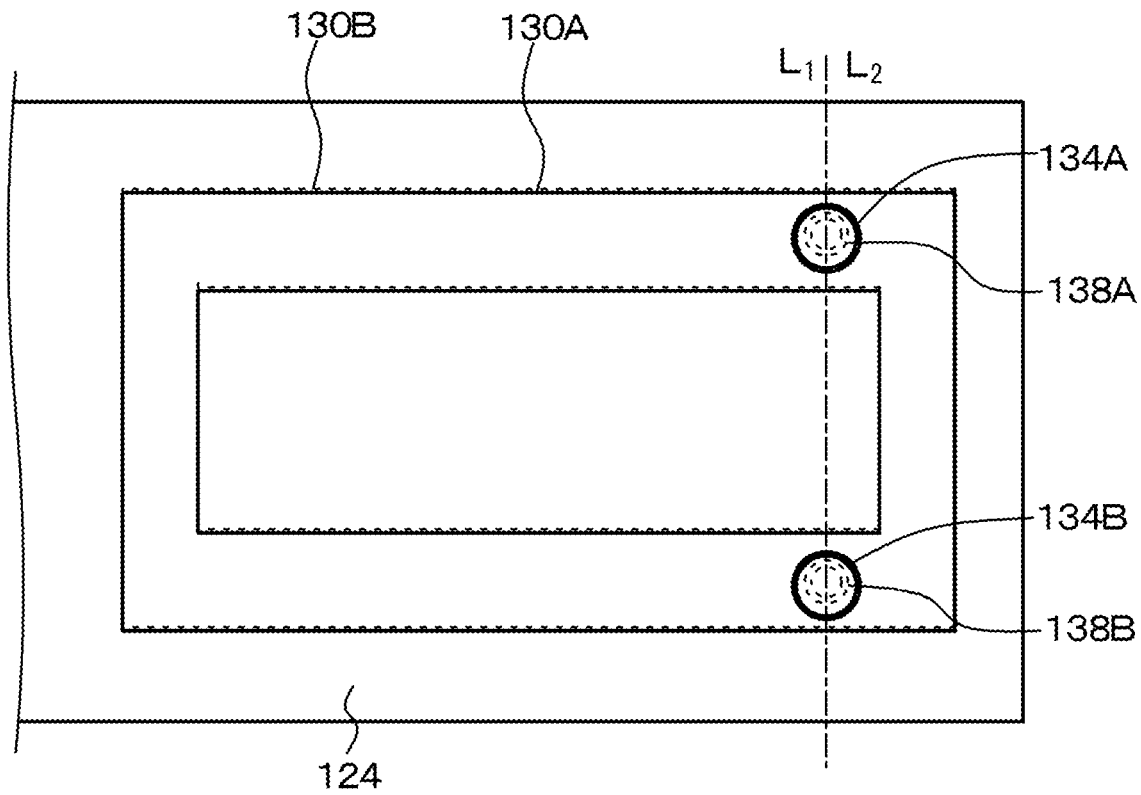

More specifically, as depicted in FIGS. 31A and 31B, the 1A-th alignment mark 134A and the 1B-th alignment mark 134B are included in a projection image onto an XZ plane of a part (an end region 133' of the first-A deflection means 130A) of the first-A deflection means (first hologram diffraction grating) 130A located more on an end side of the laminated structure than the first interference fringe formation region 132, and the 2A-th alignment mark 138A and the 2B-th alignment mark 138B are included in a projection image onto the XZ plane of a part (an end region 137' of the first-B deflection means 130B) of the first-B deflection means (second hologram diffraction grating) 130B located more on the end side of the laminated structure than the second interference fringe formation region 136. Alternatively, as depicted in FIGS. 32A and 32B, the 1A-th alignment mark 134A and the 1B-th alignment mark 134B are included in the projection image of the first interference fringe formation region 132 onto the XZ plane, and the 2A-th alignment mark 138A and the 2B-th alignment mark 138B are included in the projection image of the second interference fringe formation region 136 onto the XZ plane.

A method of assembling the optical device of Example 15 will be described below, referring to FIGS. 31A, 31B, 32A, 32B, 33A and 33B, which are schematic partial plan views of the laminated structure 124 or the like for explaining the alignment of the first-A deflection means 130A and the first-B deflection means 130B.

Figure 33A:
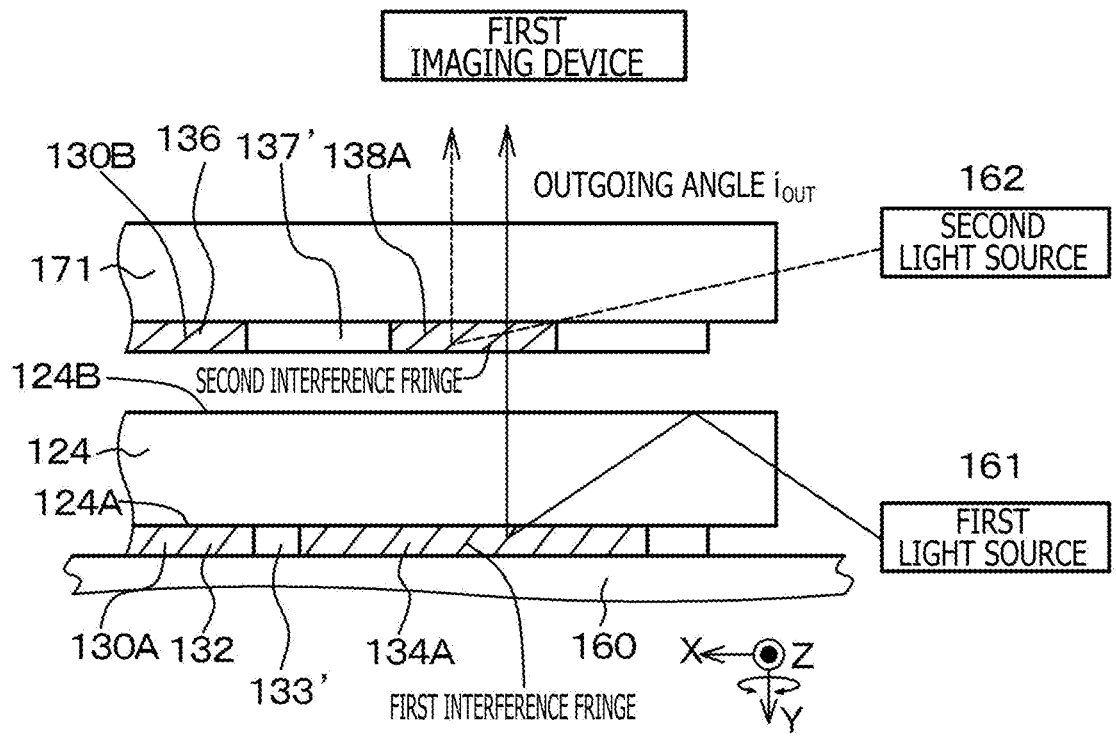
FIGS. 33A and 33B are schematic partial sectional views of a laminated structure, etc. for explaining alignment of first-A deflection means and first-B deflection means.
Figure 33B:
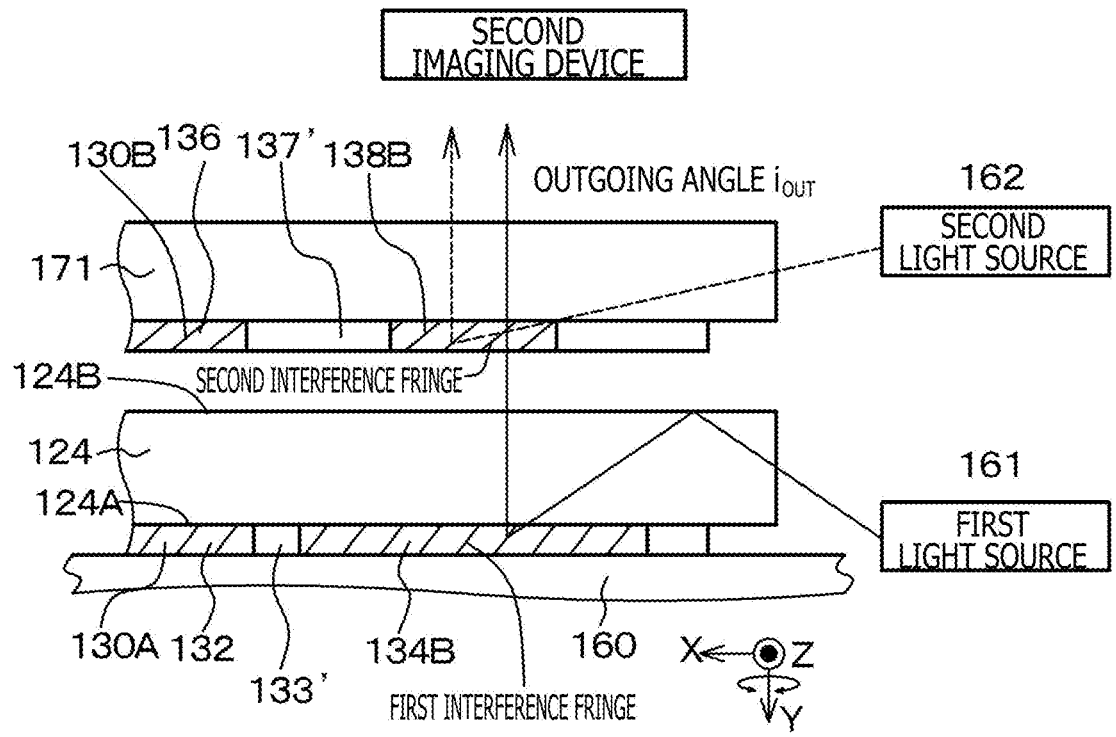

Here, as depicted in FIGS. 33A and 33B, an alignment device of Example 15 is provided with:

a stage 160 that is movable in an X-direction, a Y-direction and a Z-direction, and is rotatable in the XZ plane;

a first light source (first alignment light source) 161 which is disposed on the stage 160 and by which light is made to be incident on the laminated structure 124 from an end face of the laminated structure 124 where the first-A deflection means 130A is disposed;

a second light source (second alignment light source) 162 by which light is made to be incident on a support 171 supporting the first-B deflection means 130B on the upper side of the first-A deflection means 130A from an end face of the support 171;

a first imaging device (first alignment imaging device) 163 which detects an optical image of the 1A-th alignment mark 134A, provided on the first-A deflection means 130A, based on the light incident from the first light source 161 and diffracted or reflected by the 1A-th alignment mark 134A, and an optical image of the 2A-th alignment mark 138A, provided in the first-B deflection means 130B, based on the light incident from the second light source 162 and diffracted or reflected by the 2A-th alignment mark 138A; and a second imaging device (second alignment imaging device) 164 which detects an optical image of the 1B-th alignment mark 134B, provided on the first-A deflection means 130A, based on the light incident from the first light source 161 and diffracted or reflected by the 1B-th alignment mark 134B, and an optical image of the 2B-th alignment mark 138B, provided on the first-B deflection means 130B, based on the light incident from the second light source 162 and diffracted or reflected by the 2B-th alignment mark 138B.

From the first light source 161 is emitted such light that the light incident on the 1A-th alignment mark 134A and the 1B-th alignment mark 134B is diffracted or reflected by the 1A-th alignment mark 134A and the 1B-th alignment mark 134B and is emitted from the laminated structure 124 at an outgoing angle $i_{out}$ (see FIGS. 33A and 33B). In addition, from the second light source 162 is emitted such light that the light incident on the 2A-th alignment mark 138A and the 2B-th alignment mark 138B is diffracted or reflected by the 2A-th alignment mark 138A and the 2B-th alignment mark 138B and is emitted from the laminated structure 124 at an outgoing angle $i_{out}$ (see FIGS. 33A and 33B). Here, as an example of the outgoing angle $i_{out}$, 0 degrees can be mentioned. Note that it is sufficient to select the wavelength of the light emitted from the first light source 161 and the angle of incidence on the laminated structure 124 in such a manner as to satisfy the Bragg condition 1 for obtaining such a state, and it is sufficient to select the wavelength of the light emitted from the second light source 162 and the angle of incidence on the support 171 in such a manner as to satisfy the Bragg condition 2 for obtaining such a state. In addition, parallel light is emitted from the first light source 161, and parallel light is emitted from the second light source 162. Note that the first light source 161 and the second light source 162 may be made to be the same parallel light sources, by selecting a light source and an incidence angle for emitting light having a wavelength of light satisfying simultaneously the Bragg condition 1 and the Bragg condition 2.

In the method of assembling the optical device of Example 15, the 1A-th alignment mark 134A and the 2A-th alignment mark 138A are optically detected (see FIGS. 31A, 32A and 33A). Simultaneously, the 1B-th alignment mark 134B and the 2B-th alignment mark 138B are optically detected (see FIGS. 31A, 32A and 33B). Then, a first straight line $L_1$ connecting the 1A-th alignment mark 134A and the 1B-th alignment mark 134B is determined, and a second straight line $L_2$ connecting the 2A-th alignment mark 138A and the 2B-th alignment mark 138B is determined (see FIGS. 31A and 32A). Next, relative positioning (alignment) of the first-A deflection means 130A and the first-B deflection means 130B is conducted in such a manner that the angle $\theta_0$ formed between the first straight line $L_1$ and the second straight line $L_2$ when the first straight line $L_1$ and the second straight line $L_2$ are projected onto a virtual plane is within a predetermined value $\theta_{PD}$ (see FIGS. 31B and 32B).

Alternatively, in the method of assembling the optical device of Example 15, in a state in which the first-B deflection means 130B is supported by the support 171, light is made to be incident on the laminated structure 124 from an end face of the laminated structure 124, the light diffracted or reflected by the 1A-th alignment mark 134A and the 1B-th alignment mark 134B is optically detected, light is made to be incident on the support 171 from an end face of the support 171, the light diffracted or reflected by the 2A-th alignment mark 138A and the 2B-th alignment mark 138B is optically detected, and relative positioning (alignment) of the first-A deflection means 130A and the first-B deflection means 130B is conducted.

Here, in the method of assembling the optical device 120 of Example 15, in a state in which the first-A deflection means 130A is disposed in or on the laminated structure 124, relative positioning (alignment) of the first-A deflection means 130A and the first-B deflection means 130B is performed, and the first-B deflection means 130B is disposed in or on the laminated structure 124. In this case, in a state in which the first-A deflection means 130A is disposed in or on the laminated structure 124, relative movement of the laminated structure 124 relative to the first-B deflection means 130B is conducted. Specifically, the first-A deflection means 130A is laminated on the laminated structure 124, after which relative positioning (alignment) of the first-A deflection means 130A and the first-B deflection means 130B is conducted, and the first-B deflection means 130B is laminated on the laminated structure 124. In addition, in the method of assembling the optical device 120 of Example 15, in a state in which the first-B deflection means 130B is supported by the support 171, relative positioning (alignment) of the first-A deflection means 130A and the first-B deflection means 130B is performed.

Note that as aforementioned, the 1A-th alignment mark 134A and the 1B-th alignment mark 134B are formed with the same interference fringe as the interference fringe provided in the first interference fringe formation region 132, the 2A-th alignment mark 138A and the 2B-th alignment mark 138B are formed with the same interference fringe as the interference fringe provided in the second interference fringe formation region 136, light is made to be incident on the laminated structure 124 from an end face of the laminated structure 124, the light diffracted or reflected by the 1A-th alignment mark 134A and the 1B-th alignment mark 134B is optically detected, light is made to be incident on the support 171 from an end face of the support 171, and the light diffracted or reflected by the 2A-th alignment mark 138A and the 2B-th alignment mark 138B is optically detected. Here, the 1A-th alignment mark 134A and the 2A-th alignment mark 138A have such shapes that the 1A-th alignment mark 134A and the 2A-th alignment mark 138A do not overlap with each other in a state in which the relative positioning (alignment) of the first-A deflection means 130A and the first-B deflection means 130B has been completed, and the 1B-th alignment mark 134B and the 2B-th alignment mark 138B have such shapes that the 1B-th alignment mark 134B and the 2B-th alignment mark 138B do not overlap with each other in a state in which the relative positioning (alignment) of the first-A deflection means 130A and the first-B deflection means 130B has been completed. Alternatively, the 1A-th alignment mark 134A and the 2A-th alignment mark 138A are disposed at such positions that the 1A-th alignment mark 134A and the 2A-th alignment mark 138A do not overlap with each other in a state in which the relative positioning (alignment) of the first-A deflection means 130A and the first-B deflection means 130B has been completed, and the 1B-th alignment mark 134B and the 2B-th alignment mark 138B are disposed at such positions that the 1B-th alignment mark 134B and the 2B-th alignment mark 138B do not overlap with each other in a state in which the relative positioning (alignment) of the first-A deflection means 130A and the first-B deflection means 130B has been completed.

Specifically, for example, the first-A deflection means 130A constituting the first deflection means 130 is formed on a first surface of a production substrate (not depicted) based on a known method. In addition, the first-B deflection means 130B constituting the first deflection means 130 and the second deflection means 140 are formed on a second surface of the production substrate on the basis of a known method.

Then, the first-A deflection means 130A formed on the first surface of the production substrate is transferred onto a first dicing tape, and the first-A deflection means 130A is peeled from the first surface of the production substrate. Next, the first-A deflection means 130A transferred onto the first dicing tape is transferred onto a first surface 124A of the laminated structure 124, the first-A deflection means 130A is adhered to the first surface 124A of the laminated structure 124, after which the first-A deflection means 130A is peeled from the first dicing tape. In this way, the first-A deflection means 130A can be disposed on the first surface 124A of the laminated structure 124.

Subsequently, the first-B deflection means 130B and the second deflection means 140 formed on the second surface of the production substrate are transferred onto a second dicing tape, and the first-B deflection means 130B and the second deflection means 140 are peeled from the second surface of the production substrate. The second dicing tape corresponds to the support 171. In addition, the laminated structure 124 is preliminarily placed on the stage 160, with the second surface 124B on the upper side. Then, the support 171 with the first-B deflection means 130B and the second deflection means 140 transferred onto a lower surface thereof is placed on the upper side of the laminated structure 124 so as to obtain a state in which the first-B deflection means 130B faces the first-A deflection means 130A. This state is depicted in FIGS. 33A and 33B.

Then, as aforementioned, the 1A-th alignment mark 134A and the 2A-th alignment mark 138A are optically detected, and, simultaneously, the 1B-th alignment mark 134B and the 2B-th alignment mark 138B are optically detected (see FIGS. 31A, 32A, 33A and 33B). Specifically, the 1A-th alignment mark 134A and the 2A-th alignment mark 138A are imaged by a first imaging device 163, and the 1B-th alignment mark 134B and the 2B-th alignment mark 138B are imaged by a second imaging device 164. Then, a first straight line $L_1$ connecting the 1A-th alignment mark 134A and the 1B-th alignment mark 134B is determined, a second straight line $L_2$ connecting the 2A-th alignment mark 138A and the 2B-th alignment mark 138B is determined, the stage 160 is moved in an X-direction and Z-direction such that the angle $\theta_0$ formed between the first straight line $L_1$ and the second straight line $L_2$ when the first straight line $L_1$ and the second straight line $L_2$ are projected onto a virtual plane is within a predetermined value $\theta_{PD}$, and the stage 160 is rotated in the XZ plane, whereby relative positioning (alignment) of the first-A deflection means 130A and the first-B deflection means 130B is conducted (see FIGS. 31B and 32B). Next, the stage 160 is raised (moved in the Y-direction), the first-B deflection means 130B constituting the first deflection means 130 is transferred onto the second surface 124B of the laminated structure 124, the first-B deflection means 130B is adhered to the second surface 124B of the laminated structure 124, and the first-B deflection means 130B is peeled from the second dicing tape (support 171).

As an example of a maximum of the predetermined value $\theta_{PD}$, 100 seconds can be mentioned. Specifically, an image in which five longitudinal (or vertical) lines (black lines extending in the Z-axis direction) are arranged at regular intervals in an angle of view of 1 degree is assumed. In addition, the lengths in the Z-axis direction of the first interference fringe formation region 132 and the second interference fringe formation region 136 are assumed to be 20 mm. Under such a condition, the extending direction of a first interference fringe provided in the first-A deflection means 130A and the extending direction of a second interference fringe provided in the first-B deflection means 130B are set parallel to the Z-axis, and the contrast of the image in this instance is assumed to be "1.00." Then, the first-B deflection means 130B was rotated relative to the first-A deflection means 130A, and the angle $\theta_0$ when the contrast of the image became "0.95" was determined, to be ±50 seconds. From these results, the maximum of the predetermined value $\theta_{PD}$ was made to be 100 seconds.

Note that even if the first-A deflection means 130A and the first-B deflection means 130B are deviated from each other in the X-axis direction and/or in the Z-axis direction, no special change is generated in the diffraction or reflection by the first-A deflection means 130A and the first-B deflection means 130B, specifically, no change is generated in the diffraction or reflection angle of the light diffracted or reflected by the first-A deflection means 130A and the first-B deflection means 130A, and, therefore, deterioration of image quality of the image viewed by the viewer is not generated. On the other hand, in the case where a rotational deviation by an angle $\theta_0$ is generated in the positional relation between the first-A deflection means 130A and the first-B deflection means 130B, a change is generated in the diffraction or reflection angle of the light diffracted or reflected by the first-A deflection means 130A and the first-B deflection means 130B, with the result that deterioration of image quality (a lowering in contrast of an image or a distortion of an image) is generated in the image viewed by the viewer.

As has been described above, in the method of assembling the optical device of Example 15, the first straight line connecting the 1A-th alignment mark and the 1B-th alignment mark is determined, the second straight line connecting the 2A-th alignment mark and the 2B-th alignment mark is determined, and relative positioning (alignment) of the first-A deflection means 130A and the first-B deflection mean 130B is conducted in such a manner that the angle formed between the first straight line and the second straight line when the first straight line and the second straight line are projected onto a virtual plane is within a predetermined value. Therefore, relative positioning (alignment) of the first-A deflection means 130A and the first-B deflection means 130B can be carried out based on a simplified method. Alternatively, in the method of assembling the optical device of Example 15, in a state in which the first-B deflection means 130B is supported by the support, light is made to be incident on the laminated structure from an end face of the laminated structure, the light diffracted or reflected by the 1A-th alignment mark and the 1B-th alignment mark is optically detected, light is made to be incident on the support from an end face of the support, the light diffracted or reflected by the 2A-th alignment mark and the 2B-th alignment mark is optically detected, and relative positioning (alignment) of the first-A deflection means 130A and the first-B deflection means 130B is performed. Therefore, relative positioning (alignment) of the first-A deflection means 130A and the first-B deflection means 130B can be carried out based on a simplified method. Further, in the hologram diffraction grating of Example 15, the alignment marks are formed with the same interference fringe as the interference fringe provided in the interference fringe formation region, the plan-view shape of the alignment marks is an annular shape, and, in the optical device or the display device of Example 15, in a state in which the relative positioning (alignment) of the first-A deflection means 130A and the first-B deflection means 130B has been completed, the shapes of the 1A-th alignment mark, the 2A-th alignment mark, the 1B-th alignment mark and the 2B-th alignment mark are prescribed, or the layout of these alignment marks is prescribed. Therefore, relative positioning (alignment) of the first-A deflection means 130A and the first-B deflection means 130B can be carried out assuredly and easily, based on a simplified method. In addition, the alignment device of Example 15 is provided with the first light source (first alignment light source) which is placed on the stage and makes light incident on the laminated structure where the first-A deflection means 130A is disposed from an end face of the laminated structure, and the second light source (second alignment light source) for making light incident on the support supporting the first-B deflection means 130B on the upper side of the first-A deflection means 130A from an end face of the support, and, therefore, the alignment marks can be detected assuredly, precisely and easily.

While the above description has been made based exclusively on the optical device and the display device having the configurations or structures described in Example 3, the same description can be substantially applied to the optical devices and display devices having the configurations or structures described in Examples 4 to 6, by replacing the laminated structure with the first glass plate and replacing the support with the second glass plate.

While the present disclosure has been described based on Examples above, the present disclosure is not limited to these Examples. The configurations and structures of the display devices (head mounted displays), the image display devices and the image forming devices described in Examples are merely exemplary, and can be modified as required. For example, a surface relief type hologram (see U.S. Patent No. 20,040,062,505A1) may be disposed on a laminated structure. In the optical device 120, the diffraction grating member may include a transmission type diffraction grating member, or one of the first deflection means and the second deflection means may include a reflection type diffraction grating member and the remainder may include a transmission type diffraction grating member. Alternatively, the diffraction grating member may be reflection type blazed diffraction grating member. The display device of the present disclosure can be used also as a stereoscopic vision display device. In this case, it is sufficient to detachably attach a polarizing plate or polarizing film to the optical device, or to adhere a polarizing plate or polarizing film to the optical device, as required.

In producing the deflection means, two layers of photopolymer are laid on each other, the photopolymer film constituting the lower layer and the photopolymer film constituting the upper layer are irradiated with UV rays in different irradiation doses, whereby it is possible to form two diffraction grating layers in which slant angles of the diffraction grating members after a heat treatment are different and surface pitches A of interference fringes at the surfaces are equal to each other. As a result, it is possible to control the width and efficiency of diffraction wavelength, and, by setting the diffraction wavelength in accordance with the wavelength of a light source, it is possible to produce an optical device having a high luminance. Specifically, by providing a difference in the UV irradiation dose of approximately 5 J at a wavelength of 365 nm, a wavelength difference of approximately 30 nm can be obtained. A heat treatment, a treatment in an ordinary oven at a temperature of 100° C. to 120° C. is carried out.

In the case where the first-A deflection means and the first-B deflection means are provided, light of the same wavelength may be diffracted or reflected by the first-A deflection means and the first-B deflection means, or lights of different wavelengths may be diffracted or reflected by the first-A deflection means and the first-B deflection means, as has been described in Examples. Similarly, in the case where the second-A deflection means and the second-B deflection means are provided, light of the same wavelength may be diffracted or reflected by the second-A deflection means and the second-B deflection means, or lights of different wavelengths may be diffracted or reflected by the second-A deflection means and the second-B deflection means, as has been described in Examples.

As aforementioned, the first deflection means, the first-A deflection means, the first-B deflection means, the second deflection means, the second-A deflection means and the second-B deflection means may include one diffraction grating layer (one photopolymer layer), and light of one wavelength may be diffracted or reflected, or lights of a plurality of different wavelengths may be diffracted or reflected. In addition, as aforementioned, the first deflection means, the first-A deflection means, the first-B deflection means, the second deflection means, the second-A deflection means and the second-B deflection means may include a plurality of diffraction grating layers (a plurality of photopolymer layers), and light of one wavelength may be diffracted or reflected, or lights of a plurality of different wavelengths may be diffracted or reflected.

Specifically, a configuration may be adopted in which, for example, the first-A deflection means, the first-B deflection means and the second deflection means (or the second-A deflection means and the second-B deflection means) include two diffraction grating layers (pluralities of photopolymer layers), red color is diffracted or reflected by the first diffraction grating layer (a plurality of photopolymer layers), and blue color is diffracted or reflected by the second diffraction grating layer (a plurality of photopolymer layers). Alternatively, specifically, a configuration may be adopted in which, for example, the first-A deflection means and the first-B deflection means include two diffraction grating layers (pluralities of photopolymer layers), while the second-A deflection means and the second-B deflection means include one diffraction grating layer (one photopolymer layer), red color is diffracted or reflected by the first diffraction grating layer (a plurality of photopolymer layers) of the first-A deflection means and the first-B deflection means, blue color is diffracted or reflected by the second diffraction grating layer (a plurality of photopolymer layers), red color is diffracted or reflected by the second-A deflection means, and blue color is diffracted or reflected by the second-B deflection means.

In addition, the optical device may have a structure in which a plurality of laminated structures are laminated on each other. Specifically, a structure may be adopted in which a first laminated structure and a second laminated structure are laminated on each other, the first laminated structure having a configuration in which, for example, the first-A deflection means, the first-B deflection means and the second deflection means include one diffraction grating layer (one photopolymer layer), and green color is diffracted or reflected by this diffraction grating layer (photopolymer layer), and the second laminated structure having a configuration in which the first-A deflection means, the first-B deflection means and the second deflection means include two diffraction grating layers (two photopolymer layers), red color is diffracted or reflected by the first diffraction grating layer (a plurality of photopolymer layers), and blue color is diffracted or reflected by the second diffraction grating layer (a plurality of photopolymer layers).

While it has been described in Examples that the image forming device 111 displays a monochromatic (for example, green) image, the image forming device 111 may display a color image; in this case, it is sufficient that, for example, the light source includes light sources emitting red, green and blue lights, respectively. Specifically, it is sufficient that, for example, red light, green light and blue light emitted respectively from a red light emitting element, a green light emitting element and a blue light emitting element are subjected to color mixing and luminance uniformization by use of a light pipe, to obtain white light.

Figure 23A:
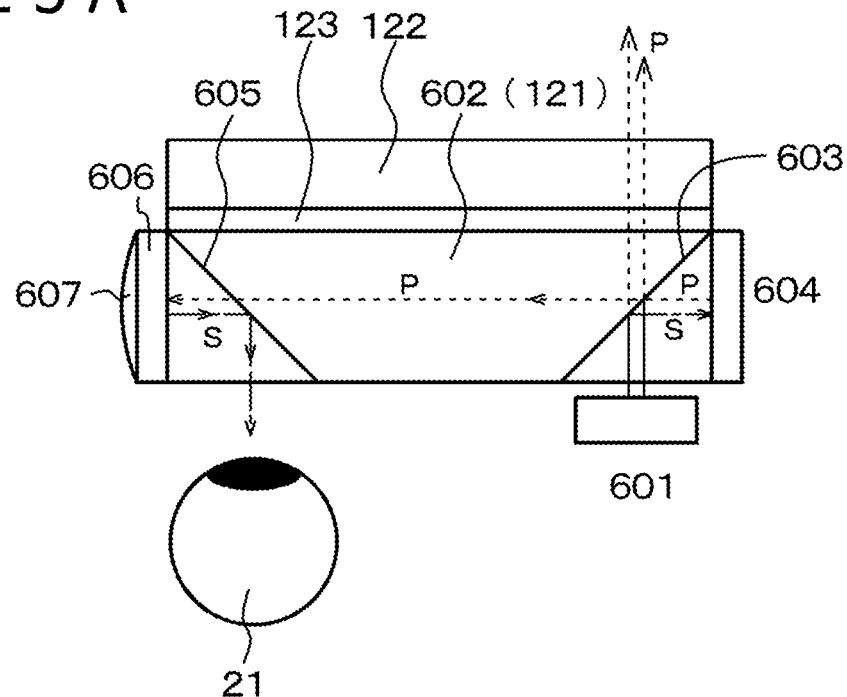
FIGS. 23A and 23B are schematic views, as viewed from above, of an optical device in a modification of the display device of Example 9.
Figure 23B:
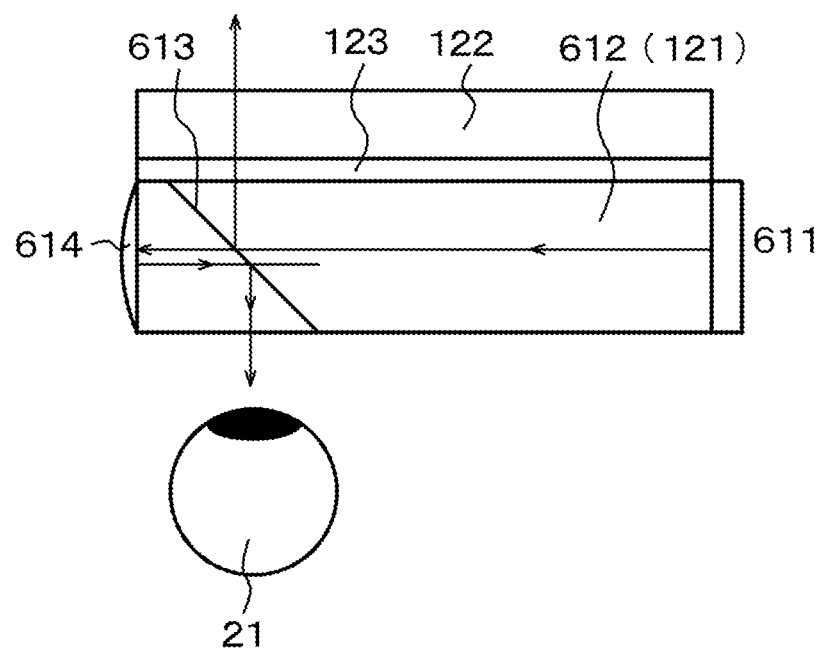

Schematic views, as viewed from above, of a modification of the optical device constituting the optical device described in Example 9 are depicted in FIGS. 23A and 23B. Note that in FIGS. 23A, 23B and 24A, the light controller is omitted from illustration.

In an example depicted in FIG. 23A, light from a light source 601 enters a light guide member 602 (first glass plate 121), and impinges on a polarization beam splitter 603 provided in the light guide member 602. Of the light having come from the light source 601 and having impinged on the polarization beam splitter 603, a P-polarized light component passes through the polarization beam splitter 603, whereas an S-polarized light component is reflected by the polarization beam splitter 603 and travels toward a liquid crystal display (LCD) 604 including an LCOS as a light valve. An image is formed by the liquid crystal display (LCD) 604. Since the polarized light component of the light reflected by the liquid crystal display (LCD) 604 primarily includes the P-polarized light component, the light reflected by the liquid crystal display (LCD) 604 passes through the polarization beam splitters 603 and 605, passes through a quarterwave plate 606, impinges on and is reflected by a reflector 607, passes through the quarterwave plate 606, and travels toward the polarization beam splitter 605. Since the polarized light component of the light in this instance primarily includes the S-polarized light component, the light is reflected by the polarization beam splitter 605, and travels toward the pupil 21 of the viewer 20. As above-described, the image forming device includes the light source 601 and the liquid crystal display (LCD) 604, the optical device includes the light guide member 602, the polarization beam splitters 603 and 605, the quarterwave plate 606 and the reflector 607, and the polarization beam splitter 605 corresponds to a virtual image formation region of the optical device.

In an example depicted in FIG. 23B, light from an image forming device 611 proceeds through a light guide member 612 (first glass plate 121), and impinges on a semi-transmitting mirror 613, where part of the light passes through the semi-transmitting mirror 613, impinges on and is reflected by a reflector 614, and again impinges on the semi-transmitting mirror 613, where part of the light is reflected by the semi-transmitting mirror 613, and travels toward the pupil 21 of the viewer 20. As described above, the optical device includes the light guide member 612, the semi-transmitting mirror 613 and the reflector 614, and the semi-transmitting mirror 613 corresponds to a virtual image formation region of the optical device.

A second glass plate 122 is laminated on the light guide member 612 (first glass plate 121) through a shock absorbing layer (shock relaxing layer, adhesive layer) 123.

Figure 24A:
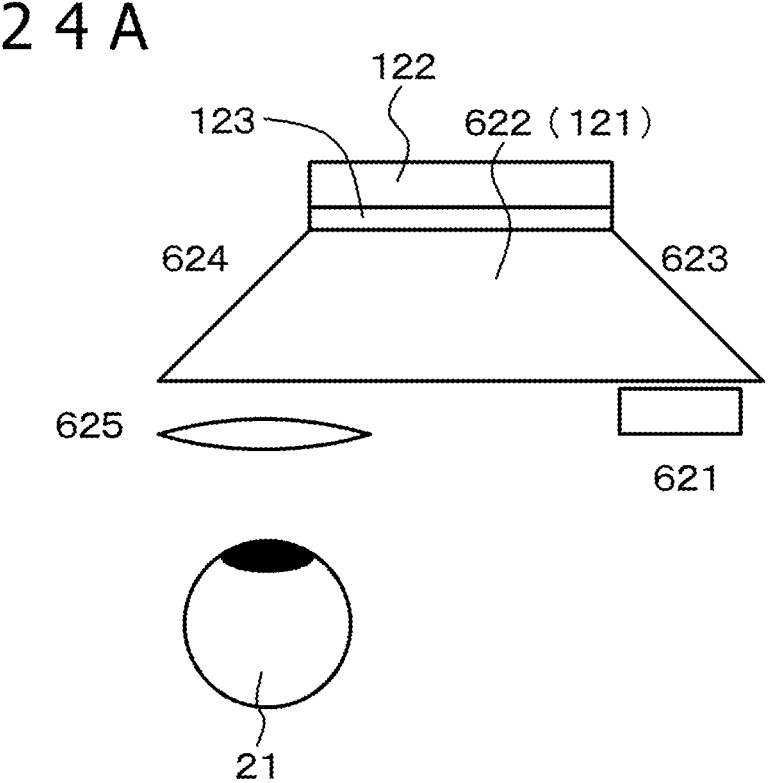
FIGS. 24A and 24B are a schematic view, as viewed from above, and a schematic view, as viewed from a lateral side, respectively, of an optical device in another modification of the display device of Example 9.
Figure 24B:
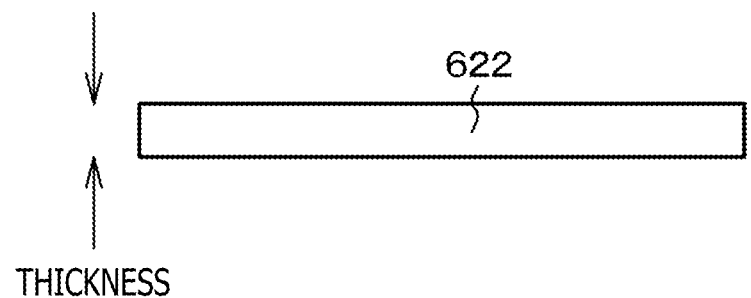

Alternatively, a schematic view as viewed from above and a schematic view as viewed from a lateral side of an optical device in another modification of the display device of Example 9 are depicted in FIGS. 24A and 24B. This optical device includes a hexahedron prism 622 (corresponding to the first glass plate 121) and a convex lens 625. Light emitted from an image forming device 621 is incident on the prism 622, impinges on and is reflected by a prism surface 623, proceeds through the prism 622, impinges on and is reflected by a prism surface 624, and reaches the pupil 21 of the viewer 20 through the convex lens 625. The prism surface 623 and the prism surface 624 are inclined in opposite directions, and the plan-view shape of the prism 622 is a trapezoid, specifically, an isosceles trapezoid. Mirror coating has been applied to the prism surfaces 623 and 624. Where the thickness (height) of that portion of the prism 622 which faces the pupil 21 is set smaller than a human's average pupil diameter of 4 mm, the viewer 20 can view an external environmental image and a virtual image from the prism 622 in a superimposed state.

Note that the present disclosure can take the following configurations.

[A01] «Display Device»

A display device including:

(A) a frame worn on a head of a viewer; and (B) an image display device mounted to the frame, in which the image display device includes (B-1) an image forming device, and (B-2) an optical device that forms a virtual image based on light emitted from the image forming device, the light from the image forming device enters a pupil of the viewer through the optical device, and the optical device includes at least a first glass plate, a second glass plate that faces the first glass plate, and a shock absorbing layer sandwiched between the first glass plate and the second glass plate.

[A02]

The display device as described in [A01], in which the shock absorbing layer is sandwiched between the first glass plate and the second glass plate on a whole surface basis.

[A03]

The display device as described in [A01] or [A02], in which the shock absorbing layer includes an ultraviolet-curing resin or a thermosetting resin.

[A04]

The display device as described in any one of [A01] to [A03], in which the refractive index of a material constituting the shock absorbing layer is 1.45 to 1.65.

[A05]

The display device as described in any one of [A01] to [A04], in which the optical device is provided further with deflection means, and the light from the image forming device is deflected at the deflection means, is propagated by total reflection through the inside of a laminated structure including the first glass plate, the shock absorbing layer and the second glass plate, is deflected at the deflection means, and enters the pupil of the viewer.

[A06]

The display device as described in [A05], in which the deflection means includes a hologram diffraction grating.

[A07] «First Configuration»

The display device as described in [A05] or [A06], in which the first glass plate and the second glass plate are disposed in this order from the viewer's side, the deflection means includes first deflection means and second deflection means, the first deflection means is disposed in either a region of the first glass plate or a region of the second glass plate where the light from the image forming device enters, the second deflection means is disposed in or on either the first glass plate or the second glass plate, and the light from the image forming device is deflected at the first deflection means, is propagated by total reflection through the inside of a laminated structure including the first glass plate, the shock absorbing layer and the second glass plate, is deflected at the second deflection means, and enters the pupil of the viewer.

[A08] «Second Configuration»

The display device as described in [A05] or [A06], in which the first glass plate and the second glass plate are disposed in this order from the viewer's side, the deflection means includes first-A deflection means, first-B deflection means and second deflection means, the first-A deflection means and the first-B deflection means are disposed in either a region of the first glass plate or a region of the second glass plate where the light from the image forming device enters, the second deflection means is disposed in or on either the first glass plate or the second glass plate, and the light from the image forming device is deflected at the first-A deflection means and the first-B deflection means, is propagated by total reflection through the inside of a laminated structure including the first glass plate, the shock absorbing layer and the second glass plate, is deflected by the second deflection means, and enters the pupil of the viewer.

[A09] «Third-A Configuration»

The display device as described in [A05] or [A06], in which the first glass plate and the second glass plate are disposed in this order from the viewer's side, the deflection means includes first-A deflection means, first-B deflection means and second deflection means, the first-A deflection means is disposed in a region of the first glass plate where the light from the image forming device enters, the first-B deflection means is disposed in a region of the second glass plate where the light from the image forming device enters, the second deflection means is disposed in or on the first glass plate or the second glass plate, and the light from the image forming device is deflected at the first-A deflection means and the first-B deflection means, is propagated by total reflection through the inside of a laminated structure including the first glass plate, the shock absorbing layer and the second glass plate, is deflected at the second deflection means, and enters the pupil of the viewer.

[A10] «Third-B Configuration»

The display device as described in [A05] or [A06], in which the first glass plate and the second glass plate are disposed in this order from the viewer's side, the deflection means includes first deflection means, second-A deflection means and second-B deflection means, the first deflection means is disposed in a region of the first glass plate or a region of the second glass plate where the light from the image forming device enters, the second-A deflection means is disposed in or on the first glass plate, the second-B deflection means is disposed in or on the second glass plate, and the light from the image forming device is deflected at the first deflection means, is propagated by total reflection through the inside of a laminated structure including the first glass plate, the shock absorbing layer and the second glass plate, is deflected at the second-A deflection means and the second-B deflection means, and enters the pupil of the viewer.

[A11] «Fourth Configuration»

The display device as described in [A05] or [A06], in which the first glass plate and the second glass plate are disposed in this order from the viewer's side, the deflection means includes first-A deflection means, first-B deflection means, second-A deflection means and second-B deflection means, the first-A deflection means is disposed in a region of the first glass plate where the light from the image forming device enters, the first-B deflection means is disposed in a region of the second glass plate where the light from the image forming device enters, the second-A deflection means is disposed in or on the first glass plate, the second-B deflection means is disposed in or on the second glass plate, and the light from the image forming device is deflected at the first-A deflection means and the first-B deflection means, is propagated by total reflection through the inside of a laminated structure including the first glass plate, the shock absorbing layer and the second glass plate, is deflected at the second-A deflection means and the second-B deflection means, and enters the pupil of the viewer.

[B01]

The display device as described in any one of [A01] to [A11], further including:

a light controller that controls the quantity of external light externally incident, in which a virtual image formation region where a virtual image is formed based on the light emitted from the image forming device in the optical device overlaps with the light controller, and the light controller is controlled in such a manner that when the virtual image is formed at a part of the virtual image formation region based on the light emitted from the image forming device, the light shielding ratio in the virtual image projection region of the light controller in which a projection image of the virtual image onto the light controller is included is higher than the light shielding ration in the other region of the light controller.

[B02]

The display device as described in [B01], in which when the light controller operates, the light shielding ratio in the other region of the light controller is not more than 0.95, assuming that the light shielding ratio in the virtual image projection region of the light controller in which the projection image of the virtual image onto the light controller is included is "1."

[B03]

The display device as described in [B01] or [B02], in which when the light controller operates, the light shielding ratio in the virtual image projection region of the light controller is 35% to 99%.

[B04]

The display device as described in any one of [B01] to [B03], in which the light shielding ratio in the virtual image projection region of the light controller is increased prior to the formation of the virtual image in the optical device based on the light emitted from the image forming device.

[B05]

The display device as described in any one of [B01] to [B04], in which when one virtual image is formed in the optical device based on the light emitted from the image forming device and a next virtual image different from the one virtual image is formed next, let the area of a virtual image projection region of the light controller corresponding to the one virtual image be S1, and let the area of a virtual image projection region of the light controller corresponding to the next virtual image be S2, then in the case where S2/S1<0.8 or 1<S2/S1, the virtual image projection region of the light controller where the next virtual image is formed is a region of the light controller where the projection image of the next virtual image onto the light controller is included, and in the case where $0.8 \leq S2/S1 \leq 1$, the virtual image projection region of the light controller where the next virtual image is formed is a region of the light controller where the projection image of the one virtual image onto the light controller is included.

[B06]

The display device as described in any one of [B01] to [B05], in which when a virtual rectangle circumscribing the virtual image formed in the optical device is assumed, the virtual image projection region of the light controller is greater than the virtual rectangle.

[B07]

The display device as described in [B06], in which let the lengths in a transverse direction and a longitudinal direction of the virtual rectangle circumscribing the virtual image formed in the optical device be L1-T and L1-L, and let the shape of the virtual image projection region of the light controller be a rectangular shape with lengths in a transverse direction and a longitudinal direction of L2-T and L2-L, then the relations of:

$$1.0 \leq L2\text{-}T/L1\text{-}T \leq 1.5, \text{ and}$$

$$1.0 \leq L2\text{-}L/L1\text{-}L \leq 1.5$$

are satisfied.

[B08]

The display device as described in any one of [B01] to [B07], in which the light controller includes a first substrate, a second substrate that faces the first substrate, a first transparent electrode provided on an opposed surface of the first substrate that faces the second substrate, a second transparent electrode provided on an opposed surface of the second substrate that faces the first substrate, and a light controlling layer sandwiched between the first transparent electrode and the second transparent electrode.

[B09]

The display device as described in [B08], in which the first transparent electrode includes a plurality of belt-shaped first transparent electrode segments extending in a first direction, the second transparent electrode includes a plurality of belt-shaped second transparent electrode segments extending in a second direction different from the first direction, and control of the light shielding ratio of a part of the light controller that corresponds to an overlapping region of the first transparent electrode segment and the second transparent electrode segment is performed based on control of a voltage or voltages impressed on the first transparent electrode segment and the second transparent electrode segment.

[B10]

The display device as described in any one of [B01] to [B09], further including:

an environmental illuminance measuring sensor that measures illuminance in an environment in which the display device is situated, in which the light shielding ratio of the light controller is controlled based on the result of measurement by the environmental illuminance measuring sensor.

[B11]

The display device as described in any one of [B01] to [B10], further including:

an environmental illuminance measuring sensor that measures illuminance in an environment in which the display device is situated, in which luminance of an image formed by the image forming device is controlled based on the result of measurement by the environmental illuminance measuring sensor.

[B12]

The display device as described in any one of [B01] to [B11], further including:

a transmitted light illuminance measuring sensor that measures illuminance based on light coming from an external environment and transmitted through the light controller, in which the light shielding ratio of the light controller is controlled based on the result of measurement by the transmitted light illuminance measuring sensor.

[B13]

The display device as described in any one of [B01] to [B12], further including:

a transmitted light illuminance measuring sensor that measures illuminance based on light coming from an external environment and transmitted through the light controller, in which luminance of an image formed by the image forming device is controlled based on the result of measurement by the transmitted light illuminance measuring sensor.

[B14]

The display device as described in [B12] or [B13], in which the transmitted light illuminance measuring sensor is disposed more on the viewer's side than the optical device.

[B15]

The display device as described in any one of [B01] to [B14], in which light passing through the light controller is colored in a desired color by the light controller.

[B16]

The display device as described in [B15], in which the color in which the light is colored by the light controller is variable.

[B17]

The display device as described in [B15], in which the color in which the light is colored by the light controller is fixed.

[C01] «Fifth Configuration»

The display device as described in [A06], in which the deflection means includes first-A deflection means, first-B deflection means and second deflection means, the first-A deflection means is formed therein with a first interference fringe, the first-B deflection means is formed therein with a second interference fringe, the second deflection means is formed therein with a third interference fringe, and the relations of $$\varphi_1 < \varphi_3 < \varphi_2, \text{ and } d_1 = d_3 = d_2$$

are satisfied, where $\varphi_1$: slant angle of the first interference fringe
$\varphi_2$: slant angle of the second interference fringe
$\varphi_3$: slant angle of the third interference fringe
$d_1$: pitch of the first interference fringe
$d_2$: pitch of the second interference fringe
$d_3$: pitch of the third interference fringe

[C02]

The display device as described in [C01], in which the relation of $$0.7 \text{ degrees} \leq |\varphi_2 - \varphi_1| \leq 4.7 \text{ degrees}$$

is satisfied.

[C03] «Sixth Configuration»

The display device as described in [A06], in which the deflection means includes first-A deflection means, first-B deflection means and second deflection means, the first-A deflection means is formed therein with a first interference fringe, the first-B deflection means is formed therein with a second interference fringe, the second deflection means is formed therein with a third interference fringe, and the relation of $$\lambda_1 < \lambda_3 < \lambda_2$$

is satisfied, where $\lambda_1$: peak of light incident on the laminated structure and deflected by the first-A deflection means $\lambda_2$: peak of light incident on the laminated structure and deflected by the first-B deflection means $\lambda_3$: peak of light deflected by the first-A deflection means and the first-B deflection means, propagated by total reflection through the inside of the laminated structure, and deflected by the second deflection means.

[C04]

The optical device as described in [C03], in which the relations of $$0 \text{ nm} < |\lambda_3 - \lambda_1| \leq 40 \text{ nm, and } 0 \text{ nm} < |\lambda_2 - \lambda_3| \leq 40 \text{ nm}$$

are satisfied.

[C05]

The optical device as described in [C03] or [C04], in which let the diffraction efficiency of the first-A deflection means be $\eta_1$, let the diffraction efficiency of the first-B deflection means be $\eta_2$, and let the diffraction efficiency of the second deflection means be $\eta_3$, then the relations of $$\eta_1/\eta_3 \geq 1.0, \text{ and } \eta_2/\eta_3 \geq 1.0$$

are satisfied, and preferably the relation of $$\eta_3 \leq 0.25$$

is satisfied.

[C06]

The optical device as described in any one of [C03] to [C05], in which let the thickness of the first-A deflection means be T1, let the thickness of the first-B deflection means be T2, and let the thickness of the second deflection means be T3, then the relations of $$1.0 \text{ μm} \leq T1, T2 \leq 10 \text{ μm, and } T1 \geq T3, T2 \geq T3$$

are satisfied, and preferably the relation of $$T3 \leq 2.0 \text{ μm}$$

is satisfied.

[C07]

The optical device as described in any one of [C03] to [C06], in which let the pitch of the first interference fringe be d1, the slant angle of the first interference fringe be $\varphi_1$, the pitch of the second interference fringe be d2, and the slant angle of the second interference fringe be φ2, then the relations of $$d1=d2, \text{ and } \varphi1 \neq \varphi2$$

are satisfied.

[C08]

The optical device as described in [C07], in which let the pitch of the third interference fringe be d3, and let the slant angle of the third interference angle be φ3, then the relations of $$\varphi1 < \varphi3 < \varphi2, \text{ and } d1=d2=d3$$

are satisfied.

[C09]

The optical device as described in any one of [C01] to [C08], in which incident light having a peak wavelength λ1 in terms of an incident beam corresponding to a center angle of view is diffracted primarily by the first-A deflection means rather than the first-B deflection means, and incident light having a peak wavelength λ2 in terms of an incident beam corresponding to a center angle of view is diffracted primarily by the first-B deflection means rather than the first-A deflection means.

[C10]

The optical device as described in any one of [C01] to [C09], in which the first-A deflection means is disposed on a surface on one side of the laminated structure, the first-B deflection means is disposed on a surface on the other side, opposite to the surface on the one side, of the laminated structure, and the second deflection means is disposed on the surface on the other side of the laminated structure.

[C11]

The optical device as described in any one of [λ06] and [C01] to [C10], in which the deflection means includes first-A deflection means, first-B deflection means and second deflection means, the first-A deflection means has a first interference fringe formation region formed therein with a first interference fringe, with an alignment mark being provided on outside of the first interference fringe formation region, and the first-B deflection means has a second interference fringe formation region formed therein with a second interference fringe, with an alignment mark being provided on outside of the second interference fringe formation region.

[D01]

The optical device as described in any one of [λ06] and [C01] to [C09], in which the deflection means includes first-A deflection means, first-B deflection means and second deflection means, the first-A deflection means has a first interference fringe formation region formed therein with a first interference fringe, the first-B deflection means has a second interference fringe formation region formed therein with a second interference fringe, the first-A deflection means is provided with a 1A-th alignment mark and a 1B-th alignment mark on the outside of the first interference fringe formation region in the extending direction of the first interference fringe, oppositely to each other with the first interference fringe formation region therebetween, the first-B deflection means is provided with a 2A-th alignment mark and a 2B-th alignment mark on the outside of the second interference fringe formation region in the extending direction of the second interference fringe, oppositely to each other with the second interference fringe formation region therebetween, the 1A-th alignment mark and the 1B-th alignment mark are formed with the same interference fringe as the interference fringe provided in the first interference fringe formation region, the 2A-th alignment mark and the 2B-th alignment mark are formed with the same interference fringe as the interference fringe provided in the second interference fringe formation region, the 1A-th alignment mark and the 2A-th alignment mark have such shapes that the 1A-th alignment mark and the 2A-th alignment mark do not overlap with each other, in the state where relative positioning (alignment) of the first-A deflection means and the first-B deflection means has been completed, and the 1B-th alignment mark and the 2B-th alignment mark have such shapes that the 1B-th alignment mark and the 2B-th alignment mark do not overlap with each other, in the state where relative positioning (alignment) of the first-A deflection means and the first-B deflection means has been completed, or, alternatively, the 1A-th alignment mark and the 2A-th alignment mark are disposed at such positions that the 1A-th alignment mark and the 2A-th alignment mark do not overlap with each other, in the state where relative positioning (alignment) of the first-A deflection means and the first-B deflection means has been completed, and the 1B-th alignment mark and the 2B-th alignment mark are disposed at such positions that the 1B-th alignment mark and the 2B-th alignment mark do not overlap with each other, in the state where relative positioning (alignment) of the first-A deflection means and the first-B deflection means has been completed.

[D02]

The optical device as described in [D01], in which the 1A-th alignment mark, the 1B-th alignment mark, the 2A-th alignment mark and the 2B-th alignment mark are disposed on an end side of the laminated structure.

[E01] «Hologram Diffraction Grating»

A hologram diffraction grating that has an interference fringe formation region formed therein with an interference fringe, in which two alignment marks are provided on the outside of the interference fringe formation region in the extending direction of the interference fringe, oppositely to each other with the interference fringe formation region therebetween, each alignment mark is formed with the same interference fringe as the interference fringe provided in the interference fringe formation region, and the plan-view shape of each alignment mark is an annular shape.

[E02]

The hologram diffraction grating as described in [E01], in which each alignment mark is provided on the outside of the interference fringe formation region on the side opposite to that part of the interference fringe formation region at which light is emitted.

[F01] «Alignment Device»

An alignment device including:

a stage that is movable in an X-direction, a Y-direction and a Z-direction and is rotatable in the XZ plane;

a first light source (first alignment light source) which is placed on the stage and by which light is made to be incident on a laminated structure from an end face of the laminated structure where first-A deflection means is disposed;

a second light source (second alignment light source) by which light is made to be incident on a support supporting first-B deflection means on the upper side of the first-A deflection means from an end face of the support;

a first imaging device that detects an optical image of a 1A-th alignment mark, provided on the first-A deflection means, based on light incident from the first light source and diffracted or reflected by the 1A-th alignment mark, and an optical image of a 2A-th alignment mark, provided on the first-B deflection means, based on light incident from the second light source and diffracted or reflected by the 2A-th alignment mark; and a second imaging device that detects an optical image of a 1B-th alignment mark, provided on the first-A deflection means, based on light incident from the first light source and diffracted or reflected by the 1B-th alignment mark, and an optical image of a 2B-th alignment mark, provided on the first-B deflection means, based on light incident from the second light source and diffracted or reflected by the 2B-th alignment mark.

[G01] «Method of Assembling Optical Device»

A method of assembling the optical device as described in [D01] or [D02], the method including:

optically detecting a 1A-th alignment mark and a 2A-th alignment mark, and optically detecting a 1B-th alignment mark and a 2B-th alignment mark;

determining a first straight line connecting the 1A-th alignment mark and the 1B-th alignment mark, and determining a second straight line connecting the 2A-th alignment mark and the 2B-th alignment mark; and performing relative positioning (alignment) of first-A deflection means and first-B deflection means such that the angle formed between the first straight line and the second straight line when the first straight line and the second straight line are projected onto a virtual plane is within a predetermined value.

[G02] «Method of Assembling Optical Device»

A method of assembling the optical device as described in [D01] or [D02], in which a 1A-th alignment mark and a 1B-th alignment mark are formed with the same interference fringe as an interference fringe provided in a first interference fringe formation region, a 2A-th alignment mark and a 2B-th alignment mark are formed with the same interference fringe as an interference fringe provided in a second interference fringe formation region, and in a state in which first-B deflection means is supported by a support, light is made to be incident on a laminated structure from an end face of the laminated structure, the light diffracted or reflected by the 1A-th alignment mark and the 1B-th alignment mark is optically detected, light is made to be incident on the support from an end face of the support, the light diffracted or reflected by the 2A-th alignment mark and the 2B-th alignment mark is optically detected, and relative positioning (alignment) of first-A deflection means and the first-B deflection means is conducted.

[G03]

The method of assembling the optical device as described in [G01] or [G02], in which in a state in which the first-A deflection means is disposed in or on the laminated structure, relative positioning (alignment) of the first-A deflection means and the first-B deflection means is performed, and the first-B deflection means is disposed in or on the laminated structure.

[G04]

The method of assembling the optical device as described in [G03], in which in a state in which the first-A deflection means is disposed in or on the laminated structure, relative movement of the laminated structure relative to the first-B deflection means is conducted.

[G05]

The method of assembling the optical device as described in [G03] or [G04], in which the relative positioning (alignment) of the first-A deflection means and the first-B deflection means is conducted after the first-A deflection means is laminated or formed on the laminated structure, and the first-B deflection means is laminated on the laminated structure.

[G06]

The method of assembling the optical device as described in any one of [G01] to [G05], in which the relative positioning (alignment) of the first-A deflection means and the first-B deflection means is conducted in a state in which the first-B deflection means is supported by a support.

[G07]

The method of assembling the optical device as described in [G06], in which the 1A-th alignment mark and the 1B-th alignment mark are formed with the same interference fringe as an interference fringe provided in a first interference fringe formation region, the 2A-th alignment mark and the 2B-th alignment mark are formed with the same interference fringe as an interference fringe provided in a second interference fringe formation region, light is made to be incident on a laminated structure from an end face of the laminated structure, and the light diffracted or reflected by the 1A-th alignment mark and the 1B-th alignment mark is optically detected, and light is made to be incident on a support from an end face of the support, and the light diffracted or reflected by the 2A-th alignment mark and the 2B-th alignment mark is optically detected.

[G08]

The method of assembling the optical device as described in [G07], in which the 1A-th alignment mark and the 2A-th alignment mark has such shapes that the 1A-th alignment mark and the 2A-th alignment mark do not overlap with each other in a state in which the relative positioning (alignment) of the first-A deflection means and the first-B deflection means has been completed, and the 1B-th alignment mark and the 2B-th alignment mark have such shapes that the 1B-th alignment mark and the 2B-th alignment mark do not overlap with each other in a state in which the relative positioning (alignment) of the first-A deflection means and the first-B deflection means has been completed.

[G09]

The method of assembling the optical device as described in [G07], in which the 1A-th alignment mark and the 2A-th alignment mark are disposed at such positions that the 1A-th alignment mark and the 2A-th alignment mark do not overlap with each other in a state in which the relative positioning (alignment) of the first-A deflection means and the first-B deflection means has been completed, and the 1B-th alignment mark and the 2B-th alignment mark are disposed at such positions that the 1B-th alignment mark and the 2B-th alignment mark do not overlap with each other in a state in which the relative positioning (alignment) of the first-A deflection means and the first-B deflection means has been completed.

[G10]

The method of assembling the optical device as described in any one of [G01] to [G09], in which the 1A-th alignment mark and the 2A-th alignment mark are imaged by a first imaging device, and the 1B-th alignment mark and the 2B-th alignment mark are imaged by a second imaging device.

[G11]

The method of assembling the optical device as described in any one of [G01] to [G10], in which the 1A-th alignment mark, the 1B-th alignment mark, the 2A-th alignment mark and the 2B-th alignment mark are disposed on an end side of a laminated structure.

[G12]

The method of assembling the optical device as described in any one of [G01] to [G11], in which a maximum of the predetermined value is 100 seconds.

[H01] «Optical Device: First Mode»

An optical device that guides light from an image forming device to a pupil of a viewer, including:
a first glass plate;
a second glass plate;
first-A deflection means;
first-B deflection means; and
second deflection means,
in which the first-A deflection means is disposed in a region of the first glass plate where the light from the image forming device enters,
the first-B deflection means is disposed in a region of the second glass plate where the light from the image forming device enters,
the second deflection means is disposed in or on the first glass plate or the second glass plate,
the first-A deflection means and the first-B deflection means are aligned with each other, and
the first glass plate and the second glass plate are laminated on each other through a shock absorbing layer.

[H02] «Optical Device: Second Mode»

An optical device that guides light from an image forming device to a pupil of a viewer, including:
a first glass plate;
a second glass plate;
first deflection means;
second-A deflection means; and
second-B deflection means,
in which the first deflection means is disposed in a region of the first glass plate or a region of the second glass plate where the light from the image forming device enters,
the second-A deflection means is disposed in or on the first glass plate,
the second-B deflection means is disposed in or on the second glass plate,
the second-A deflection means and the second-B deflection means are aligned with each other, and
the first glass plate and the second glass plate are laminated on each other through a shock absorbing layer.

[H03] «Optical Device: Third Mode»

An optical device that guides light from an image forming device to a pupil of a viewer, including:
a first glass plate;
a second glass plate;
first-A deflection means;
first-B deflection means;
second-A deflection means; and
second-B deflection means,
in which the first-A deflection means is disposed in a region of the first glass plate where the light from the image forming device enters,
the first-B deflection means is disposed in a region of the second glass plate where the light from the image forming device enters,
the second-A deflection means is disposed in or on the first glass plate,
the second-B deflection means is disposed in or on the second glass plate,
the first-A deflection means and the first-B deflection means are aligned with each other, and the second-A deflection means and the second-B deflection means are aligned with each other, and
the first glass plate and the second glass plate are laminated on each other through a shock absorbing layer.

[J01] «Method of Producing Optical Device: First Mode»

A method of producing an optical device that guides light from an image forming device to a pupil of a viewer, the method including the steps of:
preparing a first glass plate and a second glass plate having a configuration in which first-A deflection means is disposed in a region of the first glass plate where the light from the image forming device enters, first-B deflection means is disposed in a region of the second glass plate where the light from the image forming device enters, and second deflection means is disposed in or on the first glass plate and the second glass plate; and
aligning the first-A deflection means and the first-B deflection means, and laminating the first glass plate and the second glass plate on each other through a shock absorbing layer.

[J02] «Method of Producing Optical Device: Second Mode»

A method of producing an optical device that guides light from an image forming device to a pupil of a viewer, the method including the steps of:
preparing a first glass plate and a second glass plate having a configuration in which first deflection means is disposed in a region of the first glass plate where the light from the image forming device enters, the second-A deflection means is disposed in or on the first glass plate, and the second-B deflection means is disposed in or on the second glass plate; and
aligning the second-A deflection means and the second-B deflection means, and laminating the first glass plate and the second glass plate on each other through a shock absorbing layer.

[J03] «Method of Producing Optical Device: Third Mode»

A method of producing an optical device that guides light from an image forming device to a pupil of a viewer, the method including the steps of:
preparing a first glass plate and a second glass plate having a configuration in which first-A deflection means is disposed in a region of the first glass plate where the light from the image forming device enters, first-B deflection means is disposed in a region of the second glass plate where the light from the image forming device enters, second-A deflection means is disposed in or on the first glass plate, and second-B deflection means is disposed in or on the second glass plate; and
aligning the first-A deflection means and the first-B deflection means and aligning the second-A deflection means and the second-B deflection means, and laminating the first glass plate and the second glass plate on each other through a shock absorbing layer therebetween.

REFERENCE SIGNS LIST

10 . . . Frame, 10' . . . Nose pad, 11 . . . Front section, 11' . . . Central portion of front section, 12 . . . Hinge, 13 . . . Temple section, 14 . . . Modern section, 15 . . . Wiring (Signal line, Power line, etc.), 16 . . . Headphone section, 16' . . . Headphone section wiring, 17 . . . Imaging device, 18 . . . Control device (Control circuit, Control means), 18A . . . Image information storage device, 19 . . . Attaching member, 20 . . . Viewer, 21 . . . Pupil, 100, 200, 300 . . . Image display device, 111 . . . Image forming device, 112 . . . Optical system (Collimating optical system), 113 . . . Housing, 114 . . . Opening, 115 . . . Organic EL image forming device, 116 . . . Convex lens, 117 . . . Light source, 118A . . . Convex lens, 118B . . . Total reflection mirror, 119 . . . Scanning means (MEMS mirror), 120, 220, 320, 330 . . . Optical device, 121 . . . First glass plate, 121A . . . First surface of first glass plate, 121B . . . Second surface of first glass plate, 122 . . . Second glass plate, 122A . . . First surface of second glass plate, 122B . . . Second surface of second glass plate, 122' . . . Portion of second glass plate, 123 . . . Shock absorbing layer (Shock relaxing layer, Adhesive layer), 124 . . . Laminated structure, 124A . . . First surface of laminated structure, 124B . . . Second surface of laminated structure, 125 . . . Transparent protective member, 126 . . . Sealing member, 130, 230 . . . First deflection means, 130A . . . First-A deflection means, 130B . . . First-B deflection means, 131 . . . First diffraction grating member, 132 . . . First interference fringe formation region, 133 . . . Region outside of first interference fringe formation region, 134A . . . 1A-th alignment mark, 134B . . . 1B-th alignment mark, 136 . . . Second interference fringe formation region, 137 . . . Region outside of second interference fringe formation region, 138A . . . 2A-th alignment mark, 138B . . . 2B-th alignment mark, 140, 240 . . . Second deflection means (Virtual image forming region), 140A . . . Second-A deflection means, 140B . . . Second-B deflection means, 141 . . . Second diffraction grating member, 160 . . . Stage, 161 . . . First light source (First alignment light source) in alignment device, 162 . . . Second light source (Second alignment light source) in alignment device, 163 . . . First imaging device (First alignment imaging device), 164 . . . Second imaging device (Second alignment imaging device), 171 . . . Support, 321 . . . Transparent member, 331 . . . Semi-transmitting mirror, 401, 402 . . . Light shielding member, 500 . . . Light controller, 501 . . . First substrate (functioned also by transparent protective member), 502 . . . First transparent electrode, 502A . . . First transparent electrode segment, 503 . . . Second substrate, 504 . . . Second transparent electrode, 504A . . . Second transparent electrode segment, 505 . . . Light controlling layer, 505A . . . $WO_3$ layer, 505B . . . $Ta_2O_5$ layer, 505C . . . $Ir_xSn_{1-x}O$ layer, 506 . . . Protective layer, 507 . . . Sealing material, 508 . . . Minimum unit region where light shielding ratio of light controller varies, 511 . . . Virtual image projection region, 512 . . . Other region of light controller, 513 . . . Virtual rectangle, 521 . . . Environmental illuminance measuring sensor, 522 . . . Transmitted light illuminance measuring sensor, 601 . . . Light source, 602 . . . Light guide member, 603, 605 . . . Polarization beam splitter, 604 . . . Liquid crystal display, 606 . . . Quarterwave plate, 607 . . . Reflector, 611 . . . Image forming device, 612 . . . Light guide member, 613 . . . Semi-transmitting mirror, 614 . . . Reflector, 621 . . . Image forming device, 622 . . . Prism, 623, 624 . . . Prism surface, 625 . . . Convex lens

The invention claimed is:
1. A display device, comprising:
a frame worn on a head of a viewer; and
an image display device mounted to the frame, wherein the image display device includes:
an image forming device;
an optical device configured to form a virtual image based on light emitted from the image forming device, wherein
the light from the image forming device enters a pupil of the viewer through the optical device,
the optical device includes a laminated structure, and
the laminated structure includes a first glass plate, a second glass plate that faces the first glass plate, and a shock absorbing layer sandwiched between the first glass plate and the second glass plate; and
a transparent protective member that covers the laminated structure, wherein
the second glass plate comprises a first surface and a second surface opposite to the first surface, the first surface of the second glass plate faces the first glass plate, and
an outer edge portion of the second surface of the second glass plate is adhered to an outer end portion of the transparent protective member, such that an airspace is formed between the transparent protective member and the second glass plate.

2. The display device according to claim 1, wherein the shock absorbing layer is sandwiched between the first glass plate and the second glass plate on a whole surface basis.

3. The display device according to claim 1, wherein the shock absorbing layer includes one of an ultraviolet-curing resin or a thermosetting resin.

4. The display device according to claim 1, wherein the shock absorbing layer comprises a material that has a refractive index of 1.45 to 1.65.

5. The display device according to claim 1, wherein
the optical device further includes a deflection means, and
the light from the image forming device is deflected at the deflection means, is propagated by total reflection through inside of the laminated structure including the first glass plate, the shock absorbing layer and the second glass plate, is deflected at the deflection means, and enters the pupil of the viewer.

6. The display device according to claim 5, wherein the deflection means includes a hologram diffraction grating.

7. The display device according to claim 5, wherein
the first glass plate is at a side of the viewer,
the deflection means includes a first deflection means and a second deflection means,
the first deflection means is in one of a region of the first glass plate or a region of the second glass plate where the light from the image forming device enters,
the second deflection means is in or on one of the first glass plate or the second glass plate, and
the light from the image forming device is deflected at the first deflection means, is propagated by the total reflection through inside of the laminated structure including the first glass plate, the shock absorbing layer, and the second glass plate, is deflected at the second deflection means, and enters the pupil of the viewer.

8. The display device according to claim 5, wherein
the first glass plate is at a side of the viewer,
the deflection means includes a first-A deflection means, a first-B deflection means, and a second deflection means, wherein
the first-A deflection means is on the first surface of the second glass plate where the light from the image forming device enters,
the first-B deflection means is on the second surface of the second glass plate,
the second deflection means is in or on one of the first glass plate or the second glass plate, and the light from the image forming device is deflected at the first-A deflection means and the first-B deflection means, is propagated by the total reflection through inside of the laminated structure including the first glass plate, the shock absorbing layer, and the second glass plate, is deflected at the second deflection means, and enters the pupil of the viewer.

9. The display device according to claim 5, wherein
the first glass plate is at a side of the viewer,
the deflection means includes a first-A deflection means, a first-B deflection means, and a second deflection means, wherein
the first-A deflection means is in a region of the first glass plate where the light from the image forming device enters,
the first-B deflection means is in a region of the second glass plate,
the second deflection means is in or on one of the first glass plate or the second glass plate, and
the light from the image forming device is deflected at the first-A deflection means and the first-B deflection means, is propagated by the total reflection through inside of the laminated structure including the first glass plate, the shock absorbing layer, and the second glass plate, is deflected at the second deflection means, and enters the pupil of the viewer.

10. The display device according to claim 5, wherein
the first glass plate is at a side of the viewer,
the deflection means includes a first deflection means, a second-A deflection means, and a second-B deflection means,
the first deflection means is in one of a region of the first glass plate or a region of the second glass plate where the light from the image forming device enters,
the second-A deflection means is in or on the first glass plate,
the second-B deflection means is in or on the second glass plate, and
the light from the image forming device is deflected at the first deflection means, is propagated by the total reflection through inside of the laminated structure including the first glass plate, the shock absorbing layer, and the second glass plate, is deflected at the second-A deflection means and the second-B deflection means, and enters the pupil of the viewer.

11. The display device according to claim 5, wherein
the first glass plate is at a side of the viewer,
the deflection means includes a first-A deflection means, a first-B deflection means, a second-A deflection means, and a second-B deflection means, wherein
the first-A deflection means is in a region of the first glass plate where the light from the image forming device enters,
the first-B deflection means is in a region of the second glass plate,
the second-A deflection means is in or on the first glass plate,
the second-B deflection means is in or on the second glass plate, and
the light from the image forming device is deflected at the first-A deflection means and the first-B deflection means, is propagated by the total reflection through inside of the laminated structure including the first glass plate, the shock absorbing layer, and the second glass plate, is deflected at the second-A deflection means and the second-B deflection means, and enters the pupil of the viewer.

12. An optical device, comprising:
a first glass plate;
a second glass plate;
a first-A deflection means;
a first-B deflection means; and
a second deflection means, wherein
the optical device guides light from an image forming device to a pupil of a viewer,
the first-A deflection means is in a region of the first glass plate where the light from the image forming device enters,
the first-B deflection means is in a region of the second glass plate,
the second deflection means is in or on one of the first glass plate or the second glass plate,
the first-A deflection means is aligned with the first-B deflection means, and
the first glass plate is laminated on the second glass plate through a shock absorbing layer.

13. An optical device, comprising:
a laminated structure that includes:
a first glass plate;
a second glass plate;
a first deflection means;
a second-A deflection means; and
a second-B deflection means, wherein
the optical device guides light from an image forming device to a pupil of a viewer,
the first deflection means is in one of a region of the first glass plate or a region of the second glass plate where the light from the image forming device enters,
the second-A deflection means is in or on the first glass plate,
the second-B deflection means is in or on the second glass plate,
the second-A deflection means is aligned with the second-B deflection means,
the first glass plate is laminated on the second glass plate through a shock absorbing layer; and
a transparent protective member that covers the laminated structure, wherein
the second glass plate comprises a first surface and a second surface opposite to the first surface, the first surface of the second glass plate faces the first glass plate, and
an outer edge portion of the second surface of the second glass plate is adhered to an outer end portion of the transparent protective member, such that an airspace is formed between the transparent protective member and the second glass plate.

14. An optical device, comprising:
a first glass plate;
a second glass plate;
a first-A deflection means;
a first-B deflection means;
a second-A deflection means; and
a second-B deflection means, wherein
the optical device guides light from an image forming device to a pupil of a viewer,
the first-A deflection means is in a region of the first glass plate where the light from the image forming device enters,
the first-B deflection means is in a region of the second glass plate,
the second-A deflection means is in or on the first glass plate, the second-B deflection means is in or on the second glass plate, the first-A deflection means is aligned with the first-B deflection means, and the second-A deflection means is aligned with the second-B deflection means, and the first glass plate is laminated on the second glass plate through a shock absorbing layer.

15. A method of producing an optical device, the method comprising:

preparing a first glass plate and a second glass plate having a configuration in which a first-A deflection means is in a region of the first glass plate where light from an image forming device enters, a first-B deflection means is in a region of the second glass plate, and a second deflection means is in or on one of the first glass plate or the second glass plate;

aligning the first-A deflection means with the first-B deflection means; and laminating the first glass plate on the second glass plate through a shock absorbing layer, wherein the optical device guides the light from the image forming device to a pupil of a viewer.

16. A method of producing an optical device, the method comprising:

preparing a first glass plate and a second glass plate having a configuration in which a first deflection means is in a region of the first glass plate where light from an image forming device enters, a second-A deflection means is in or on the first glass plate, and a second-B deflection means is in or on the second glass plate;

aligning the second-A deflection means with the second-B deflection means;

laminating the first glass plate on the second glass plate through a shock absorbing layer to obtain a laminated structure, wherein the optical device guides the light from the image forming device to a pupil of a viewer; and covering the laminated structure with a transparent protective member, wherein the second glass plate comprises a first surface and a second surface opposite to the first surface, the first surface of the second glass plate faces the first glass plate, and an outer edge portion of the second surface of the second glass plate is adhered to an outer end portion of the transparent protective member, such that an airspace is formed between the transparent protective member and the second glass plate.

17. A method of producing an optical device, the method comprising:

preparing a first glass plate and a second glass plate having a configuration in which a first-A deflection means is in a region of the first glass plate where light from an image forming device enters, a first-B deflection means is in a region of the second glass plate, a second-A deflection means is in or on the first glass plate, and a second-B deflection means is in or on the second glass plate;

aligning the first-A deflection means with the first-B deflection means;

aligning the second-A deflection means with the second-B deflection means; and laminating the first glass plate on the second glass plate through a shock absorbing layer.

18. A display device, comprising:

a frame worn on a head of a viewer; and an image display device mounted to the frame, wherein the image display device includes:

an image forming device; and an optical device configured to form a virtual image based on light emitted from the image forming device, wherein the light from the image forming device enters a pupil of the viewer through the optical device, the optical device includes a first glass plate at a side of the viewer, a second glass plate that faces the first glass plate, a shock absorbing layer sandwiched between the first glass plate and the second glass plate, and a deflection means, the deflection means includes a first deflection means and a second deflection means, the first deflection means is in one of a region of the first glass plate or a region of the second glass plate where the light from the image forming device enters, the second deflection means is in or on one of the first glass plate or the second glass plate, and the light from the image forming device is deflected at the first deflection means, is propagated by total reflection through inside of a laminated structure including the first glass plate, the shock absorbing layer, and the second glass plate, is deflected at the second deflection means, and enters the pupil of the viewer.

19. The display device according to claim 1, wherein a shore hardness value of the shock absorbing layer is lower than a shore hardness value of the first glass plate and a shore hardness value of the second glass plate.

20. The display device according to claim 1, further comprising a light shielding member on a first surface of the transparent protective member opposite to a second surface of the transparent protective member adhered to the second glass plate, wherein the light shielding member is positioned opposite to the image forming device.

* * * * *